(12) United States Patent
Yamaguchi et al.

(10) Patent No.: US 10,701,048 B2
(45) Date of Patent: Jun. 30, 2020

(54) NETWORK SERVICE INTERMEDIATION METHOD AND INTERMEDIATION SYSTEM

(71) Applicant: PANASONIC INTELLECTUAL PROPERTY MANAGEMENT CO., LTD., Osaka (JP)

(72) Inventors: Takahiro Yamaguchi, Osaka (JP); Masaya Yamamoto, Kyoto (JP); Natsume Matsuzaki, Osaka (JP); Masayuki Kozuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/254,049

(22) Filed: Apr. 16, 2014

(65) Prior Publication Data

US 2014/0317410 A1    Oct. 23, 2014

Related U.S. Application Data

(60) Provisional application No. 61/812,866, filed on Apr. 17, 2013.

(51) Int. Cl.
*H04L 29/06* (2006.01)

(52) U.S. Cl.
CPC .................. *H04L 63/08* (2013.01)

(58) Field of Classification Search
None
See application file for complete search history.

(56) References Cited

U.S. PATENT DOCUMENTS

| 6,470,450 B1* | 10/2002 | Langford et al. ............. 713/182 |
| 2008/0072304 A1* | 3/2008 | Jennings et al. ................ 726/11 |
| 2013/0086657 A1* | 4/2013 | Srinivasan et al. ............... 726/6 |

OTHER PUBLICATIONS

Internet Engineering Task Force (IETF) RFC 5849,"The OAuth 1.0 Protocol," Apr. 2010.

* cited by examiner

*Primary Examiner* — Kaveh Abrishamkar
(74) *Attorney, Agent, or Firm* — Wenderoth, Lind & Ponack, L.L.P.

(57) ABSTRACT

An intermediation method used in an intermediation system that includes an intermediation device determining a permission for application services requiring user authentication on a network, where in response to a user request, a first account used for a first service and a second account used for a second service, and a registration request for using the linking service linking the first application service and the second application service are associated with each other, when the two accounts are valid, as accounts usable in a linking service, an association between the first and second services is stored in the intermediation device, and when the user makes a request to use the linked services, that use is controlled by a query to the intermediation device regarding whether the account is associated as able to use the linking service.

11 Claims, 44 Drawing Sheets

FIG. 3

Account data 1000

| First service account (1001) | First service encryption key (1002) | Service authentication data (1003) | Encrypted service authentication data (1004) | Second service account (1005) |
|---|---|---|---|---|
| 0101 | 9428 | 0101-2013-04-15-18-20 | 9472839471738 | 0201 |
| 0110 | 1485 | 0110-2013-01-20-12-30 | 4729579138532 | 0290 |
| ⋮ | ⋮ | ⋮ | ⋮ | ⋮ |

FIG. 8

Account data 1100

| First service account (1101) | First service password (1102) | First service encryption key (1103) | Owned equipment (1104) |
|---|---|---|---|
| 0101 | 7531 | 9428 | 400-1 |
| 0110 | 8642 | 1485 | 400-50 |
| ⋮ | ⋮ | ⋮ | ⋮ |

FIG. 15

Account data 1200

| Second service account (1201) | Second service password (1202) | Second service encryption key (1203) | Owned equipment (1204) |
|---|---|---|---|
| 0201 | 2468 | 6489 | 700-3 |
| 0237 | 1357 | 7153 | 700-81 |
| ⋮ | ⋮ | ⋮ | ⋮ |

FIG. 29

Account data 1010

| First service account (1011) | First service encryption key (1012) | First service identification information A (1013) | Second service account (1014) | Second service identification information B (1015) | Identification information checking flag (1016) |
|---|---|---|---|---|---|
| 0101 | 9428 | 1234 | 0201 | 4321 | 1 |
| 0110 | 1485 | 7957 | 0290 | 9753 | 1 |
| ⋮ | ⋮ | ⋮ | ⋮ | | |

Account data 1020

| First service account 1021 | First service encryption key 1022 | Service authentication data 1023 | Encrypted service authentication data 1024 | Second service account 1025 | Third service account 1026 |
|---|---|---|---|---|---|
| 0101 | 9428 | 0101-2013-04-15-18-20 | 9472839471738 | 0201 | 0301 |
| 0110 | 1485 | 0110-2013-01-20-12-30 | 4729579138532 | 0290 | — |
| ... | ... | ... | ... | ... | ... |

FIG. 42

Account data 1030

| First service account (1031) | First service encryption key (1032) | Service authentication data (1033) | Encrypted service authentication data (1034) | Second service account (1035) | Service ID (1036) |
|---|---|---|---|---|---|
| 0101 | 9428 | 0101-2013-04-15-18-20 | 9472839471738 | 0201 | 002 |
| 0110 | 1485 | 0110-2013-01-20-12-30 | 4729579138532 | 0290 | 002 |
| 0101 | 9428 | 0101-2013-02-23-15-40 | 6734112656863 | 0301 | 003 |
| ... | ... | ... | ... | ... | ... |

FIG. 43

Account data 1040

| First service account ~1041 | First service encryption key ~1042 | First service identification information A ~1043 | Second service account ~1044 | Second service identification information B ~1045 | Second identification information checking flag ~1046 | Third service account ~1047 | Third service identification information B ~1048 | Third service identification checking flag ~1049 | ... |
|---|---|---|---|---|---|---|---|---|---|
| 0101 | 9428 | 1234 | 0201 | 4321 | 1 | 0301 | 2991 | 1 | ... |
| 0110 | 1485 | 7957 | 0290 | 9753 | 1 | — | — | — | ... |
| ... | ... | ... | ... | ... | ... | ... | ... | ... | ... |

FIG. 44

Account data 1050

| First service account 1051 | First service encryption key 1052 | First service identification information A 1053 | Second service account 1054 | Second service identification information B 1055 | Identification information checking flag 1056 | Service ID 1057 |
|---|---|---|---|---|---|---|
| 0101 | 9428 | 1234 | 0201 | 4321 | 1 | 002 |
| 0110 | 1485 | 7957 | 0290 | 9753 | 1 | 002 |
| 0101 | 9428 | 1234 | 0301 | 2991 | 1 | 003 |
| ... | ... | ... | ... | ... | ... | ... |

NETWORK SERVICE INTERMEDIATION METHOD AND INTERMEDIATION SYSTEM

CROSS REFERENCE TO RELATED APPLICATION

This application claims benefit to the U.S. provisional Application No. 61/812,866, filed on Apr. 17, 2013.

TECHNICAL FIELD

The present disclosure relates to technology for using a plurality of network services by linking, and in particular to technology for intermediation of the linking.

DESCRIPTION OF THE RELATED ART

In recent years, electronic equipment connected over a network (hereinafter simply referred to as equipment) have been enabled to perform remote control operations by using a mobile communication terminal over a communication network, such as the internet or a mobile telephone network.

A user uses an application program (hereinafter simply termed a program) distributed by a provider of the service, and connects to a server providing the service. Thus, the user is able to perform remote control of user-owned equipment in accordance with a service menu provided by the provider.

Also, such a service is typically used by having the user perform authentication using a user account that is registered ahead of time.

Using services from a plurality of providers requires a user account for each of the services. Thus, authentication must also be performed separately. The exchange of data among different services is such that remote control operations of equipment for different services are not performed easily.

Conventional technology has been proposed and used for associating accounts belonging to a single user of two services, and uses the OAuth protocol in a scheme to enable secure access to data on each service (see Non-Patent Literature 1).

A first provider using the OAuth scheme provides an application programming interface (hereinafter, API) for authentication and so on of access to the first provider's service. Then, a second provider is able to provide a linking service that links to the first provider's service by embedding the provided API into a program supplied by the second provider. This enables secure access to the service.

Accordingly, the program provided by the second provider enables the linking service to be provided and to use data from the first provider in user authentication for using the first provider's service and so on.

Citation List

Non-Patent Literature

[Non-Patent Literature 1]
Internet Engineering Task Force (IETF), RFC 5849, The OAuth 1.0 Protocol, April 2010

SUMMARY

However, the OAuth protocol provides a one-to-one link between services. A user using a plurality of services must therefore find servers from each service provider for corresponding providers. Furthermore, an API must be developed for authentication performed with each possible pair of services. Therefore, the provider must perform new development work for programs and the like to be supplied to the user with each new service supplied.

Also, as the number of used services increases, the combinations of linked services grow dramatically. For the user, this greatly complicates the registration operation for using the linking service.

One non-limiting and exemplary Embodiment provides an intermediation method enabling a simple registration operation to be performed by the user in order to use the linking service, without requiring the development of an API or the like for performing authentication with each pair of services.

In one general aspect, the techniques disclosed here feature an intermediation method used in a system that includes an intermediation device determining, when a linking service is used, a permission for a plurality of application services requiring user authentication on a network, the intermediation method comprising: a registration mode of registering linking permission information; and a linked service execution mode of executing the linking service, wherein the registration mode involves: receiving a first account used for a first application service, a second account used for a second application service, and a registration request for using the linking service linking the first application service and the second application service; performing a first authentication of authenticating the first account as valid; performing a second authentication of authenticating the second account as valid; and storing, when the first authentication and the second authentication are both affirmative, the linking permission information associating the first account and the second account with each other in the intermediation device, and the linked service execution mode involves: receiving a usage request from one of the first application service and the second application service, for using another one of the first application service and the second application service; determining whether or not the first application service and the second application service are associated with each other by referencing the linking permission information; and permitting the one of the first application service and the second application service to use the other one of the first application service and the second application service upon determining affirmatively.

With the above structure, the intermediation method enables linking permission information to be stored by the intermediation device. Thus, providers need only develop an API for accessing the intermediation device and need not modify the API for additional services. As such, for the user, adding new services for use with the linking service is made easier through the use of a familiar registration operation.

These general and specific aspects may be implemented using a device. Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 3 illustrates an example of account data 1000 configuration and content.

FIG. 8 illustrates an example of account data 1100 configuration and content.

FIG. 15 illustrates an example of account data 1200 configuration and content.

FIG. 29 illustrates an example of account data 1010 configuration and content.

FIG. 42 illustrates an example of account data 1030 configuration and content pertaining to Variation 2.

FIG. 43 illustrates an example of account data 1040 configuration and content pertaining to Variation 3.

FIG. 44 illustrates an example of account data 1050 configuration and content pertaining to Variation 4.

DETAILED DESCRIPTION

1. Embodiment 1

1.1 Overview

An intermediation system 1 is described below, pertaining to Embodiment 1 and using an intermediation method of the present disclosure.

Figure 1:
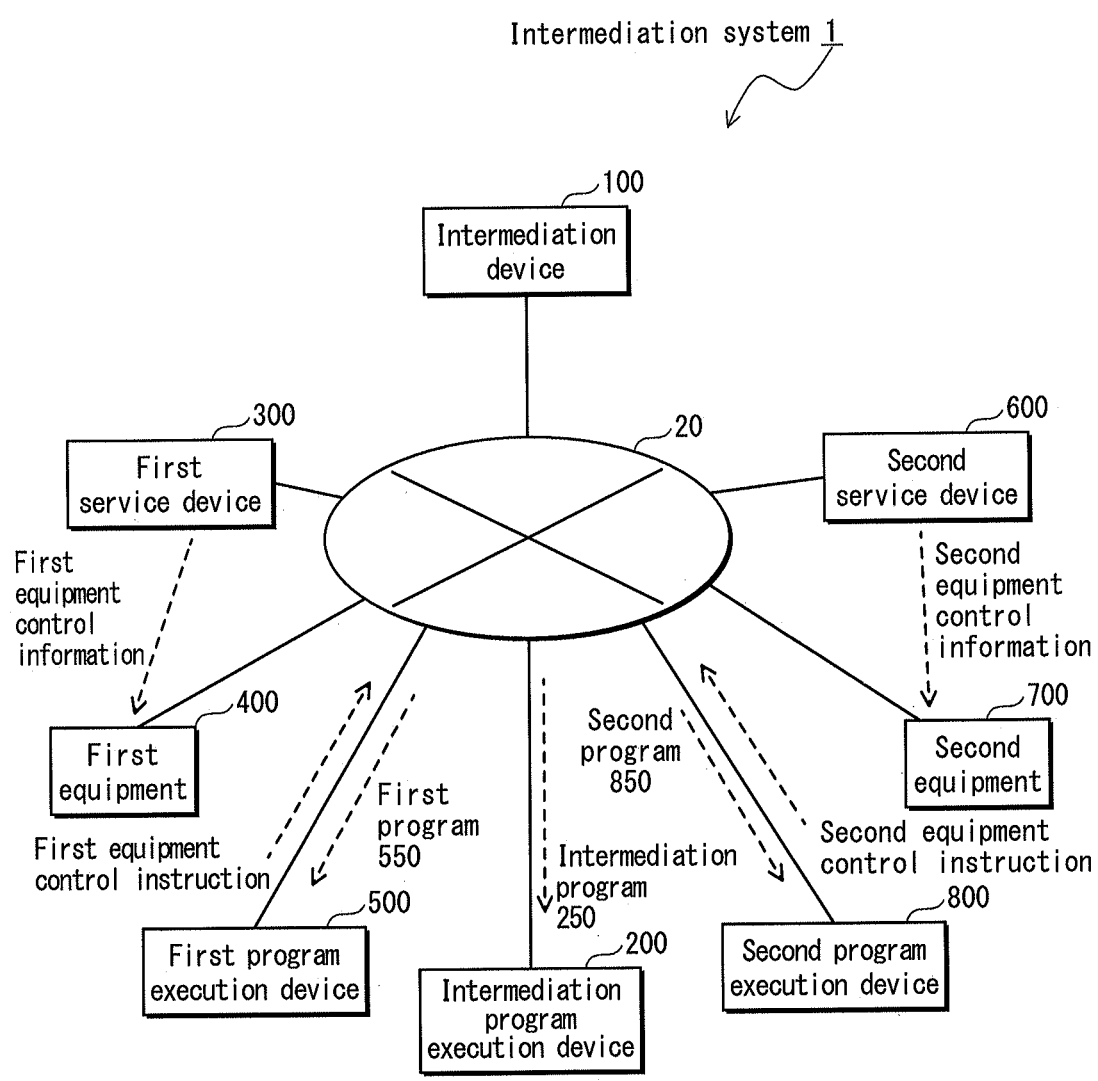
FIG. 1 is an overall schematic diagram showing the system configuration of an intermediation system 1 pertaining to Embodiment 1.

FIG. 1 is an overall schematic diagram showing the system configuration of the intermediation system 1.

The intermediation system 1 includes an intermediation device 100, an intermediation program execution device 200, a first service device 300, a first equipment 400, a first program execution device 500, a second service device 600, a second equipment 700, a second program execution device 800, and a network 20. The details of these components are described later.

A user using only a first service uses the first program execution device 500 (e.g., a mobile communication terminal) to connect to the first service device 300 via the network 20, and causes the first service device 300 to perform a remote control operation of the first equipment 400. Similarly, a user using only a second service uses the second program execution device 800 (e.g., a mobile communication terminal) to connect to the second service device 600 via the network 20, and causes the second service device 600 to perform a remote control operation of the second equipment 700.

Conventionally, linking the first service and the second service requires a method of authenticating respective service accounts by using the OAuth protocol. However, the user may, for instance, wish to use a linking service for linking to the second service from the first program execution device 500, which is currently executing a first program for using the first service. In such a case, the OAuth protocol requires that the first program have a way to access to the second service device in order to perform authentication enabling use of the second service. Therefore, a service provider must incorporate processing for connecting to a third-party service in order to provide a linking service to other service providers, and must do so for all combinations of programs to which the user applies the linking service for using the provided services. This imposes a need to develop and correct the supplied program for each new service.

Also, the number of service providers increases as the user makes use of linked service from newly-added service providers, which in turn rapidly increases the number of combinations. This complicates the authentication operation and decreases usability.

However, a user of the intermediation system 1 of the present Embodiment executes an intermediation program 250 through the intermediation program execution device 200, and is thereby able to connect to the intermediation device 100 via the network 20 to perform a registration process of associating user accounts for using the linking service with the first service and the second service.

The registration process is performed with the intermediation device 100. Thus, the intermediation program 250 need only connect to the intermediation device 100, and does not connect to any new service device despite new service providers being added. Therefore, no program corrections are required.

Also, for example, the first program and the second program do not require knowledge of each other's service device in order to perform authentication, even when the linking service is used with the first service device and the second service device. Simply connecting to the intermediation device 100 and associating the accounts using the linking service is sufficient. Accordingly, adding a new service device from a new service provider does not require a new development of authentication processing.

From the user's perspective, using a service from a new service provider only requires a one-time registration on the intermediation device for associating with the linking service. The linking service is usable afterward without requiring complicated authentication operations.

1.2 Intermediation System 1

The intermediation device 100 is connected to each of the intermediation program execution device 200, the first service device 300, the first equipment 400, the first program execution device 500, the second service device 600, the second equipment 700, and the second program execution device 800, via the network 20.

(Intermediation Device 100)

Figure 2:
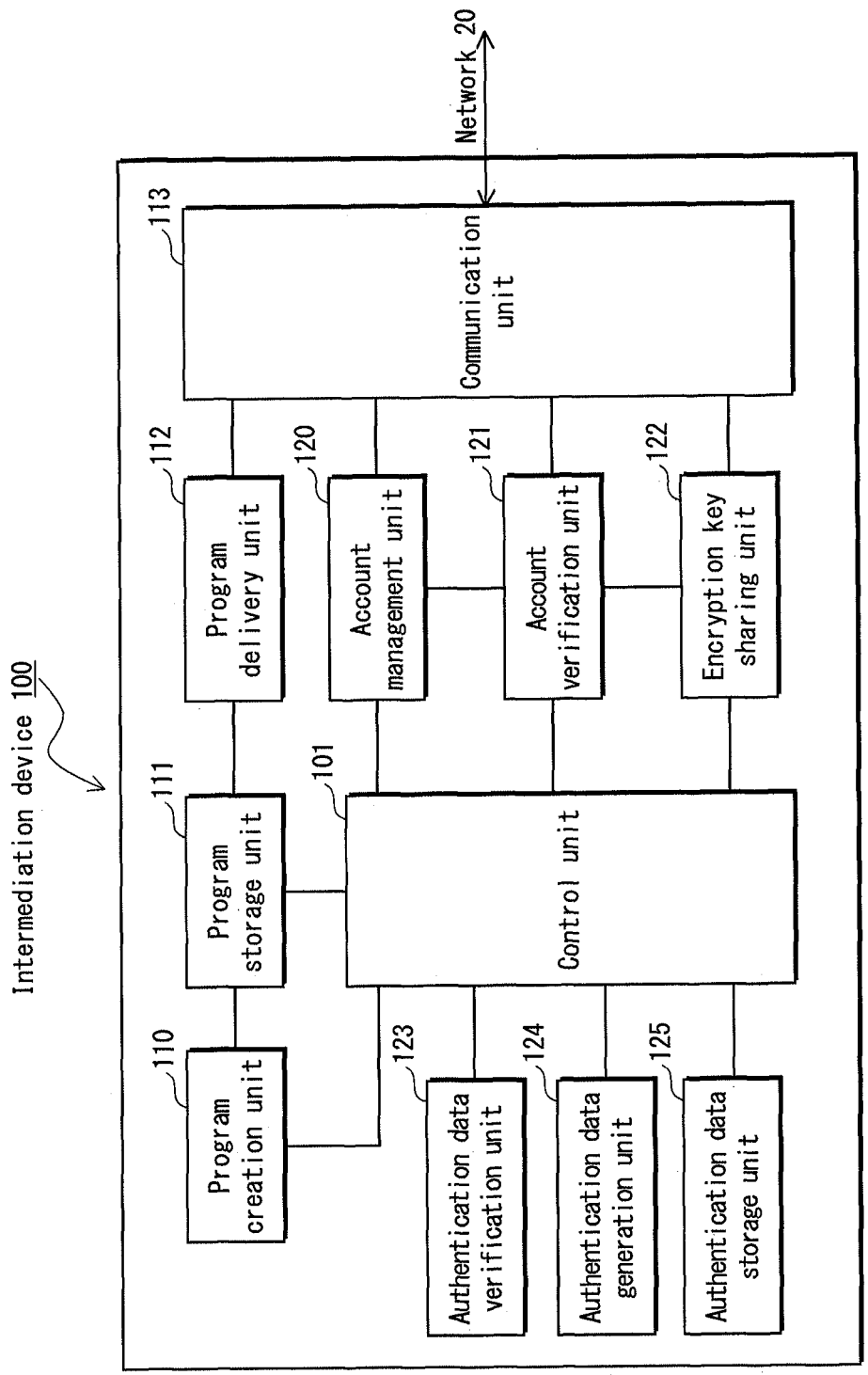
FIG. 2 is a functional block diagram of the main functions of an intermediation device 100.

As shown in FIG. 2, the intermediation device 100 includes a control unit 101, a program creation unit 110, a program storage unit 111, a program delivery unit 112, a communication unit 113, an account management unit 120, an account verification unit 121, an encryption key sharing unit 122, an authentication data verification unit 123, an authentication data generation unit 124, and an authentication data storage unit 125.

Specifically, the intermediation device 100 is a computer system made up of a microprocessor, ROM, RAM, a hard disk drive, and so on. The RAM or the hard disk drive stores a computer program. The microprocessor realises the functions of the intermediation device 100 by operating in accordance with the computer program.

(Control Unit 101)

The control unit 101 is a microprocessor, for example, and controls the functions of the program creation unit 110, the program storage unit 111, the program delivery unit 112, the communication unit 113, the account management unit 120, the account verification unit 121, the encryption key sharing unit 122, the authentication data verification unit 123, the authentication data generation unit 124, and the authentication data storage unit 125.

The control unit 101 receives a request for the intermediation program 250 from the intermediation program execution device 200 via the network 20 and the communication unit 113. Upon receiving the request for the intermediation program 250, the control unit 101 causes the program delivery unit 112 to read the intermediation program 250 from the program storage unit 111.

The control unit 101 then causes the communication unit 113 to transmit the intermediation program 250 read from the program delivery unit 112 to the intermediation program execution device 200 via the network 20.

The details of the intermediation program 250 are provided later.

(Program Creation Unit 110, Program Storage Unit 111, Program Delivery Unit 112)

The program creation unit 110 creates the intermediation program 250 for performing an association operation between user accounts for linking services. The program creation unit 110 writes the created intermediation program 250 into the program storage unit 111.

The program storage unit 111 is specifically memory, and stores the intermediation program 250 created by the program creation unit 110.

The program delivery unit 112 outputs the intermediation program 250 to the network 20 via the communication unit 113.

(Communication Unit 113)

The communication unit 113 transmits and receives data to and from the first service device 300, the second service device 600, the first program execution device 500, the second program execution device 800, and the intermediation program execution device 200, via the network 20.

Specifically, the communication unit 113 uses a secure means to transfer and receive user information, such as a first service user account and password, encrypted service authentication data, and so on, to and from the first service device 300 and the first program execution device 500 via the network 20.

Also, the communication unit 113 uses the secure means to transfer and receive user information, such as a second service user account and password, encrypted service authentication data, and so on, to and from the second service device 600 and the second program execution device 800 via the network 20.

In addition, the communications unit 113 transmits and receives the first service user account and password, the second service user account and password, and the encrypted service authentication data to and from the intermediation program execution device 200.

(Account Management Unit 120, Account Verification Unit 121, Encryption Key Sharing Unit 122)

The account management unit 120 creates, stores, and manages account data 1000, which indicates associations between accounts for the linking service.

FIG. 3 illustrates an example of account data 1000 configuration and content.

As shown, the account data 1000 includes a first service account column 1001, a first service encryption key column 1002, a service authentication data column 1003, an encrypted service authentication data column 1004, and a second service account column 1005, each stored in association.

The first service account column 1001 indicates a user account for using the first service when the linking service is used with the first service and the second service.

The first service encryption key column 1002 indicates an encryption key used to encrypt service authentication data when transferring and receiving the service authentication data to and from the first program execution device 500 and the second program execution device 800.

The service authentication data column 1003 indicates service authentication data generated by the authentication data generation unit 124 and allocated to each user account for the first service.

The encrypted service authentication data column 1004 indicates information encrypted using the first service encryption key listed in the first service encryption key column 1002.

The second service account column 1005 indicates a user account for using the second service when the linking service is used with the first service and the second service.

In the examples, user account 0101 for the first service is stored in association with encryption key 9428 listed in the first service encryption key column 1002, service authentication data 0101-2013-04-15-18-20, encrypted service authentication data 9472839471738, and a user account 0201 for the second service when used with the linking service.

When user account 0110 for the first service is associated with a blank item in the second service account column 1005, this indicates that no user account for linking the second service has been registered.

In order to ensure secure communication, the encryption key sharing unit 122 stores encryption keys used to encrypt transmitted data and to decrypt received data. Specifically, the encryption key sharing unit 122 stores a private key as well as respective public keys for the first service device 300 and the second service device 600.

When registering the association between user accounts for using the linking service with the first service and the second service, the account verification unit 121 verifies that the respective user accounts are legitimate, and that the linking service has been granted usage permission for the user accounts, every time the linking service is used.

Specifically, for example, the intermediation program execution device 200 encrypts a user-entered account and password for the first service through an input unit 241 of the intermediation program execution device 200 and transmits the encrypted data through the network 20. The intermediation program execution device 200 then decrypts the encrypted data using the encryption keys stored in the encryption key sharing unit 122 to authenticate the user account and password as legitimate account information by making a query to the first service device 300. The same method is used for the second service user account, to authenticate the user account as legitimate by making a query to the second service device 600.

(Authentication Data Verification Unit 123, Authentication Data Generation Unit 124, Authentication Data Storage Unit 125)

When there has been a request from the user to associate user accounts of the first service and the second service in order to use the linking service, the authentication data generation unit 124 generates service authentication data to check whether or not data has been tampered with at the association stage, whether the request is for an invalid association, and so on.

The authentication data storage unit 125 is memory, for example, and stores the service authentication data generated by the authentication data generation unit 124.

The authentication data verification unit 123 verifies the validity of the service authentication data transmitted and received between the first service device, second service device, and the intermediation program execution device, every time the registration process is performed to associate respective user accounts of the first service and the second service for using the linking service.

(Intermediation Program Execution Device 200, First Program Execution Device 500, Second Program Execution Device 800)

Figure 4:
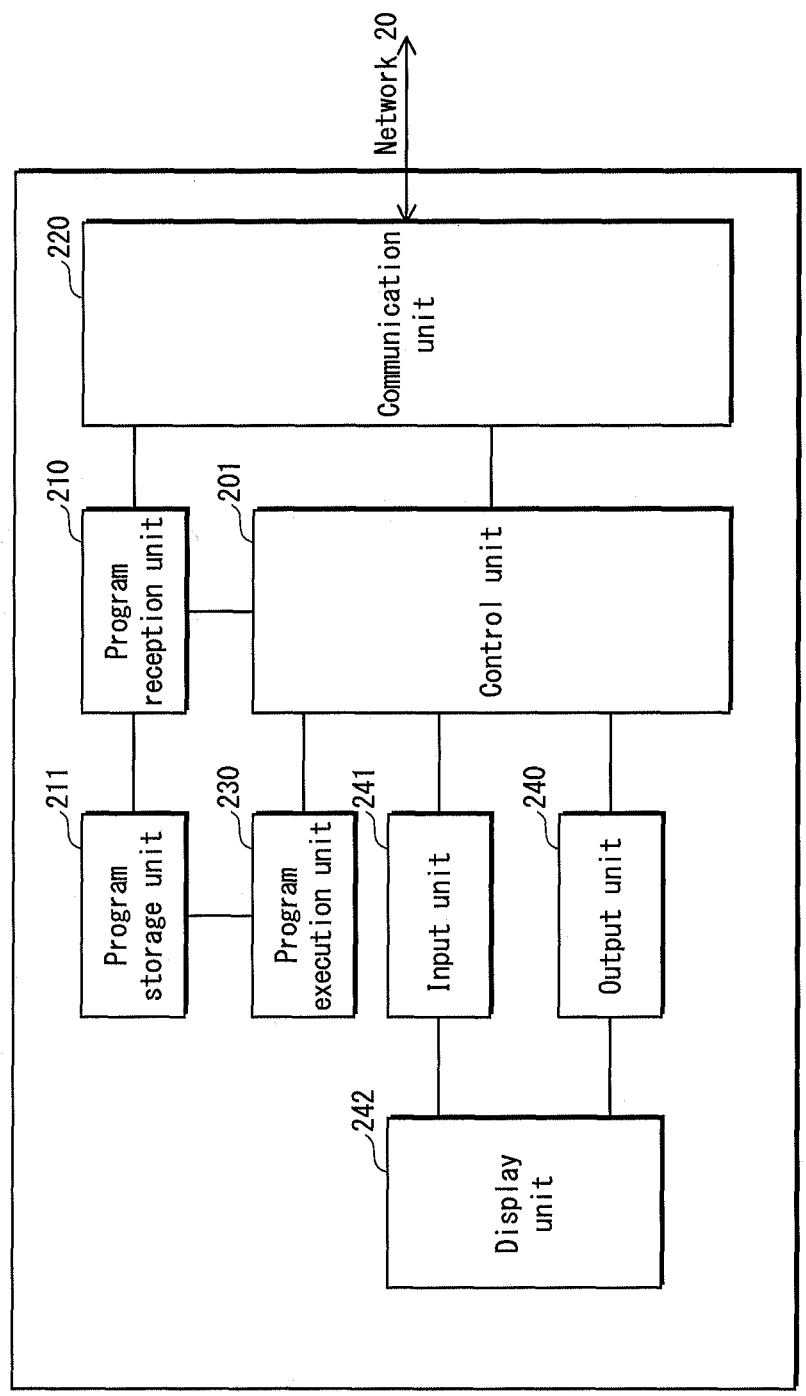
FIG. 4 is a functional block diagram of the main components of an intermediation program execution device 200, a first program execution device 500, and a second program execution device 800.

FIG. 4 is a functional block diagram of the main components of the intermediation program execution device 200, the first program execution device 500, and the second program execution device 800.

As shown, the intermediation program execution device 200, the first program execution device 500, and the second program execution device 800 each include a control unit 201, a program reception unit 210, a program storage unit 211, a communication unit 220, a program execution unit 230, an output unit 240, an input unit 241, and a display unit 242.

Also, the first program execution device 500 and the second program execution device 800 respectively include the control unit 201, the program reception unit 210, the program storage unit 211, the communication unit 220, the program execution unit 230, the output unit 240, the input unit 241, and the display unit 242, as shown in FIG. 4.

Specifically, the intermediation program execution device 200, the first program execution device 500, and the second program execution device 800 are a computer system including a microprocessor, ROM, RAM, a hard disk device, a display device, an input device, and so on. The RAM or the hard disk drive stores a computer program. The microprocessor realises the functions of the intermediation program execution device 200, the first program execution device 500, and the second program execution device 800 by operating in accordance with the computer program.

The intermediation program execution device 200, the first program execution device 500, and the second program execution device 800 need not be separate devices, but need only be separate programs on a device at least able to switch therebetween. For example, a mobile communication terminal, such a smartphone or tablet, may be used.

The intermediation program execution device 200, the first program execution device 500, and the second program execution device 800 are identical in terms of main functional blocks. The functions differ only in the programs executed by the program execution unit 230.

The intermediation program execution device 200 is described first. Explanations of the first program execution device 500 are provided only where differences from the intermediation program execution device 200 exist.

(Control Unit 201)

The control unit 201 controls the program reception unit 210, the program storage unit 211, the communication unit 220, the program execution unit 230, the output unit 240, the input unit 241, the display unit 242.

The control unit 201 receives a user instruction and makes a request for the intermediation program 250 to the intermediation device 100. The intermediation program 250 output by the program delivery unit 112 of the intermediation device 100 is received by the program reception unit 210, and the control unit 201 causes the program storage unit 211 to store the received program.

(Program Reception Unit 210, Program Storage Unit 211)

The program reception unit 210 receives, via the communication unit 220, the intermediation program 250 in response to the request for the intermediation program transmitted by the control unit 101 to the intermediation device 100, and outputs the received intermediation program 250 to the program storage unit 211.

The program storage unit 211 is, for example, a non-transitory memory or hard disk drive storing the intermediation program 250 output by the program reception unit 210. In accordance with instructions from the control unit 201, the program storage unit 211 also outputs the intermediation program 250 stored therein to the program execution unit 230.

(Communication Unit 220)

The communication unit 220 transmits and receives data to and from the intermediation device 100 via the network 20.

Specifically, the communication unit 220 uses a secure means to transfer and receive user information, such as the first service user account and password, the second service user account and password, and the encrypted service authentication data to and from the intermediation device 100 via the network 20.

(Program Execution Unit 230)

The program execution unit 230 is, for example, a processor executing the intermediation program 250 stored in the program storage unit 211 in accordance with information input by the user through the input unit 241.

(Output Unit 240, Input Unit 241, Display Unit 242)

The output unit 240 is controlled by the control unit 201 so as to output information and a user interface for display on the display unit 242. Specifically, the output unit 240 outputs a user interface for a linkage permission checking menu to the display unit 242 in accordance with processing by the intermediation program 250 being executed by the program execution unit 230.

The input unit 241 receives operation instructions and data from the user of the intermediation program execution device 200.

Specifically, the input unit 241 receives the instruction to acquire the intermediation program 250, the first service user account and password, the second service user account and password, a log-in necessity, a start-up operation for the intermediation program 250, and information pertaining to usage permissions when using the first service user account and the second service with the linking service. The input unit 241 then outputs the received instructions and data to the control unit 201.

The display unit 242 includes a liquid crystal display (hereinafter, LCD), for example, presents information to the user, and displays the user interface or the like prompting the user for input.

Specifically, the display unit 242 displays the linkage permission checking menu and the like output by the output unit 240, for example, according to processing by the intermediation program 250 executing the program execution unit 230.

Figure 5:
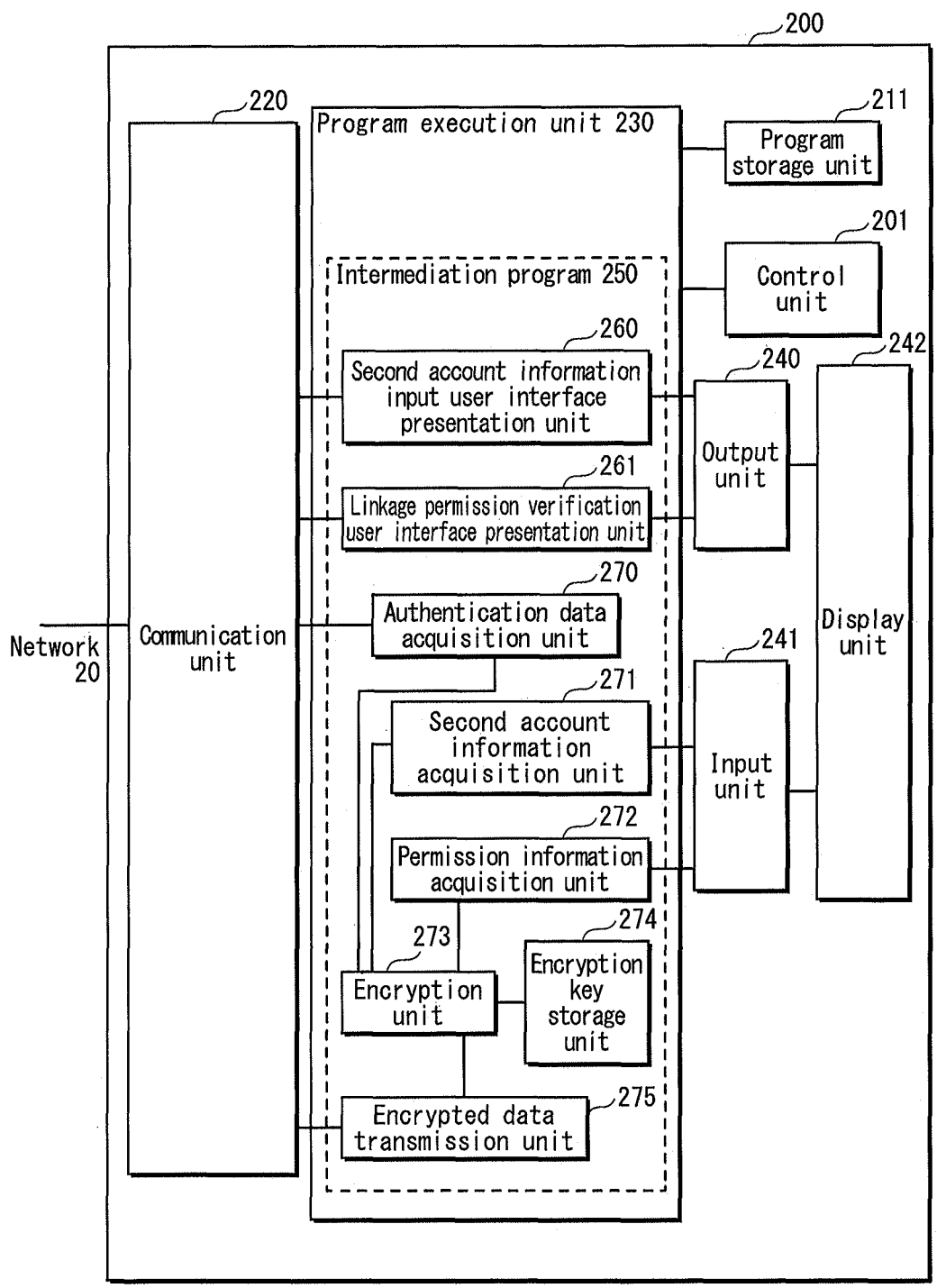
FIG. 5 is a functional configuration diagram of an intermediation program 250 as operated by the intermediation program execution device 200.

FIG. 5 is a functional configuration diagram of the intermediation program 250 as operated by the intermediation program execution device 200.

The intermediation program 250 includes a second account information input user interface presentation unit 260, a linkage permission verification user interface presentation unit 261, an authentication data acquisition unit 270, a second account information acquisition unit 271, a permission information acquisition unit 272, an encryption unit 273, an encryption key storage unit 274, and an encrypted data transmission unit 275.

(Second Account Information Input User Interface Presentation Unit 260, Linkage Permission Verification User Interface Presentation Unit 261)

When a linkage permission request for the second service is made from the user account of the first service, the second account information input user interface presentation unit 260 authenticates the second service account by displaying a user interface on the display unit 242 for entering the second service user account and password.

In order to use the linking service with the first service and the second service, the linkage permission verification user interface presentation unit 261 displays a user interface on the display unit 242 for performing a permission verification pertaining to the association between the user accounts of the first service and the second service.

Figure 6:
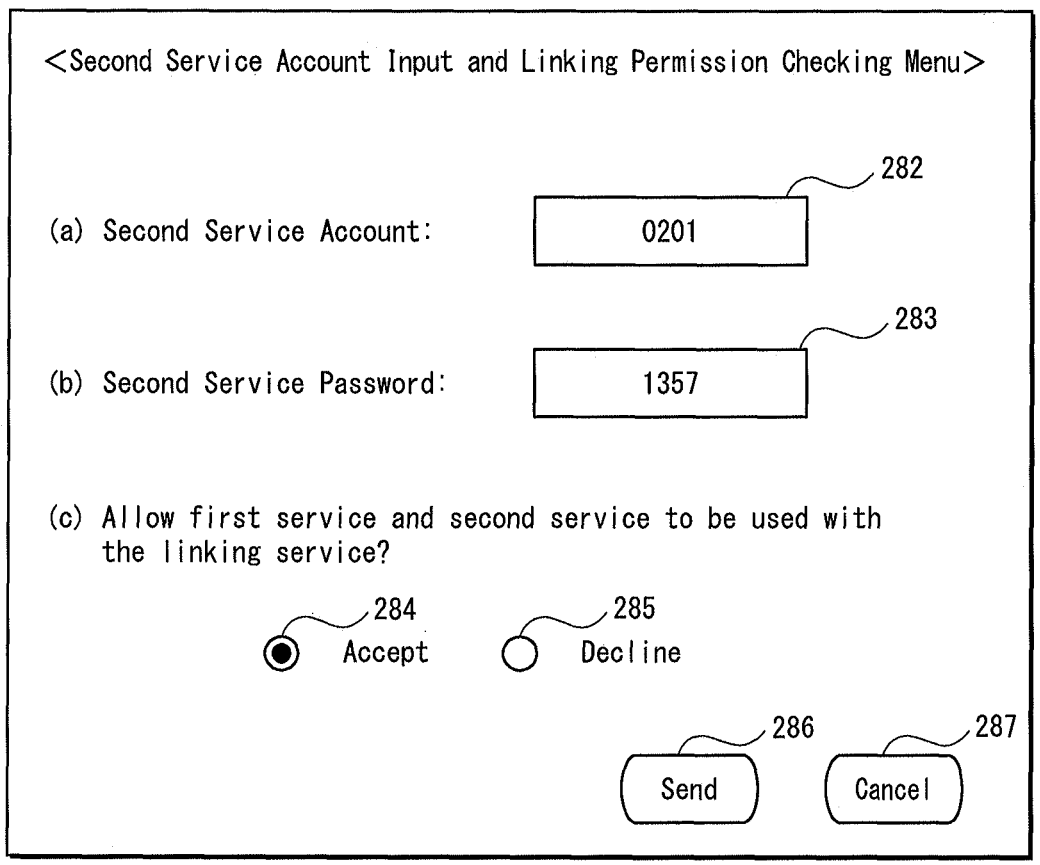
FIG. 6 shows an example of a user interface presented to the user for permission to link a first service and a second service.

FIG. 6 illustrates user interface 281 for entering a second service account and selecting whether or not to grant linkage permission.

As shown, input field 282 is provided for input of a second service user account to be linked with the first service user account. The user inputs the user account to be used in linking.

Also, input field 283 is provided for input of a password set for the user account input in input field 282. The user enters the password associated with the user account input in input field 282.

Radio buttons 284 and 285 enable the user to confirm whether or not linking the first service and the second service should be permitted, by selecting one of the radio buttons. In FIG. 6, radio button 284 is selected to indicate granting permission.

Transmit button 286 enables a transmission instruction for transmitting the information input in the input fields and the radio button selection to the intermediation device 100.

Once the user enters the above-described input and touches transmit button 286, the input information and selection are transmitted to the intermediation device 100.

Also, cancel button 287 is provided to cancel input. Once the user touches cancel button 287, the intermediation program execution device 200 ends the execution of the intermediation program 250 without performing any further processing.

(Authentication Data Acquisition Unit 270)

The authentication data acquisition unit 270 receives the encrypted service authentication data transmitted by the intermediation device 100 from the first program execution device 500 executing the first program. In the present Embodiment, a single terminal serves as both the first program execution device 500 and the intermediation program execution device 200. Thus, for example, the intermediation program 250 may access a memory area where the encrypted service authentication data are stored by the first program 550.

The authentication data acquisition unit 270 outputs the encrypted service authentication data so received to the encryption unit 273.

(Second Account Information Acquisition Unit 271, Permission Information Acquisition Unit 272)

The second account information acquisition unit 271 acquires the second service user account and password as input by the user through user interface 281 displayed on the display unit 242 by the second account information input user interface presentation unit 260. The acquired information pertaining to the second user account and password is output to the encryption unit 273.

The permission information acquisition unit 272 acquires the permission information regarding the linking service usage, as selected by the user through user interface 281. The permission information so acquired is also output to the encryption unit 273.

(Encryption Unit 273, Encryption Key Storage Unit 274, Encrypted Data Transmission Unit 275)

The encryption unit 273 determines whether or not the information received from the permission information acquisition unit 272 indicates permission to use the linking service. According to the determination results, the encrypted service authentication data received from the authentication data acquisition unit 270 and the second account information acquired from the second account information acquisition unit 271 are encrypted using the encryption key in the encryption key storage unit 274 and output to the encrypted data transmission unit 275.

The encryption key storage unit 274 stores the encryption key used by the encryption unit 273 for encrypting data.

The encrypted data, transmission unit 275 transmits the encrypted data received from the encryption unit 273 to the intermediation device 100 via the communication unit 220.

(First Program Execution Device 500)

The first program execution device 500 is configured identically to the intermediation program execution device 200 in terms of basic functional blocks.

The only point of difference is that the first program 550 is received by the program reception unit 210, stored by the program storage unit 211, and executed by the program execution unit 230.

Therefore, the information input to the input unit 241, output by the output unit 240, and displayed by the display unit 242 also differs.

The details of the first program 550 are provided later.

(Output Unit 240, Input Unit 241, Display Unit 242)

The basic functions of the output unit 240 are same as those of the output unit 240 in the intermediation program execution device 200. Specifically, the output unit 240 outputs a log-in user interface for the first service device 300 and an operation menu user interface for operating the first equipment 400 to the display unit 242, in accordance with processing by the first program 550 executing the program execution unit 230.

The input unit 241 receives operation instructions and data from the user of the first program execution device 500.

Specifically, the input unit 241 receives the instruction to acquire the first program 550, the first service user account and password, the log-in necessity, a start-up operation for the first program 550, information pertaining to usage permissions when using the first service user account and the second service user account with the linking service, a request for equipment information, and information pertaining to a remote control operation of the equipment. The input unit 241 then outputs the received instructions and data to the control unit 201. An instruction pertaining to remote control operation of the equipment includes a remote control operation instruction. The remote control operation instruction specifically includes, for example, an instruction for switching power ON or OFF on equipment 400-1.

The basic functions of the display unit 242 are same as those of the intermediation program execution device 200.

Specifically, the display unit 242 displays log-in menu user interface, the equipment operation menu and the like output by the output unit 240, for example, according to processing by the first program 550 executing the program execution unit 230.

(Second Program Execution Device 800)

The second program execution device 800 is configured identically to the first program execution device 500 in terms of basic functional blocks.

The only point of difference is that the second program 850 is received by the program reception unit 210, stored by the program storage unit 211, and executed by the program execution unit 230.

Therefore, the information input to the input unit 241, output by the output unit 240, and displayed by the display unit 242 also differs.

The details of the second program 850 are provided later.

(Output Unit 240, Input Unit 241, Display Unit 242)

The basic functions of the output unit 240 are same as those of the output unit 240 in the first program execution device 500. Specifically, the output unit 240 outputs a log-in user interface for the second service device 600 and an operation menu user interface for operating the second equipment 700 to the display unit 242, in accordance with processing by the second program 850 executing the program execution unit 230.

The input unit 241 receives operation instructions and data from the user of the second program execution device 800.

Specifically, the input unit 241 receives the instruction to acquire the second program 850, the second service user account and password, the log-in necessity, a start-up operation for the second program 850, information pertaining to usage permissions when using the first service user account and the second service with the linking service, a request for equipment information, and information pertaining to a remote control operation of the equipment. The input unit 241 then outputs the received instructions and data to the control unit 201. An instruction pertaining to remote control operation of the equipment includes a remote control operation instruction. The remote control operation instruction specifically includes, for example, an instruction for switching power ON or OFF on equipment 700-1.

The basic functions of the display unit 242 are same as those of the first program execution device 500.

Specifically, the display unit 242 displays log-in menu user interface, the equipment operation menu, and the like, output by the output unit 240, for example, according to processing by the second program 850 executing the program execution unit 230.
(First Service Device 300)

Figure 7:
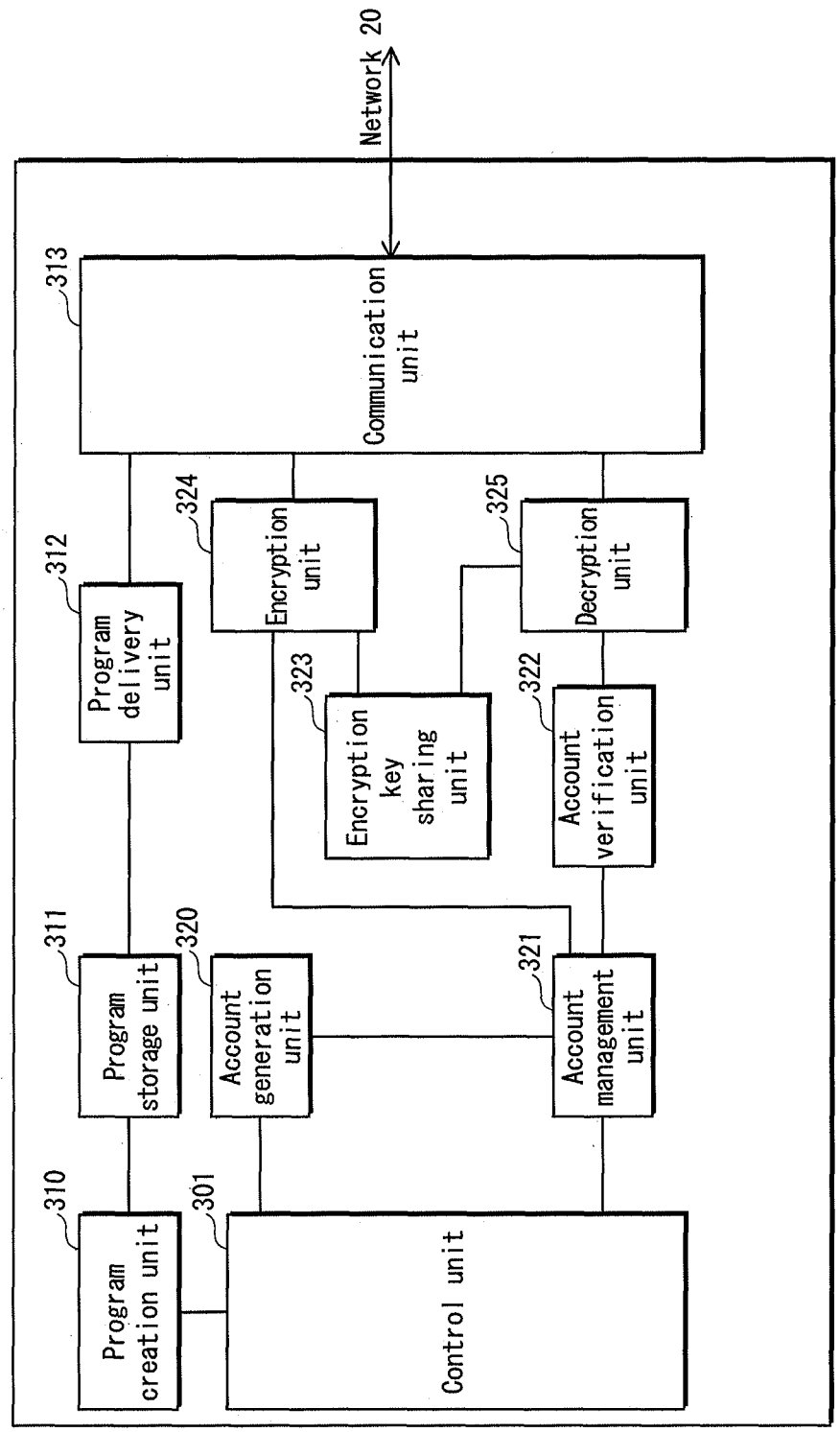
FIG. 7 is a functional block diagram of the main functions of a first service device 300.

As shown in FIG. 7, the first service device 300 includes a control unit 301, a program creation unit 310, a program storage unit 311, a program delivery unit 312, a communication unit 313, an account generation unit 320, an account management unit 321, an account verification unit 322, an encryption key sharing unit 323, an encryption unit 324, and a decryption unit 325.

Specifically, the service device 300 is a computer system made up of a microprocessor, ROM, RAM, a hard disk drive, and so on. The RAM or the hard disk drive stores a computer program. The microprocessor realises the functions of the intermediation device 100 by operating in accordance with the computer program.

(Control Unit 301)

The control unit 301 controls the program creation unit 310, the program storage unit 311, the program delivery unit 312, the communication unit 313, the account generation unit 320, the account management unit 321, the account verification unit 322, the encryption key sharing unit 323, the encryption unit 324, and the decryption unit 325.

The control unit 301 receives a request for the first program 550 from the first program execution device 500 via the network 20 and the communication unit 113. Upon receiving the request for the first program 550, the control unit 301 causes the program delivery unit 312 to read the first program 550 from the program storage unit 311.

The control unit 301 then causes the communication unit 313 to transmit the first program 550 read from the program delivery unit 312 to the first program execution device 500 via the network 20.

The details of the first program 550 are provided later.
(Program Creation Unit 310, Program Storage Unit 311, Program Delivery Unit 312)

The program creation unit 310 creates the first program 550 enabling the user to perform operations when using the first service. The program creation unit 310 writes the created first program 550 into the program storage unit 311.

The program storage unit 311 is specifically memory, and stores the first program 550 created by the program creation unit 310.

The program delivery unit 312 outputs the first program 550 to the network 20 via the communication unit 313.
(Communication Unit 313)

The communication unit 313 transmits and receives data to and from the intermediation device 100, the second service device 600, and the first program execution device 500, via the network 20.

Specifically, the communication unit 313 uses a secure means to transfer and receive user information, such as a first service user account and password, encrypted service authentication data, and so on, to and from the intermediation device 100 and the first program execution device 500 via the network 20.
(Account Generation Unit 320, Account Management Unit 321, Account Verification Unit 322)

The account generation unit 320 generates a user account for specifying the user using the first service. The user account so generated is also output to the account management unit 321.

The account management unit 321 stores and manages account data 1100 in association with the account generated by the account generation unit 320 and a password used for verification when the user uses the first service.

FIG. 8 illustrates an example of account data 1100 configuration and content and stored and managed by the account management unit 321.

As shown, the account data 1100 includes a first service account column 1101, a first service password column 1102, a first service encryption key column 1103, and an owned equipment column 1004.

The first service account column 1101 indicates a user account identifying the user using the first service.

The first service password column 1102 indicates a password for the user account identified by the first service account 1101.

The first service encryption key column 1103 indicates an encryption key used to encrypt and decrypt the first service account, the first service password, equipment control instruction information, and so on, securely transmitted and received over the network 20 to and from the intermediation device 100, the first equipment 400, and the first program execution device 500.

The owned equipment equipment 1104 indicates equipment information for identifying the first equipment 400 controlled through the user account indicated in the first service account column 1101.

In the example of FIG. 8, user account 0101 for the first service account is associated with first service password 7531, and stored in association with 9428 in the first service encryption key column 1103 and 400-1 in the owned equipment column 1104.
(Encryption Key Sharing Unit 323, Encryption Unit 324, Decryption Unit 325)

The encryption key sharing unit 323 reads the first service encryption key associated with the user account used for the first service from the account management unit 321, and stores the encryption key used by the encryption unit 324 for encrypting data when performing transmission over the network 20 via the communication unit 313.

The encryption unit 324 uses the encryption key stored in the encryption key sharing unit 323 to encrypt data for transmission to the intermediation device 100, the first equipment 400, and the first program execution device 500 over the network 20. The encrypted data are also output to the communication unit 313.
(First Equipment 400)

Figure 9:
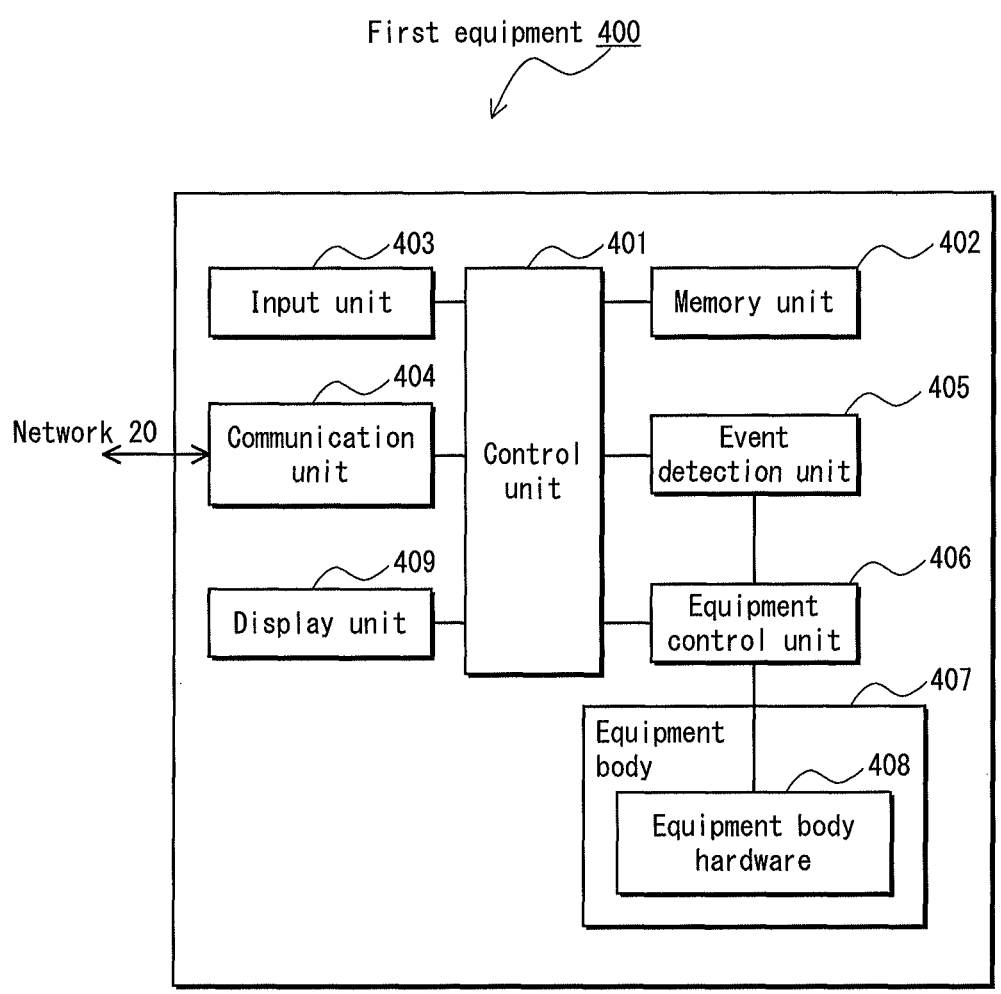
FIG. 9 is a functional block diagram of the main functions of a first equipment 400.

As shown in FIG. 9, the first equipment 400 includes a control unit 401, a memory unit 402, an input unit 403, a communication unit 404, an event detection unit 405, an equipment control unit 406, an equipment body 407, equipment body hardware 408, and a display unit 409.
(Control Unit 401, Memory Unit 402)

The control unit 401 is, for example, a processor executing a program stored in the memory unit 402, thereby causing the first equipment 400 to realise the following two functions:

Event Detection Function: Controlling the event detection unit 405 to detect a type of operation instruction made to the equipment by the user, and to detect what type of function has been executed by the equipment.

Communication Control Function: Controlling the communication unit 404 to transmit motion information output from the event detection unit 405 to the first service device 300, and to receive operation instruction information for the first equipment 400 from the first service device 300.

Also, the memory unit 402, which includes RAM, ROM, and a flash memory, stores programs defining the operations of the control unit 401.

(Event Detection Unit 405)

The event detection unit 405 is controlled by the control unit 401 to detect an operation instruction performed on the equipment body 407 by the user, and to detect function execution by the equipment body 407. Operation information pertaining to detected operations and motion is also output to the control unit 401.

The functions of the event detection unit 405 are realised by the processor of the first equipment 400 executing the program stored in the memory unit 402.

(Input Unit 403, Display Unit 409)

The input unit 403 receives an operation by the user for the first equipment 400.

The input unit 403 is an operation panel provided on the first equipment 400, for example.

The display unit 409 displays an operation state of the first equipment 400, an operation menu for directly controlling the first equipment 400, and so on, to the user. The display unit 409 is a display device such as a screen, for example.

(Communication Unit 404)

The communication unit 404 includes a Large-Scale Integration (hereinafter, LSI) for communication, and is controlled by the control unit 401. The LSI for communication transmits and receives data, for example, using TCP/IP protocol, http protocol, or the like to communicate with an external server over the Internet. The communication unit 404 transmits motion information from the first equipment 400, obtained by the event detection unit 405 from the equipment control unit 406, to the first service device 300. The communication unit 404 also receives operation instructions and the like from the first service device 300, and outputs the received instructions to the control unit 401.

The functions of the communication unit 404 are realised by the processor of the first equipment 400 executing the program stored in the memory unit 402.

(Equipment Control Unit 406, Equipment Body 407)

The equipment control unit 406 performs control to direct the various functions of the equipment body 407. The equipment control unit 406 also outputs operation information produced when controlling the equipment to direct the functions thereof, and operation information output by the equipment itself, to the event detection unit 405.

The functions of the equipment control unit 406 are realised by the processor of the first equipment 400 executing the program stored in the memory unit 402.

The equipment body hardware 408 is the main component of the equipment body 407.

The equipment body hardware 408 is a group of hardware components connected to, and controlled by, the equipment control unit 406. Through the control of the equipment control unit 406, the first equipment 400, which is an electronic device, realises the functions of the hardware components. For example, when the first equipment 400 is a lighting apparatus, the equipment body hardware 408 is a hardware group made up of a light-emitting diode (hereinafter, LED), a dimmer circuit, a power supply circuit, and so on, realising the functions of the lighting apparatus.

The following describes the first program 550, used for a remote control operation of the first equipment, for executing a registration mode in which the first service and the second service are linked in the linking service, and a linking service execution mode.

Figure 10:
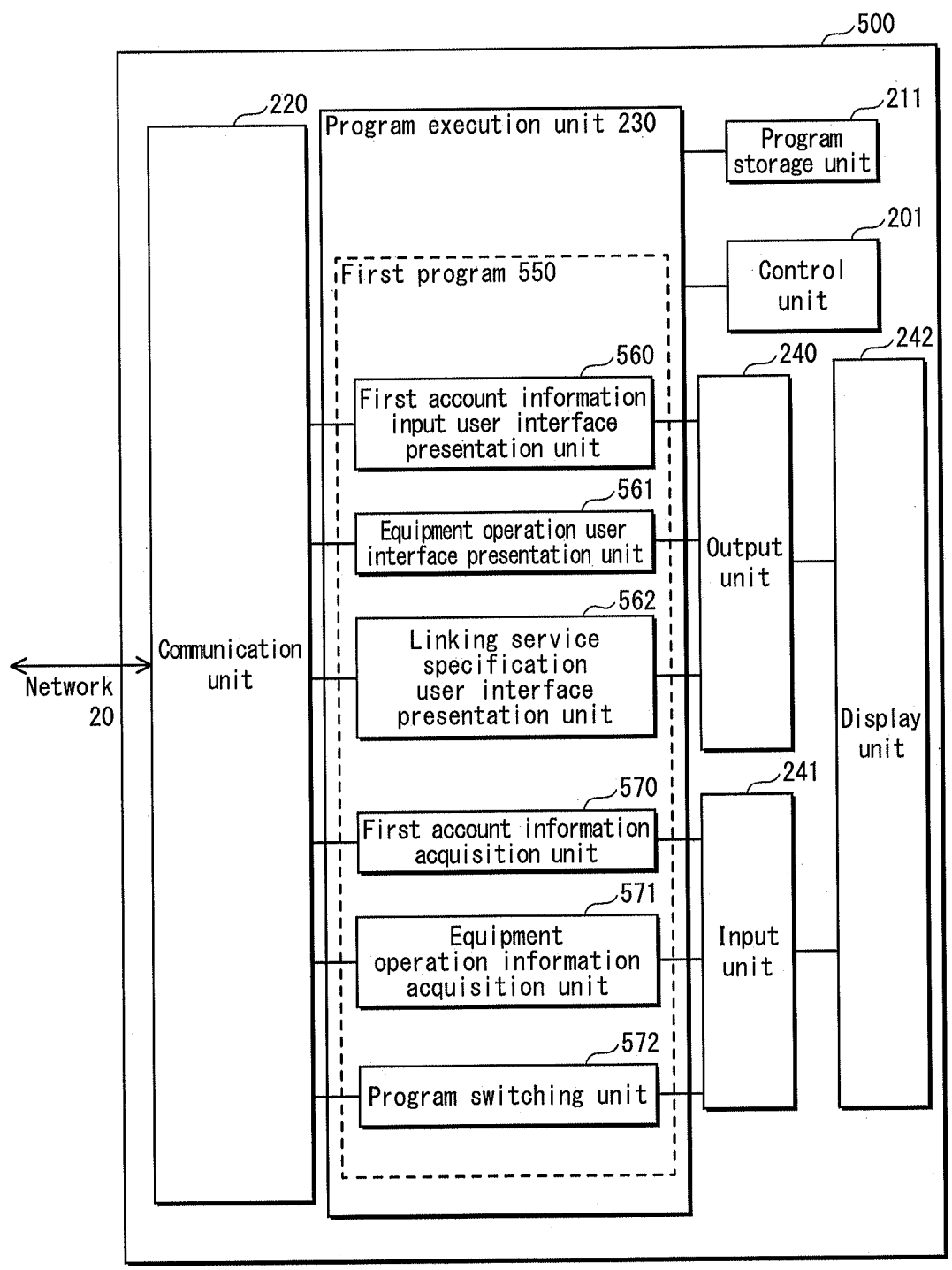
FIG. 10 is a functional configuration diagram of a first program 550 as operated by the first program execution device 500.

FIG. 10 is a functional configuration diagram of the first program 550 as operated by the first program execution device 500.

The first program 550 includes a first account information input user interface presentation unit 560, an equipment operation user interface presentation unit 561, a linking service specification user interface presentation unit 562, a first account information acquisition unit 570, an equipment operation information acquisition unit 571, and a program switching unit 572.

(First Account Information Input User Interface Presentation Unit 560, Equipment Operation User Interface Presentation Unit 561, Linking Service Specification User Interface Presentation Unit 562)

The first account information input user interface presentation unit 560 outputs, to the output unit 240, a user interface for allowing the user to input the user account and password for logging into the first service device to use the first service, and causes the display unit 242 to display that user interface.

Figure 11:
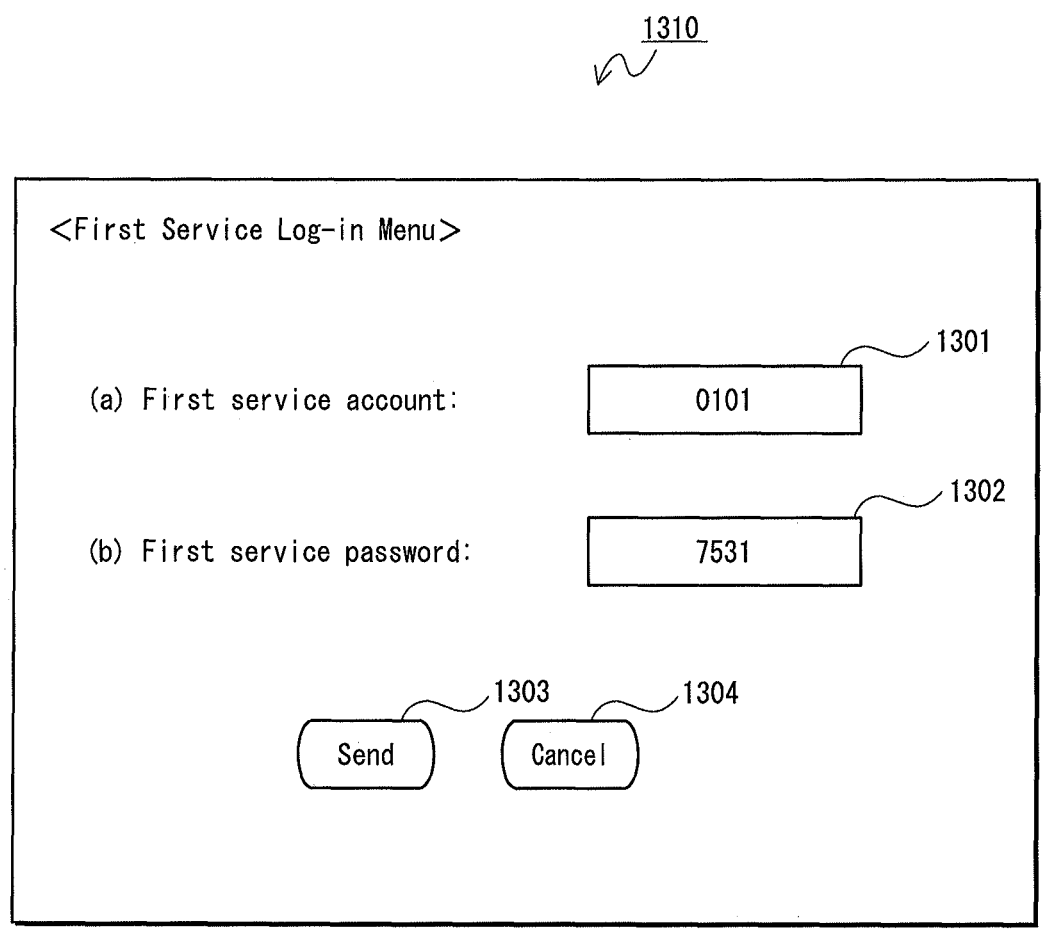
FIG. 11 illustrates an example of a log-in user interface 1310 presented to the user to log-in to the first service.

FIG. 11 illustrates user interface 1310, which is an example of a user interface for input of the user account and password allowing the user to log in.

User interface 1310 includes a user account input field 1301, a password input field 1302, a transmit button 1303, and a cancel button 1304.

Transmit button 1303 enables the user to make a transmission instruction for transmitting the information input to the input unit 241, including the user account in input field 1301 and the password in input field 1302, to the first service device 300.

Cancel button 1304 enables a cancellation instruction for ending the use of the first service and ending the processing of the first program.

The equipment operation user interface presentation unit 561 outputs, to the output unit 240, a user interface enabling the user to make a remote control instruction to equipment registered with the first service device in advance, and displays the user interface on the display unit 242.

Figure 12:
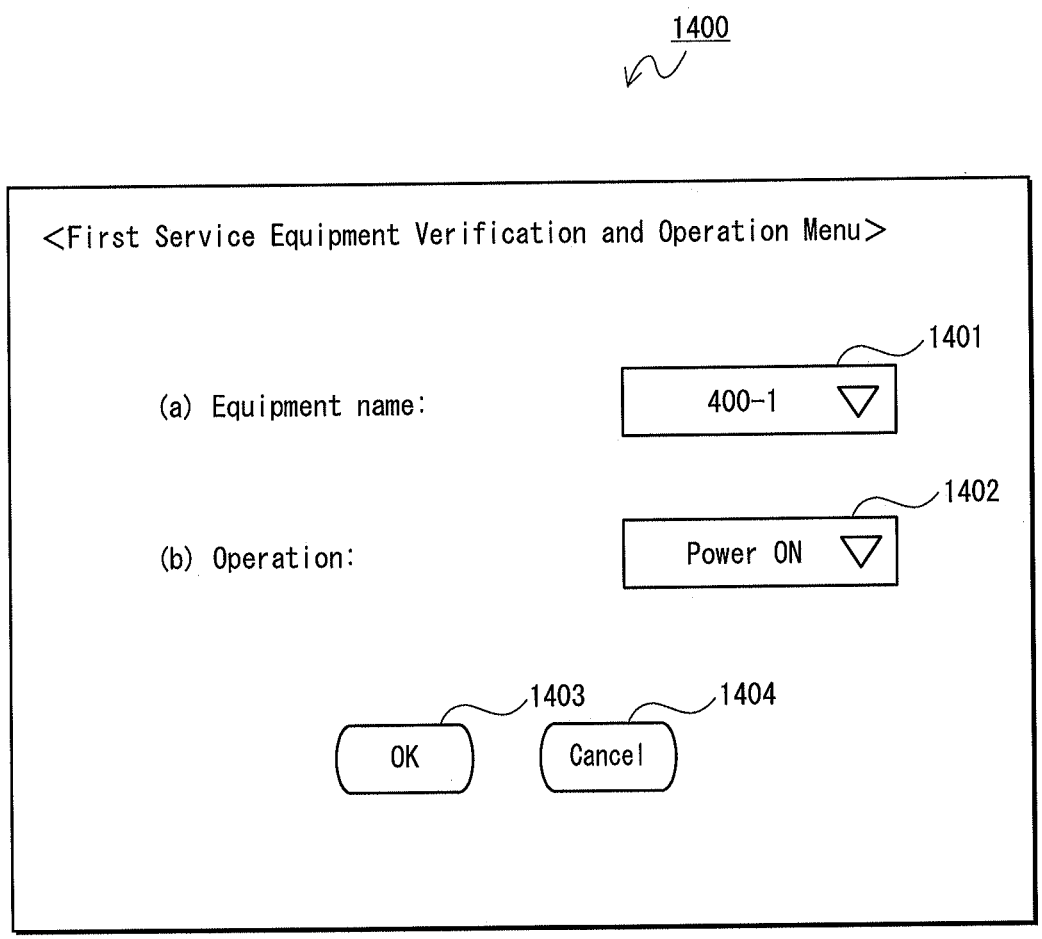
FIG. 12 illustrates an example of an equipment authentication and operation menu user interface 1400 for using the first service.

FIG. 12 illustrates user interface 1400 which is an example of a user interface for performing a remote control operation of equipment registered in advance by the user.

User interface 1400 includes selection list 1401 for selecting the first equipment to be controlled, selection list 1402 for selecting a control type, a setting button 1403, and a cancel button 1404.

In this example, selection list 1401 lists first equipment 400-1 as the equipment name, and a power ON instruction is selected as the remote control operation to be performed on first equipment 400-1.

The linking service specification user interface presentation unit 562 specifies another service to be linked with the first service, and outputs a user interface to the output unit 240 and to the display unit 242 for making an instruction regarding whether or not to switch processing to another user account for using the linking service.

Figure 13:
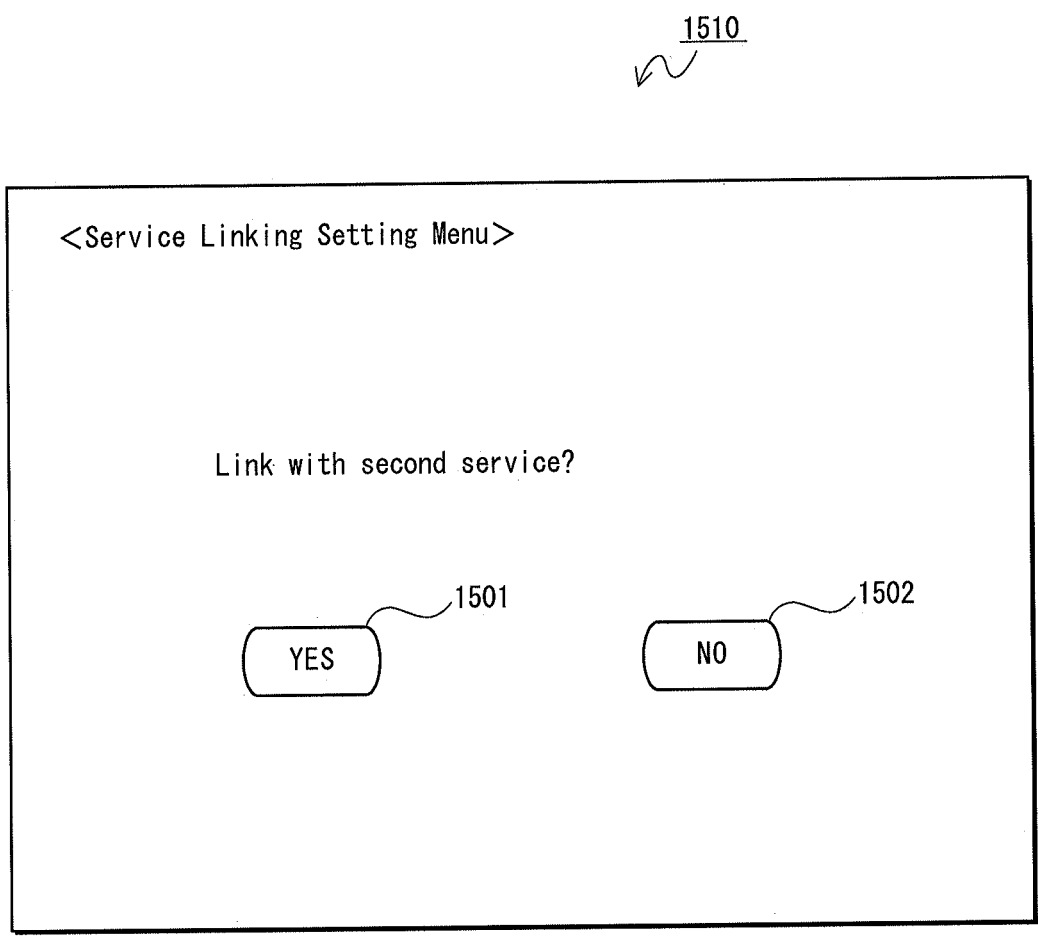
FIG. 13 illustrates an example of a permission query user interface for using the first service and the second service with the linking service.

FIG. 13 illustrates user interface 1510, which is an example of a user interface for allowing the user to select whether or not to proceed with processing for associating the user account for using the linking service with the first service and the second service.

User interface 1510 includes a YES button 1510 and a NO button 1502.

Here, YES button 1501 is provided to make an instruction to proceed with processing of associating the user accounts.

Also, NO button 1502 is provided to make an instruction to not proceed with processing of associating the account for use of the linking service with the second service.

The user touches YES button 1501 to associate the account for use of the linking service with the second service, and touches NO button 1502 otherwise. This action sends an instruction.

(First Account Information Acquisition Unit 570, Equipment Operation Information Acquisition Unit 571)

The first account information acquisition unit 570 acquires first account information, including the user account and password entered by the user using the input unit 241, in accordance with user interface 1310 displayed on the display unit 242 by the first account information input user interface presentation unit 560. The first account information so acquired is also output to the first service device 300 via the communication unit 220.

The equipment operation information acquisition unit 571 acquires remote equipment operation information, including the first equipment subject to the control operation and information regarding an operation instructions for the equipment, input by the user using the input unit 241 in accordance with user interface 1400 displayed on the equipment operation user interface presentation unit 561 by the display unit 242. The equipment operation information so acquired is also output to the first service device 300 via the communication unit 220.

(Program Switching Unit 572)

The program switching unit 572 determines whether or not to proceed with associating the account for using the linking service input by the user using the input unit 241, in accordance with user interface 1510 displayed on the display unit 242 by the linking service specification user interface presentation unit 562. When there is a determination such that association with the account for using the linking service proceeds, the intermediation program 250 is called and activated so as to perform switching.

(Second Service Device 600)

The second service device 600 is essentially identical to the first service device 300. The explanation of the common functionality is omitted, and only points of difference are described below.

Figure 14:
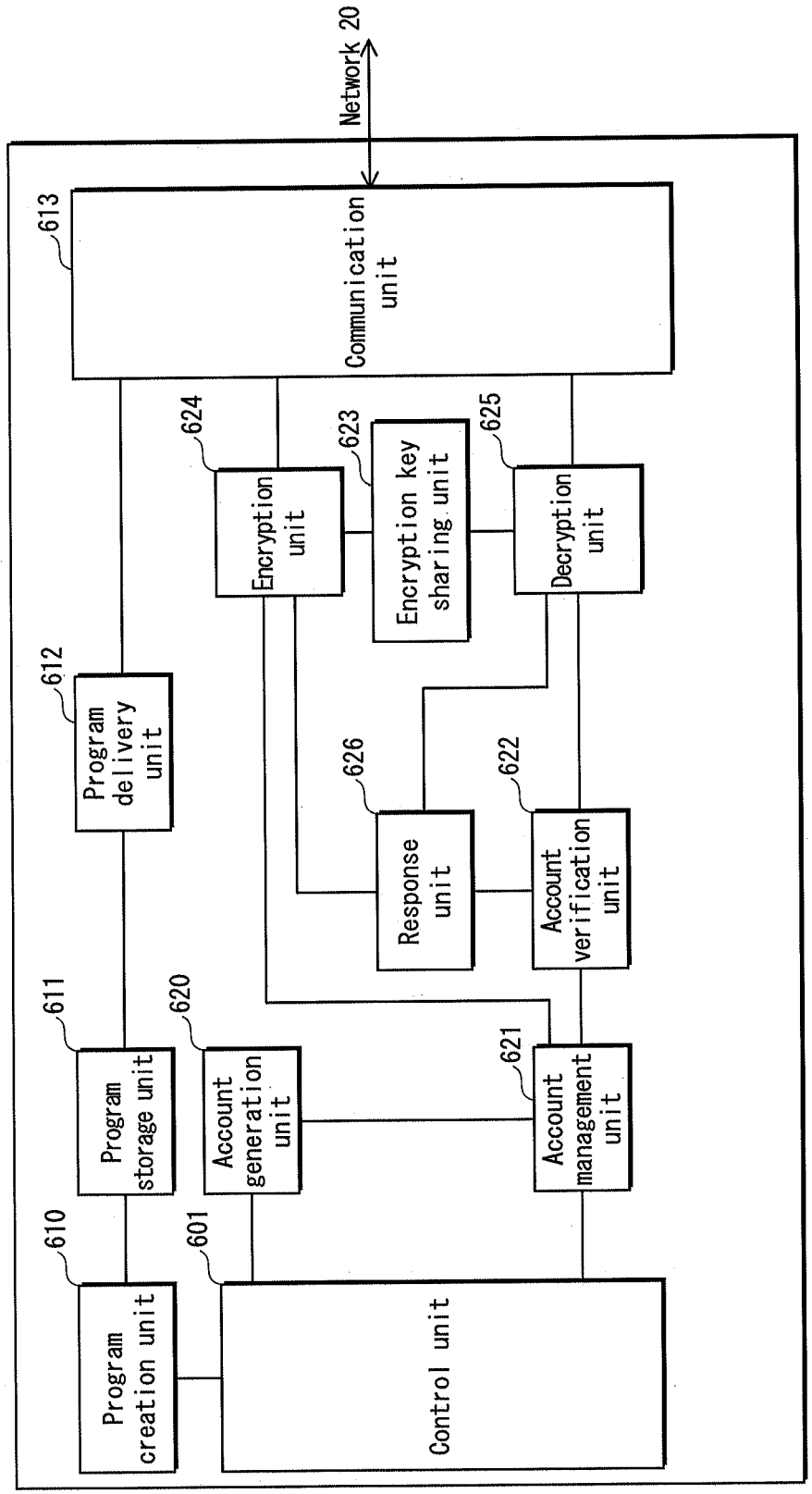
FIG. 14 is a functional block diagram of the main functions of a second service device 600.

As shown in FIG. 14, the second service device 600 includes a control unit 601, a program creation unit 610, a program storage unit 611, a program delivery unit 612, a communication unit 613, an account generation unit 620, an account management unit 621, an account verification unit 622, an encryption key sharing unit 623, an encryption unit 624, a decryption unit 625, and a response unit 626.

The functional blocks of the control unit 601 program creation unit 610, the program storage unit 611, the program delivery unit 612, the communication unit 613, the account generation unit 620, the account management unit 621, the account verification unit 622, the encryption key sharing unit 623, the encryption unit 624, and the decryption unit 625 respectively correspond to the functional blocks of FIG. 7, namely the control unit 301, the program creation unit 310, the program storage unit 311, the program delivery unit 312, the communication unit 313, the account generation unit 320, the account management unit 321, the account verification unit 322, the encryption key sharing unit 323, the encryption unit 324, and the decryption unit 325 of the first service device 600. Accordingly, the second service device 600 differs from the first service device 300 in the addition of the response unit 626.

Another point of difference is that the data for first service program, the first service user account, and the first service password are replaced with data for the second service program, the second service user account, and the second service password.

(Response Unit 626)

The response unit 626 transmits encrypted service authentication data, which includes information output by the intermediation program execution device 200 and received via the intermediation device 100, to the intermediation program 250. Specifically, the response unit 626 transmits the encrypted service authentication data to the intermediation device 100 when the account verification unit 622 has determined that the second service user account and password are valid.

(Account Management Unit 621)

FIG. 15 illustrates an example of account data 1200 configuration and content as stored and managed by the account management unit 621.

As shown, the account data 1200 includes a second service account column 1201, a second service password column 1202, a second service encryption key column 1203, and an owned equipment column 1204.

Aside from substituting the term "first" with the term "second", the second service account column 1201, the second service password column 1202, the second service encryption key column 1203, and the owned equipment column 1204 are identical to the corresponding columns of account data 1100 shown in FIG. 8, and explanations thereof are thus omitted.

In the example of FIG. 15, user account 0201 for the second service account is associated with second service password 2468, and stored in association with 6489 in the second service encryption key column 2103 and 700-3 in the owned equipment column 1204.

(Second Equipment 700)

Figure 16:
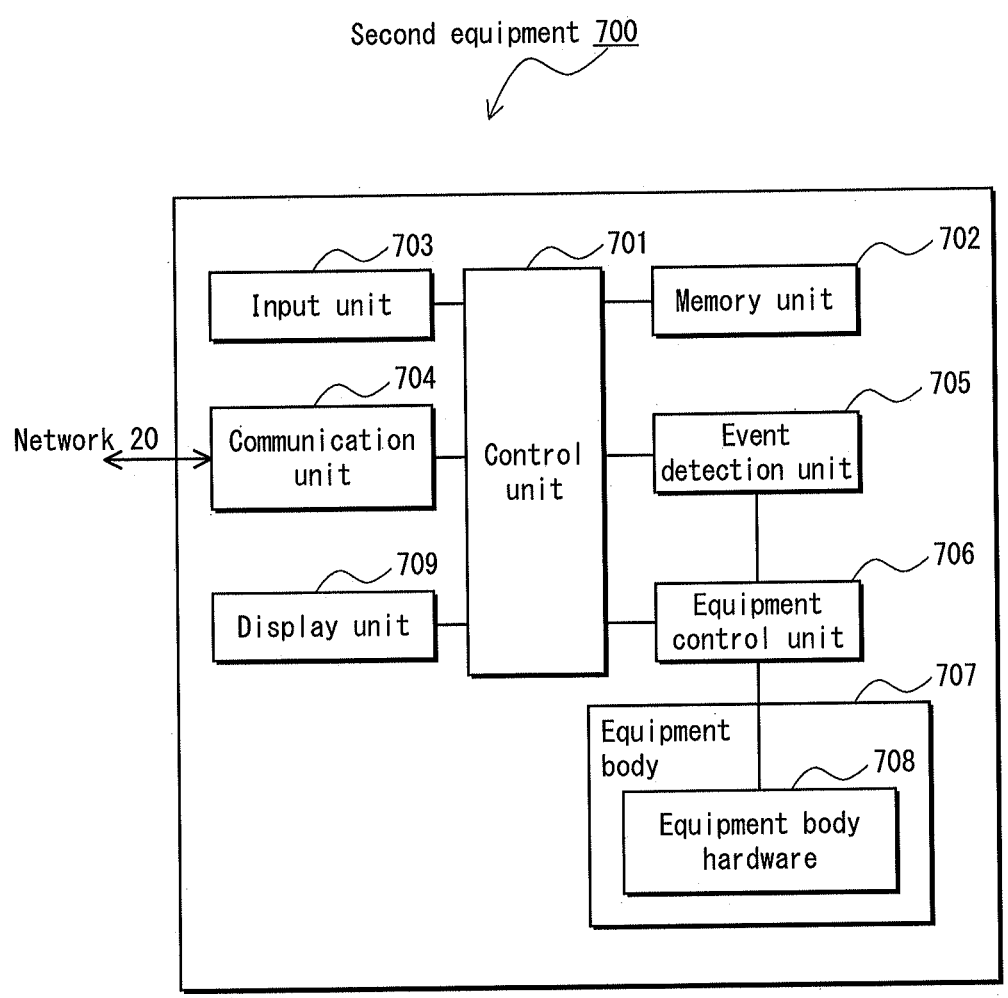
FIG. 16 is a functional block diagram of the main functions of a second equipment 700.

As shown in FIG. 16, the second equipment 700 includes a control unit 701, a memory unit 702, an input unit 703, a communication unit 704, an event detection unit 705, an equipment control unit 706, an equipment body 707, equipment body hardware 708, and a display unit 709.

The second equipment 700 is configured identically to the first equipment 400, and explanations thereof are thus omitted.

The control unit 701, the memory unit 702, the input unit 703, the communication unit 704, the event detection unit 705, the equipment control unit 706, the equipment body 707, the equipment body hardware 708, and the display unit 709 respectively correspond to the control unit 401, the memory unit 402, the input unit 403, the communication unit 404, the event detection unit 405, the equipment control unit 406, the equipment body 407, the equipment body hardware 408, and the display unit 409 of the first equipment 400, illustrated in FIG. 9.

Figure 17:
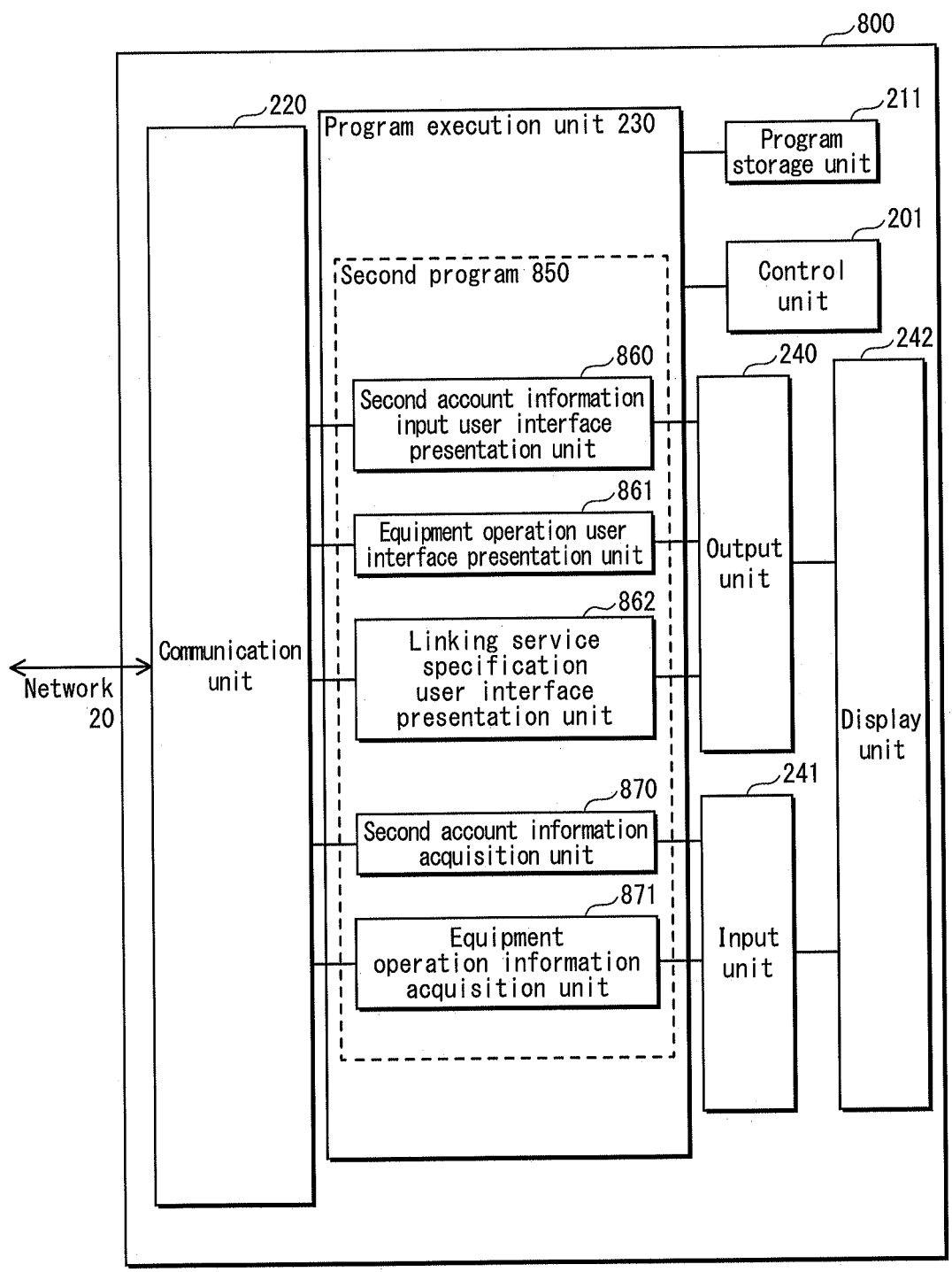
FIG. 17 is a functional configuration diagram of a second program 850 as operated by the second program execution device 800.

FIG. 17 is a functional configuration diagram of the second program 550 as operated by the second program execution device 800.

The second program 850 includes a second account information input user interface presentation unit 860, an equipment operation user interface presentation unit 861, a linking service specification user interface presentation unit 862, a second account information acquisition unit 870, and an equipment operation information acquisition unit 871.

(Second Account Information Input User Interface Presentation Unit 860, Equipment Operation User Interface Presentation Unit 861, Linking Service Specification User Interface Presentation Unit 862)

The second account information input user interface presentation unit 860 outputs, to the output unit 240, a user interface for allowing the user to input the user account and password for logging into the second service device to use the second service, and causes the display unit 242 to display that user interface.

Figure 18:
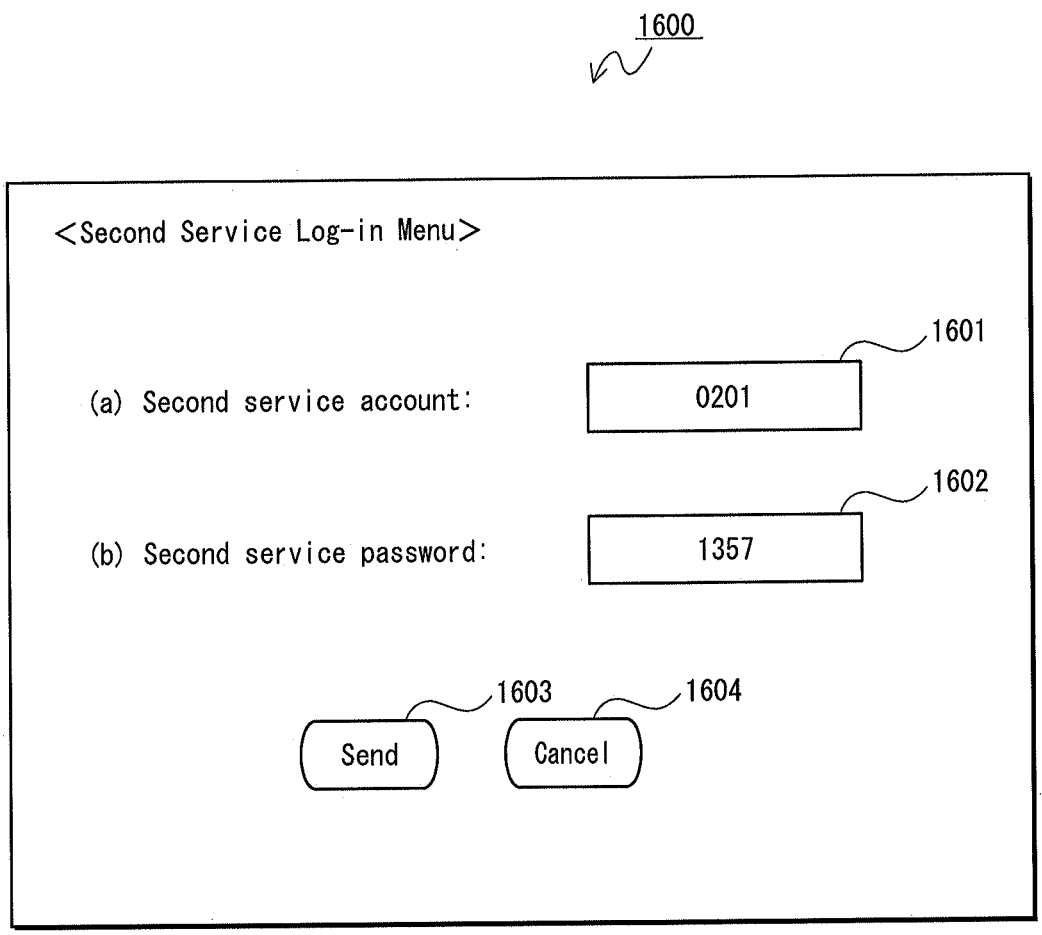
FIG. 18 illustrates an example of a log-in user interface 1600 presented to the user to log-in to the second service.

FIG. 18 illustrates user interface 1600, which is an example of a user interface for input of the user account and password allowing the user to log in.

User interface 1600 includes a user account input field 1601, a password input field 1602, a transmit button 1603, and a cancel button 1604.

Transmit button 1603 enables the user to make a transmission instruction for transmitting the information input to the input unit 241, including the user account in input field 1601 and the password in input field 1602, to the second service device 600.

Cancel button enables a cancellation instruction for ending the use of the second service and ending the processing of the second program.

The equipment operation user interface presentation unit 861 outputs, to the output unit 240, a user interface enabling the user to make a remote control instruction to equipment registered with the second service device 300 in advance, and displays the user interface on the display unit 242.

Figure 19:
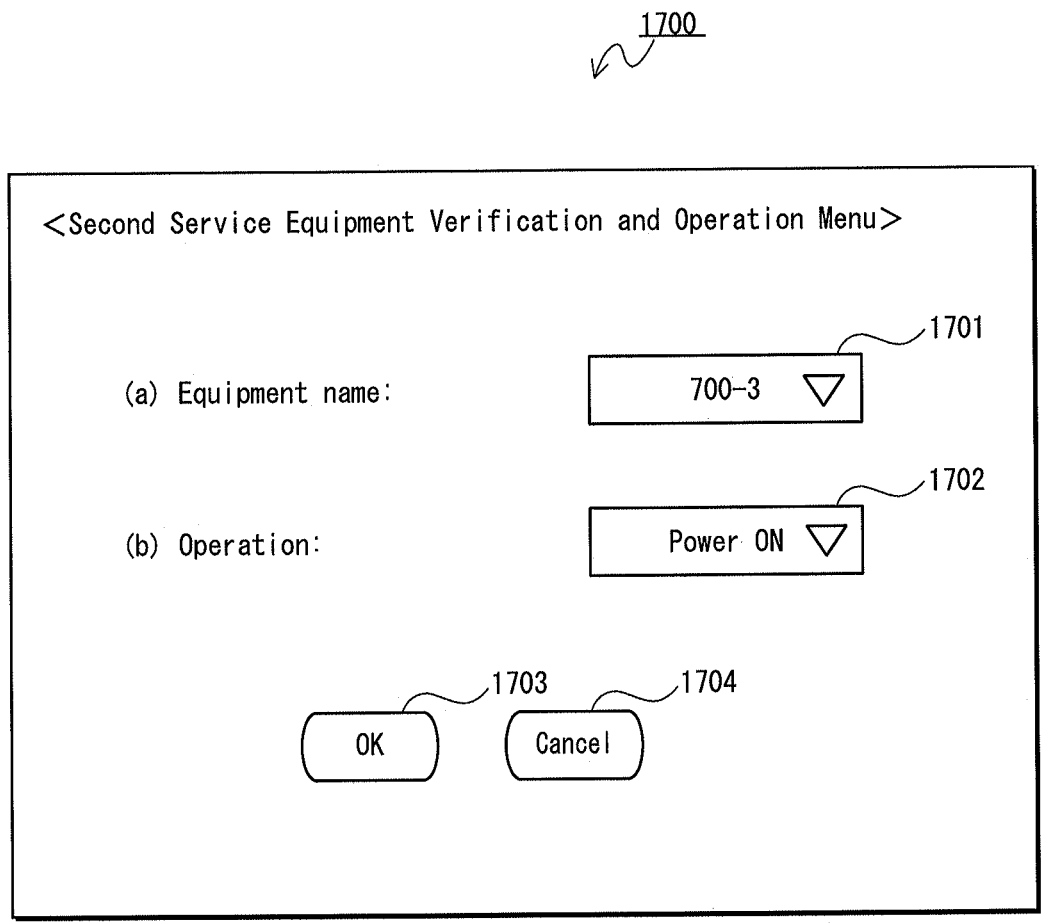
FIG. 19 illustrates an example of an equipment authentication and operation menu user interface 1700 for using the second service.

FIG. 19 illustrates user interface 1700 which is an example of a user interface for performing a remote control operation of equipment registered in advance by the user.

User interface 1700 includes selection list 1701 for selecting the second equipment to be controlled, selection list 1702 for selecting a control type, a setting button 1703, and a cancel button 1704.

In this example, selection list 1701 lists second equipment 700-3 as the equipment name, and a power ON instruction is selected as the remote control operation to be performed on second equipment 700-3.

The linking service specification user interface presentation unit 862 specifies another service to be linked with the second service, and outputs a user interface to the output unit 240 and to the display unit 242 for making an instruction regarding whether or not to switch processing to another user account for using the linking service.

(Second Account Information Acquisition Unit 870, Equipment Operation Information Acquisition Unit 871)

The second account information acquisition unit 870 acquires second account information, including the user account and password entered by the user using the input unit 242, according to user interface 2320 displayed on the display unit 242 by the second account information input user interface presentation unit 860. The second account information so acquired is also output to the second service device 600 via the communication unit 220.

The equipment operation information acquisition unit 671 acquires remote equipment operation information, including the second equipment subject to the control operation input by the user using the input unit 241 and information regarding other operation instructions for the equipment, in accordance with user interface 1700 displayed on the equipment operation user interface presentation unit 661 by the display unit 242. The equipment operation information so acquired is also output to the second service device 300 via the communication unit 220.

1.3 Operations

The operations of the intermediation system 1, configured as described above, are explained below.

(Solo Operation of First Service or Second Service)

Figure 20:
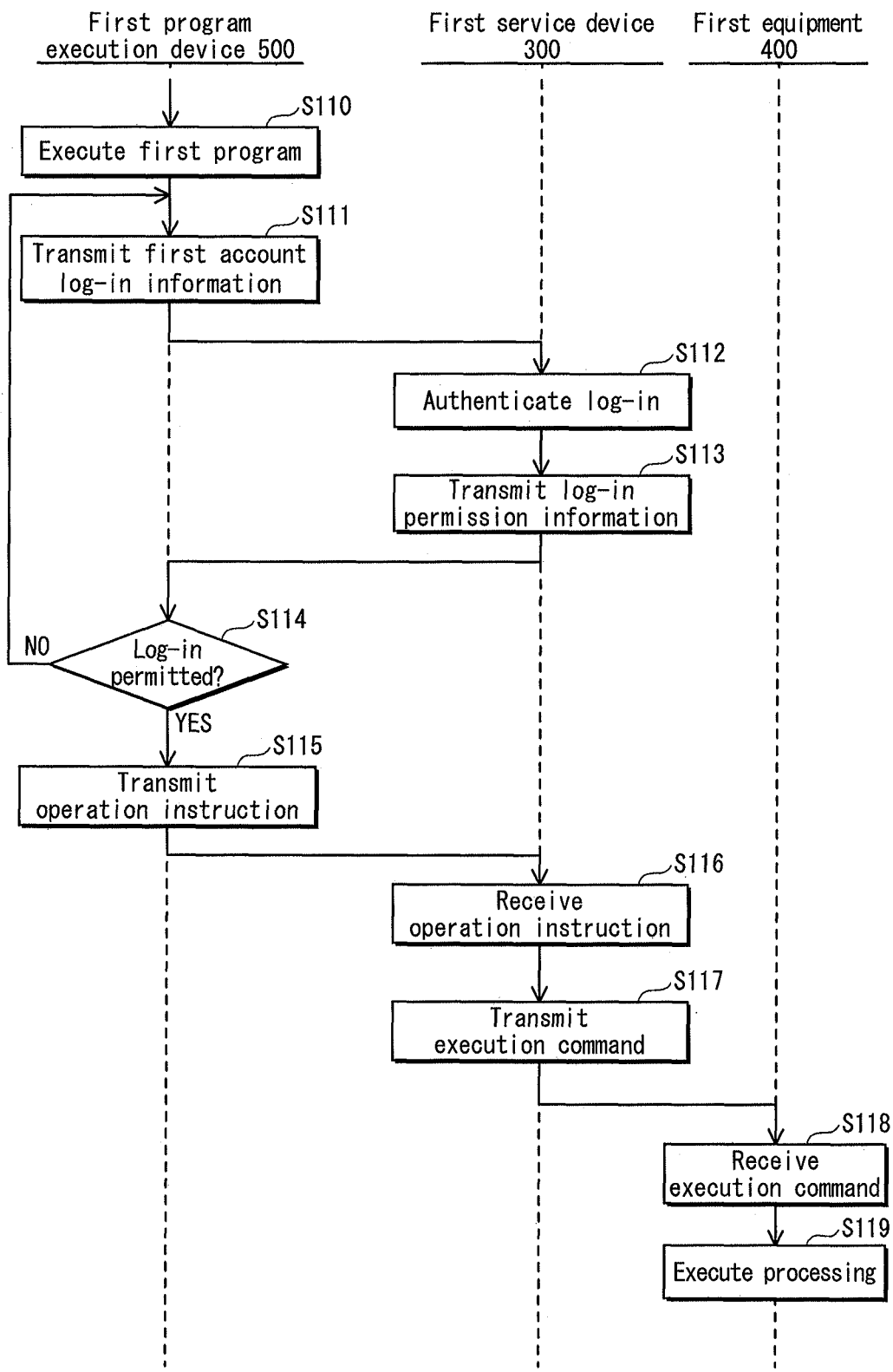
FIG. 20 is a sequence diagram indicating processing when the first service operates the equipment independently.

FIG. 20 is a sequence diagram illustrating processing performed when a remote control operation of the first equipment 400 is made by the first service in solo operation.

The first program execution device 500 (e.g., a mobile communication terminal) first executes the first program 550 in accordance with a user operation (step S110).

Once the program execution unit 230 executes the first program 550, the first program execution device 500 displays user interface 1310 on the display unit 242, as illustrated in FIG. 11, to enable the user to log-in to the first service device 300, and then waits for user input.

Once the user enters the first service user account in input field 1301, enters the password in input field 1302, and clicks transmit button 1303, the communication unit 220 of the first program execution device 500 transmits the user account and password entered by the user as encrypted data to the first service device 300 via the network 20 (step S111).

The first service device 300 has the decryption unit 325 decrypt the data received form the first program execution device 500 and has the account verification unit 322 authenticate the log-in (step S112).

Specifically, the account verification unit 322 references account data 1100 managed by the account management unit 321, and checks whether or not the user account and password obtained through decryption by the decryption unit 325 match an entry registered in the first service account column 1101 and the first service password column 1102 of account data 1100. When there is a match, the user account received from the first program execution device 500 is deemed valid.

Permission information generated through log-in authentication and indicating whether or not the user account entered by the user is valid is then transmitted to the first program execution device 500 by the communication unit 313 (step S113).

The control unit 201 of the first program execution device 500 receives the permission information pertaining to the log-in from the first service device 300, via the communication unit 220 (step S114).

When the permission information does not indicate that log-in is permitted (NO in step S114), the program execution unit 230 controls the output unit 240 to cause the display unit 242 to display user interface 1310 again, and returns to step S111 to receive user input.

Conversely, when the permission information indicates that log-in is permitted (YES in step S114), information pertaining to an instruction of an equipment operation, entered by the user, is transmitted to the first service device 300 (step S115).

Upon receiving the instruction for the first equipment 400 from the first program execution device 500 (step S116), the first service device 300 transmits an execution command corresponding to the operation instruction to the first equipment 400 (step S117).

Upon receiving the execution command for operating the equipment from the first service device 300 (step S118), the first equipment 400 executes processing corresponding to the execution command (step S119).

Figure 21:
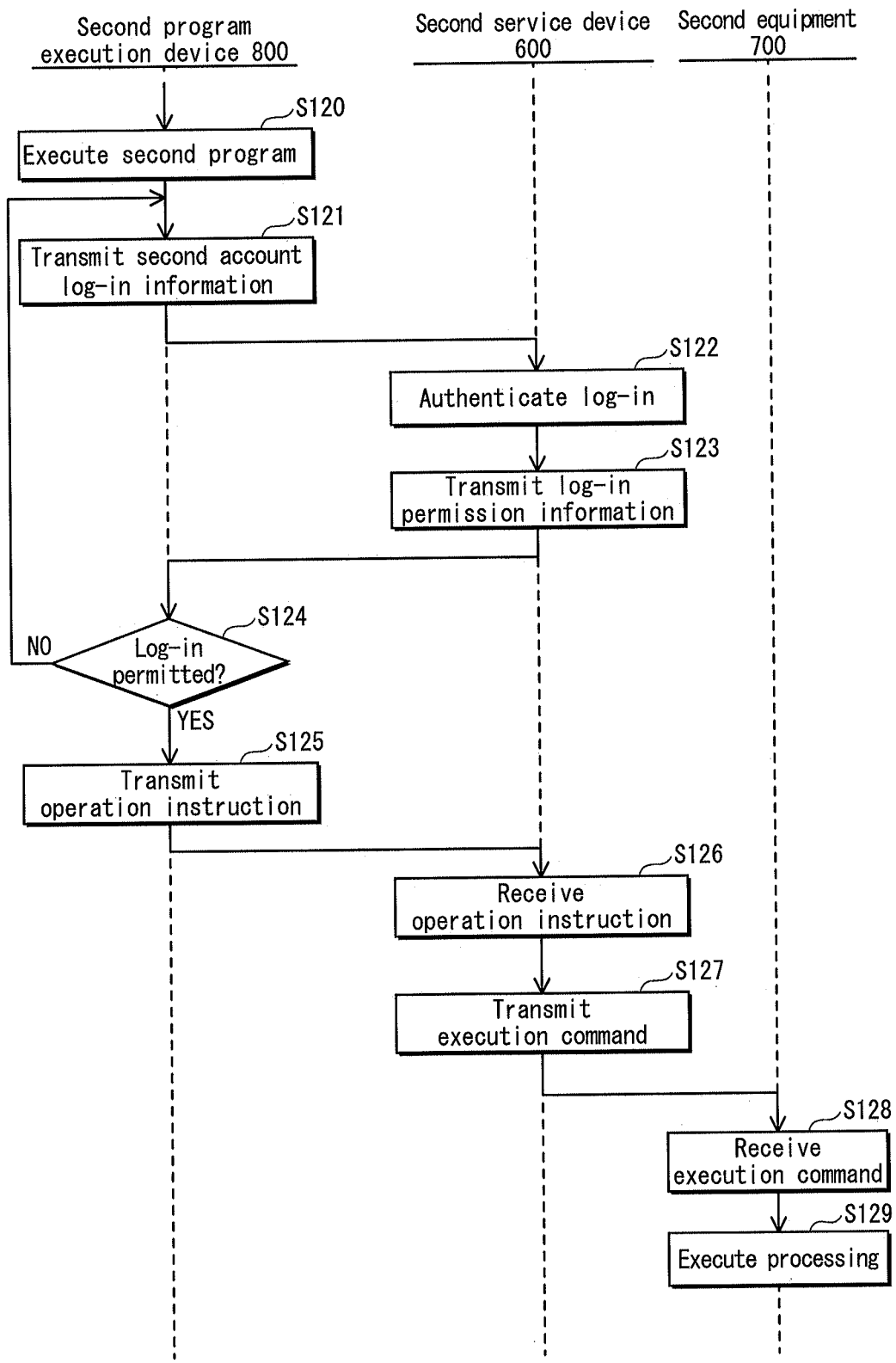
FIG. 21 is a sequence diagram indicating processing when the second service operates the equipment independently.

FIG. 21 is a sequence diagram illustrating processing performed when a remote control operation of the second equipment 700 is made by the second service in solo operation.

The processing of steps S120 through S129 indicated in FIG. 21 corresponds to the processing of steps S110 through S119 indicated in FIG. 20. The only difference is that the term "first" is replaced with the term "second". Therefore, explanations of FIG. 21 are omitted.

(Account Association Registration for using First Service and Second Service with Linking Service)

The following provides an explanation of the process performed to register an association between a first service user account and a second service user account, to use the first service and the second service with the linking service. This registration process is performed in a registration mode.

Figure 23:
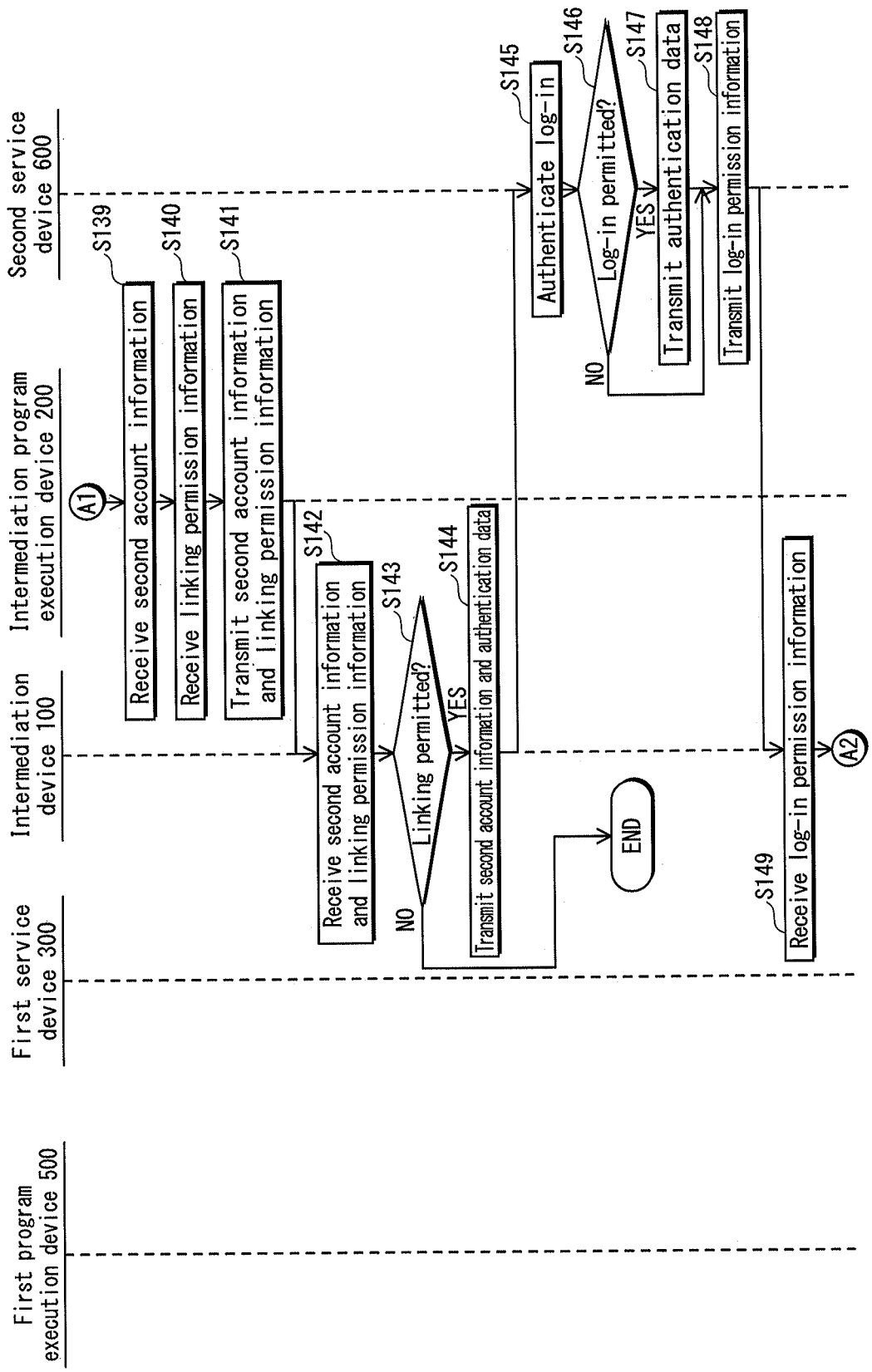
FIG. 23 is part two of a sequence diagram indicating processing performed by the intermediation system 1 for linking permission information registration, and continues in FIG. 24.
Figure 24:
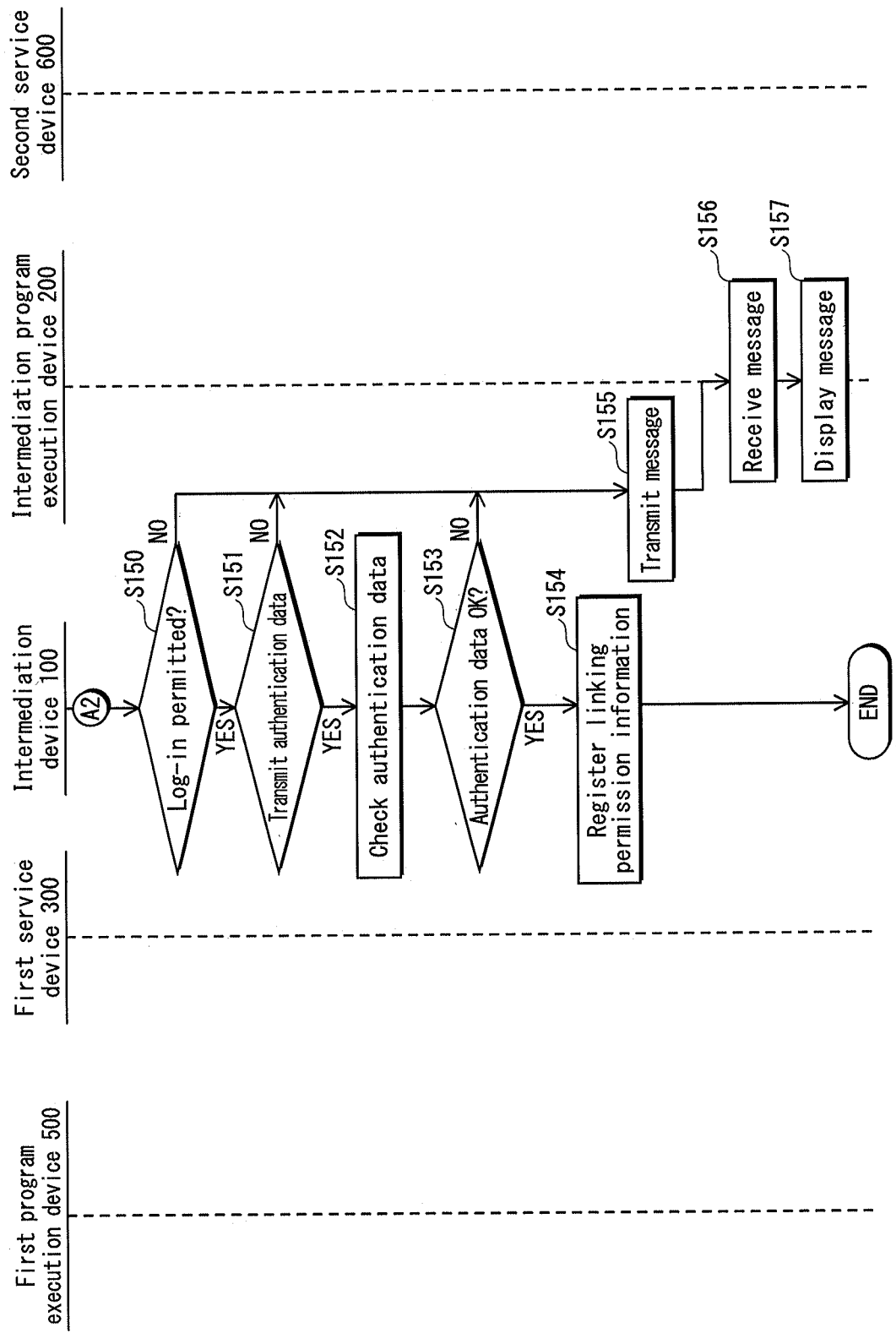
FIG. 24 is part three of a sequence diagram indicating processing performed by the intermediation system 1 for linking permission information registration.

The processing operations performed in the registration mode are described with reference to the sequence diagrams of FIGS. 22 through 24.

First, the program execution unit 230 of the first program execution device 500 reads and executes the first program from the program storage unit 211, in accordance with user instructions (step S130).

Once the first program is executed, the program execution unit 230 controls the output unit 240, causes the display unit 242 to display user interface 1310 enabling a log-in to the first service device 300, and waits for the user to input the user account and password to log-in to the first service device 300.

Figure 22:
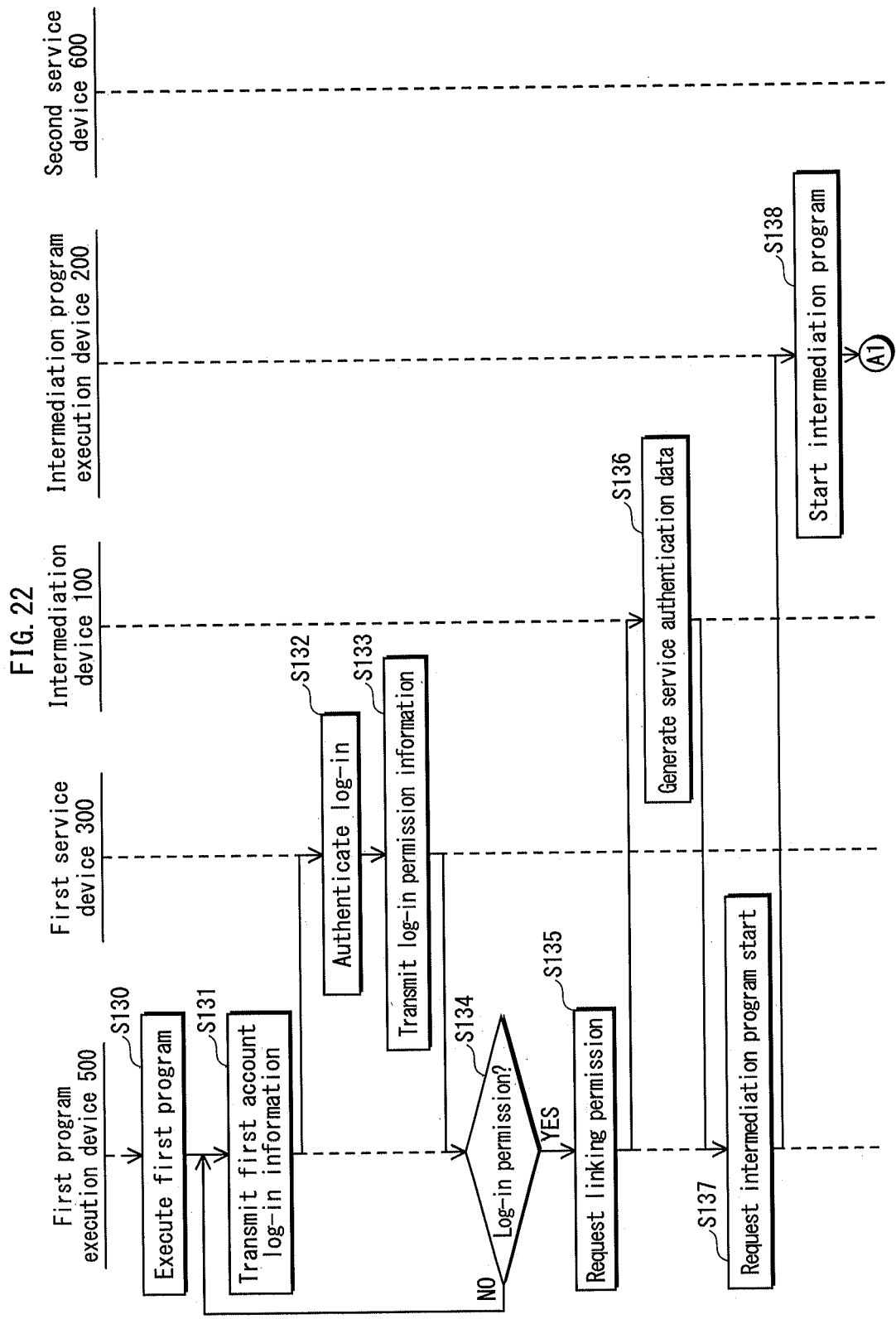
FIG. 22 is part one of a sequence diagram indicating processing performed by the intermediation system 1 for linking permission information registration, and continues in FIG. 23.

The processing of steps S131 through S134 in FIG. 22 is identical to the processing of steps S111 through S114 in FIG. 20.

The program execution unit 230 controls the output unit 240 and causes the display unit 242 to display user interface 1510 to request user input indicating whether or not to perform the registration process of associating the user account to link the first service to another service.

When the user indicates that linking is allowed, the program execution unit 230 transmits the first user account and password entered by the user, along with a linking permission request, to the intermediation device 100 via the communication unit 220 using a secure method (step S135).

The secure method involves, for example, encrypting the transmission data to be output over the network 20.

Upon receiving the linking permission request, the authentication data generation unit 124 of the intermediation device 100 generates service authentication data 1003 for the first service user account, and the authentication data storage unit 125 stores the authentication data so generated. The authentication data is stored in account data 1000 in association with the first service user account.

The control unit 101 stores encrypted service authentication data, obtained by using the first service encryption key to encrypt the service authentication data, in the encrypted service authentication data column 1004 of account data 1000 in association with the first service account.

The control unit 101 also controls the communication unit 113 to transmit the encrypted service authentication data to the first program execution device 500 using a secure method (step S136).

The program switching unit 572 in the program execution unit 230 of the first program execution device 500 receives the encrypted service authentication data and makes a start-up instruction for the intermediation program 250 (i.e., an intermediation program start-up request) to the intermediation program execution device 200 (step S137).

Upon receiving the intermediation program start-up request, the program execution unit 230 of the intermediation program execution device 200 executes the intermediation program 250 (step S138).

In the present Embodiment, the first program execution device 500 and the intermediation program execution device 200 are realised as a single device. Thus, the program execution unit 230 actually starts and executes the intermediation program 250 instead of the first program 550.

Here, the program execution unit 230 stores the encrypted service authentication data obtained from the intermediation device 100 during first program execution in a manner usable by the intermediation program 250.

The program execution unit 230 of the intermediation program execution device 200 controls the output unit 240 and causes the display unit 242 to display user interface 281 for requesting user input of the second service user account and password for linking.

The input unit 241 receives the second service user account and password from the user (step S139), and receives information indicating whether or not using the first service and the second service with the linking service is permitted (i.e., linking permission information) (step S140).

Once the user enters predetermined information in user interface 281 and touches transmit button 286, the program execution unit 230 controls the communication unit 220 to transmit the second service user account and password, along with the linking permission information, to the intermediation device 100 using the secure means (step S141).

The control unit 101 of the intermediation device 100 receives the linking permission information and the second service user account and password via the communication unit 113 (step S142).

The control unit 101 determines whether or not the linking permission information permits linking (step S143).

When the linking permission information indicates that linking is not permitted (NO in step S143), the processing ends.

Conversely, when the linking permission information indicates that linking is permitted, the control unit 101 transmits the second service user account and password and the encrypted service authentication data to the second service device 600 via the communication unit 113 using the secure method (step S144).

The second service device 600 performs log-in authentication to check whether or not the received user account is valid (step S145). Specifically, the account verification unit 622 references account data 1200 managed by the account management unit 621 to determine whether or not the user account and password received from the intermediation device 100 match the second service account and second service password stored in the respective columns of account data 1200. When there is a match, the received user account is found to be valid.

When the log-in is permitted (YES in step S146), the account verification unit 622 controls the response unit 626 transmits log-in permission information indicating the log-in permission and the encrypted service authentication data previously received to the intermediation device 100 via the communication unit 613 using the secure method (step S147 and S148).

The control unit 101 of the intermediation device 100 acquires the log-in permission information from the second service device 600 via the communication unit 113 (step S149), and determines whether or not the log-in permission information indicates that log-in is permitted (step S150).

When the log-in permission information indicates that log-in is permitted (YES in step S150), the control unit 101 determines whether the encrypted service authentication data has been received (step S151).

When the encrypted service authentication data has been received (YES in step S151), the control unit 101 checks whether or not the received encrypted service authentication data matches the encrypted service authentication data generated locally (step S152). Specifically, the control unit 101 references account data 1000 stored by the account management unit 120 to use the first service encryption key associated with the first service account for decrypting the encrypted service authentication data received from the second service device 600. A determination is made regarding whether or not the decrypted service authentication data match the content of the encrypted service authentication data column 1004. When there is a match, the encrypted service authentication data is found to be valid encrypted service authentication data that has not been tampered with during transmission and is not associated with an invalid user account.

When the encrypted service authentication data is found to be valid (YES in step S153), the control unit 101 stores the first service user account and the second service user account in association. Specifically, the second service account is stored, as entered, in the second service account column 1005 in association with the user account indicated in the first service account column 1001 of account data 1000.

However, when the log-in permission information indicates that log-in is not permitted (NO in step S150), when the encrypted service authentication data has not been received (NO in step S151), and when the encrypted service authentication data is not valid (NO in step S153), the control unit 101 transmits a message via the communication unit 113 indicating that the user account for using the linking service cannot be registered (step S155).

Upon receiving the message from the intermediation device 100 (step S156), the program execution unit 230 of the intermediation program execution device 200 controls the output unit 240 and causes the display unit 242 to display the received message (step S157).

(Operation of First Service and Second Service using Linking Service)

Figure 25:
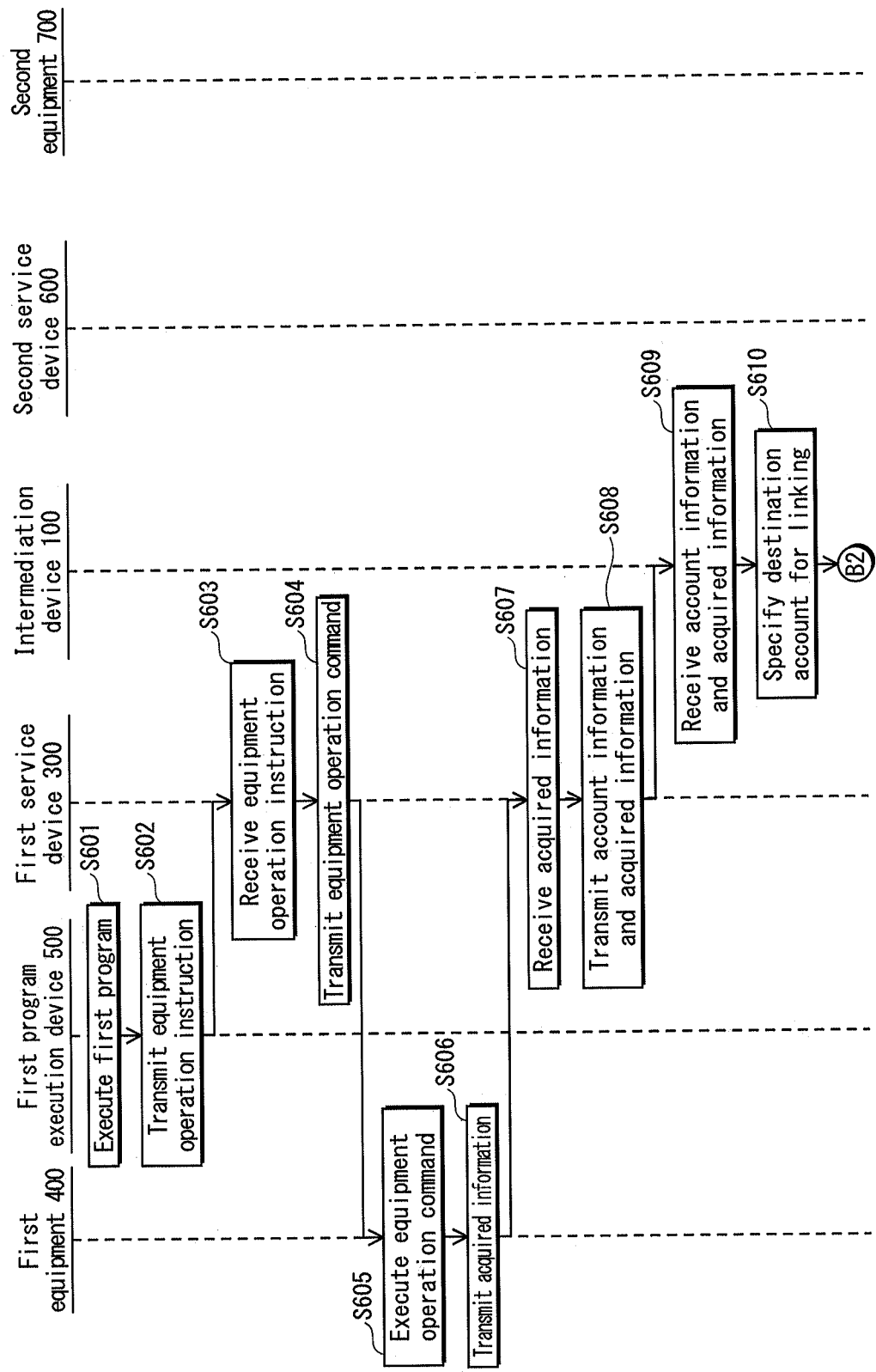
FIG. 25 is part one of a sequence diagram indicating an example of processing performed by the linking service with the first service and the second service while in an execution mode, and continues in FIG. 26.
Figure 26:
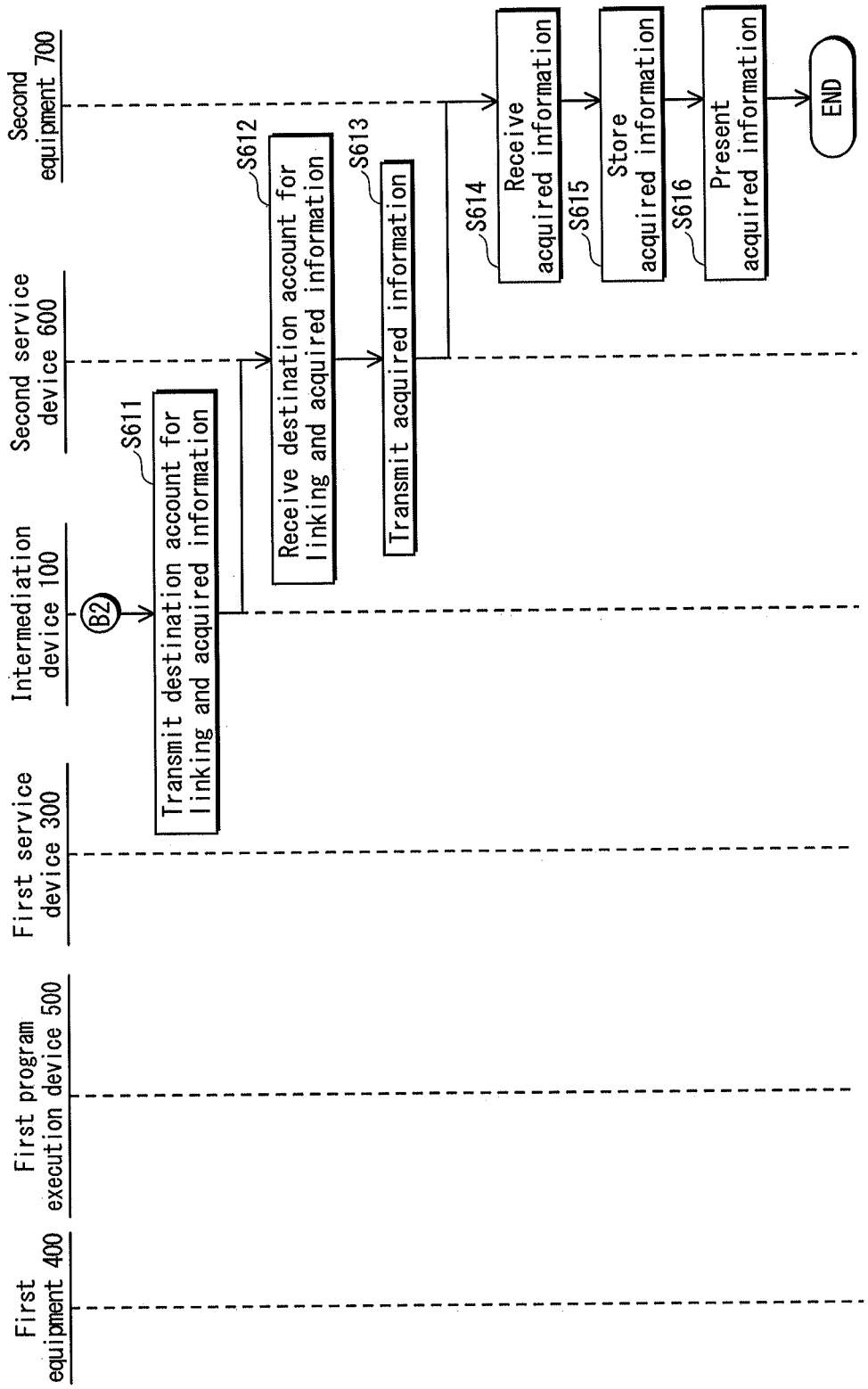
FIG. 26 is part two of a sequence diagram indicating an example of processing performed by the linking service with the first service and the second service while in an execution mode.

The following describes operations performed when the first service and the second service are used with the linking service, with reference to the sequence diagrams of FIGS. 25 and 26. The linking service is used in a linking service execution mode.

In this example, the first equipment 400 is a television, and the second equipment 700 is an automotive navigation device installed in a vehicle. Also, the second equipment 700 performs processing using information obtained by the first equipment 400.

The program execution unit 230 of the first program execution device 500 reads the first program 550 from the first program storage unit 211 and executes it (step S601).

The program execution unit 230 transmits an operation instruction for the device to the first service device 300, as entered by the user through user interface 1400 displayed by the display unit 242 (step S602).

When the first service is used through the first program execution device 500, the processing pertaining to authentication of the user log-in is identical to the processing of steps S110 through S114 of FIG. 20. As such, explanations of this portion of the sequence in FIG. 25 are omitted. In this example, the user is able to log-in to the first service device 300 successfully.

Upon receiving the operation instruction for the first equipment 400, the control unit 301 of the first service device 300 transmits an equipment operation command, corresponding to the operation instruction, to the first equipment 400 (step S604).

The control unit 401 of the first equipment 400 receives the equipment operation command from the first service device 300, controls the equipment control unit 406, and causes the equipment body 407 to execute operations corresponding to the equipment operation command (step S605).

A concrete example of the user instruction follows.

The operation instruction from the user is an operation of turning the power supply ON in the television serving as the first equipment 400. The user turns the power supply ON, then selects a program for viewing.

Once the user begins viewing of a program on the television serving as the first equipment 400, the television specifies the program being viewed and acquires program-related information pertaining to a shop or facility presented in the specified program from an electronic program guide (hereinafter, EPG), information from a metadata delivery service supplying the program-related information from an Internet server, or similar.

The event detection unit 405 of the first equipment 400 detects the acquisition of the information pertaining to the program being viewed. The control unit 401 then transmits the acquired information to the first service device 300 (step S606). In this example, the acquired program-related information concerns Universal City Osaka.

The control unit 301 of the first service device 300 receives the program-related information from the first equipment 400 (step S607), specifies the first service user account belonging to the owner of the first equipment 400, and transmits the first service user account and the program-related information to the intermediation device 100 (step S608).

The control unit 101 of the intermediation device 100 receives the first service user account and the program-related information from the first service device 300 (step S609), then uses the first service user account to identify the second service user account associated therewith for use in the linking service (step S610). Specifically, the control unit 101 references account data 1000 managed by the account management unit 120 and identifies an entry in the second service account column 1005 associated with the first service account, for use as the second service user account with the linking service.

The control unit 101 controls the communication unit 313 to transmit the second service user account and the acquired information to the second service device 600 (step S611).

The control unit 601 of the second service device 600 receives the second service user account and the program-related information from the intermediation device 100 (step S612), and transmits the program-related information received from the intermediation device 100 to the second equipment 700 registered in association with the second service user account (step S613).

The control unit 701 of the second equipment 700 receives the program-related information (step S614) and stores the received program-related information in the memory unit 702 (step S615).

The control unit 701 reads the acquired program-related information from the memory unit 702 for display on the display unit 709, in accordance with a user request (step S616).

Also, the term "Universal City Osaka" in the program-related information may be extracted and used by the automotive navigation device as a destination.

2. Embodiment 2

2.1 Overview

In Embodiment 1, the intermediation program execution device 200 executes a intermediation program 250 in a registration mode of registering an association between user accounts to allow use of a first service and a second service with a linking service, then transfers the registration to the intermediation device 100.

Embodiment 2 describes, an intermediation system 2 in which no intermediation program is used to register the association between user accounts in the intermediation device 100 for using the linking service.

For ease of explanation, components identical to those of the intermediation system 1 use the same reference signs as Embodiment 1. Also, given that the components of Embodiment 1 have already been explained, the present Embodiment omits repetitive explanations and focuses only on points of difference.

2.2 Configuration

Figure 27:
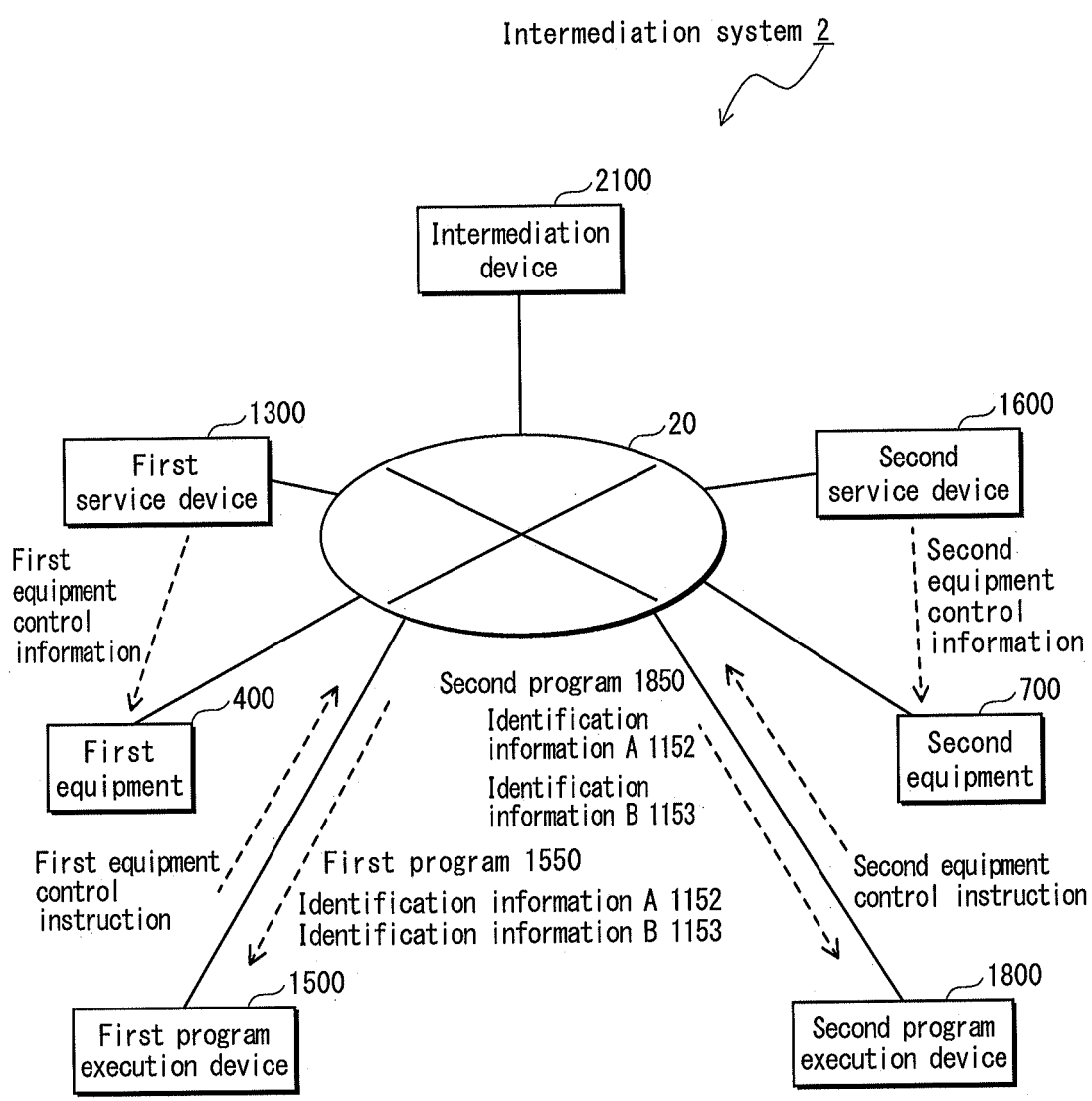
FIG. 27 is an overall schematic diagram showing the system configuration of an intermediation system 2 pertaining to Embodiment 2.

FIG. 27 is an overall schematic diagram showing the system configuration of the intermediation system 2 pertaining to the present Embodiment.

As shown, the intermediation system 2 includes an intermediation device 2100, a first service device 1300, the first equipment 400, a second service device 1600, the second equipment 700, a first program execution device 1500, and a second program execution device 1800, each connected to a network 20.

The intermediation device 2100, the first service device 1300, the second service device 1300, the first program execution device 1500, and the second program execution device 1800 respectively correspond to the intermediation device 100, the first service device 300, the second service device 600, the first program execution device 500, and the second program execution device 800 of the intermediation system 1 illustrated in FIG. 1.

In the present Embodiment, the first program execution device 1500 and the second program execution device 1800 are realised as a single device owned by the user (e.g., mobile communication terminal), and the program execution unit 230 switches between executing the first program and the second program.

(Intermediation Device 2100)

Figure 28:
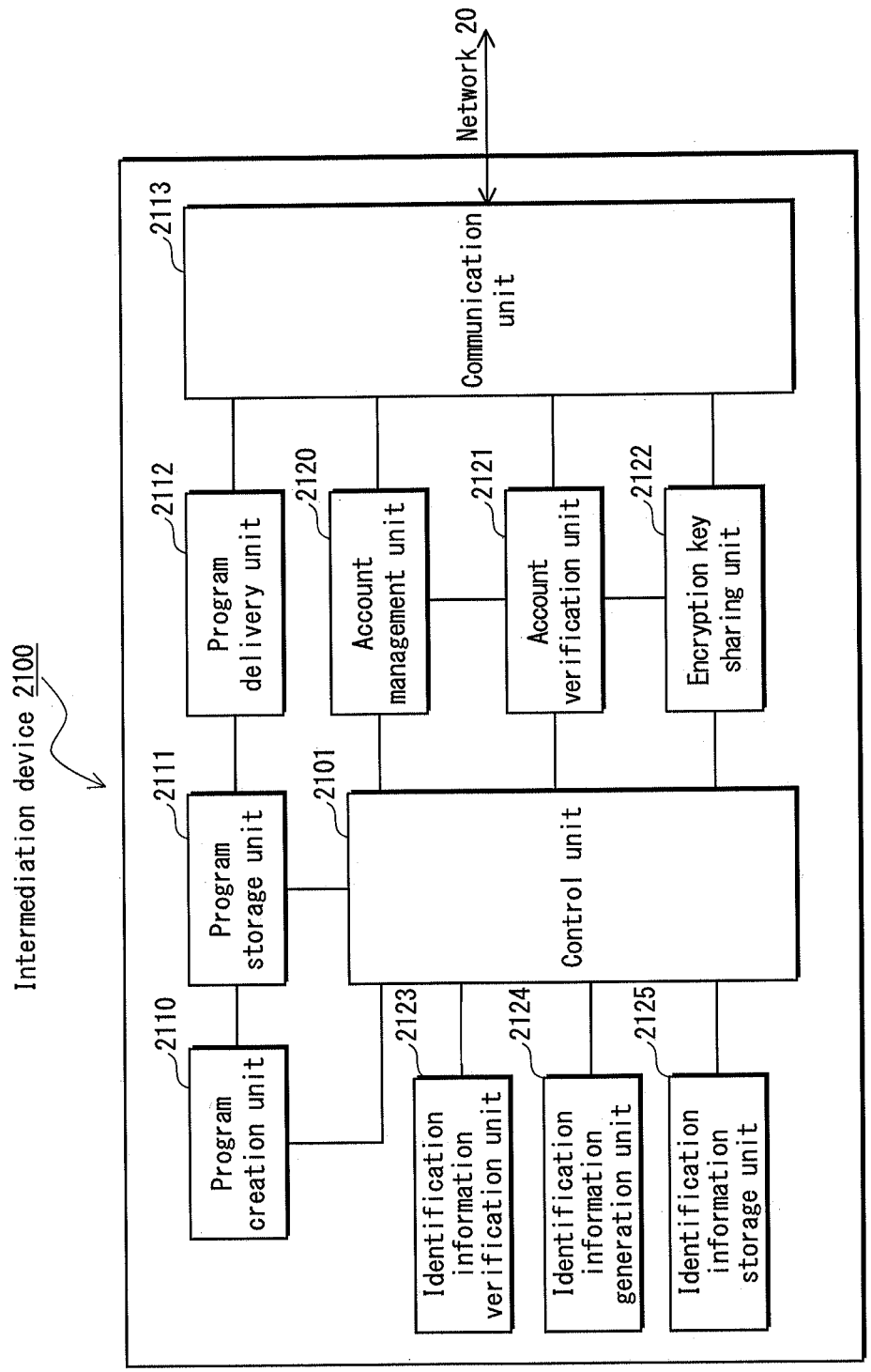
FIG. 28 is a functional block diagram of the main functions of an intermediation device 2100.

As shown in FIG. 28, the intermediation device 2100 includes a control unit 2101, a program creation unit 2110, a program storage unit 2111, a program delivery unit 2112, a communication unit 2113, an account management unit 2120, an account verification unit 2121, an encryption key sharing unit 2122, an identification information verification unit 2123, an identification information generation unit 2124, and an identification information memory unit 2125.

The intermediation device 2100 differs from the intermediation device 100 in that the authentication data verification unit 123, the authentication data generation unit 124, and the authentication data storage unit 125 of the intermediation device 100 from Embodiment 1 are respectively replaced with the identification information verification unit 2123, the identification information generation unit 2124, and the identification information memory unit 2125.

(Identification Information Verification Unit 2123, Identification Information Generation Unit 2124, Identification Information Memory Unit 2125)

The identification information verification unit 2123 associates the first service user account and the second service user account for use with the linking service by checking whether or not there is a valid permission request from each account, based on the identification information generated by the identification information generation unit 2124.

The identification information generation unit 2124 generates identification information for the identification information verification unit 2123 to use when checking whether or not the linking service permission is valid for the first service and second service user accounts. The control unit 101 performs control to store the generated identification information in the identification information memory unit 2125.

The generated identification information is also stored in account data 1010 managed by the account management unit 120, in association with the first service account and the second service account.

The account management unit 120 manages account data 1010 as follows.

FIG. 29 illustrates an example of account data 1010 configuration and content.

Here, account data 1010 is configured to store, in association, a first service account column 1011, a first service encryption key column 1012, a first service identification information A column 1013, a second service account column 1014, a second service identification information B column 1015, and an identification information checking flag column 1016.

The first service account column 1011 indicates a user account for using the first service, when the linking service is used with the first service and the second service.

The first service encryption key column 1012 indicates an encryption key used for encryption and decryption of data transmitted and received to and from the first service device 1300, the first program execution device 1500, the second service device 1600, the second program execution device 1800, and the intermediation device 2100.

The first service identification information A column 1013 indicates identification information A, which is transmitted to the first program execution device 1800 and presented to the user.

The second service account column 1014 indicates a user account for using the second service, associated with the first service for using the linking service.

The second service identification information B column 1015 indicates identification information B, which is transmitted to the second program execution device 1800 and presented to the user.

The identification information checking flag column 1016 indicates a flag showing whether or not the user accounts are associated by identification information B.

The identification information memory unit 2125 is, for example, non-transitory memory storing the identification information generated by the identification information generation unit 2124.

(First Program Execution Device 1500)

The basic configuration of the first program execution device 1500 is identical to that of the first program execution device 500 shown in FIG. 4.

The only point of difference is that the program execution unit 230 executes the first program 1550.

Figure 30:
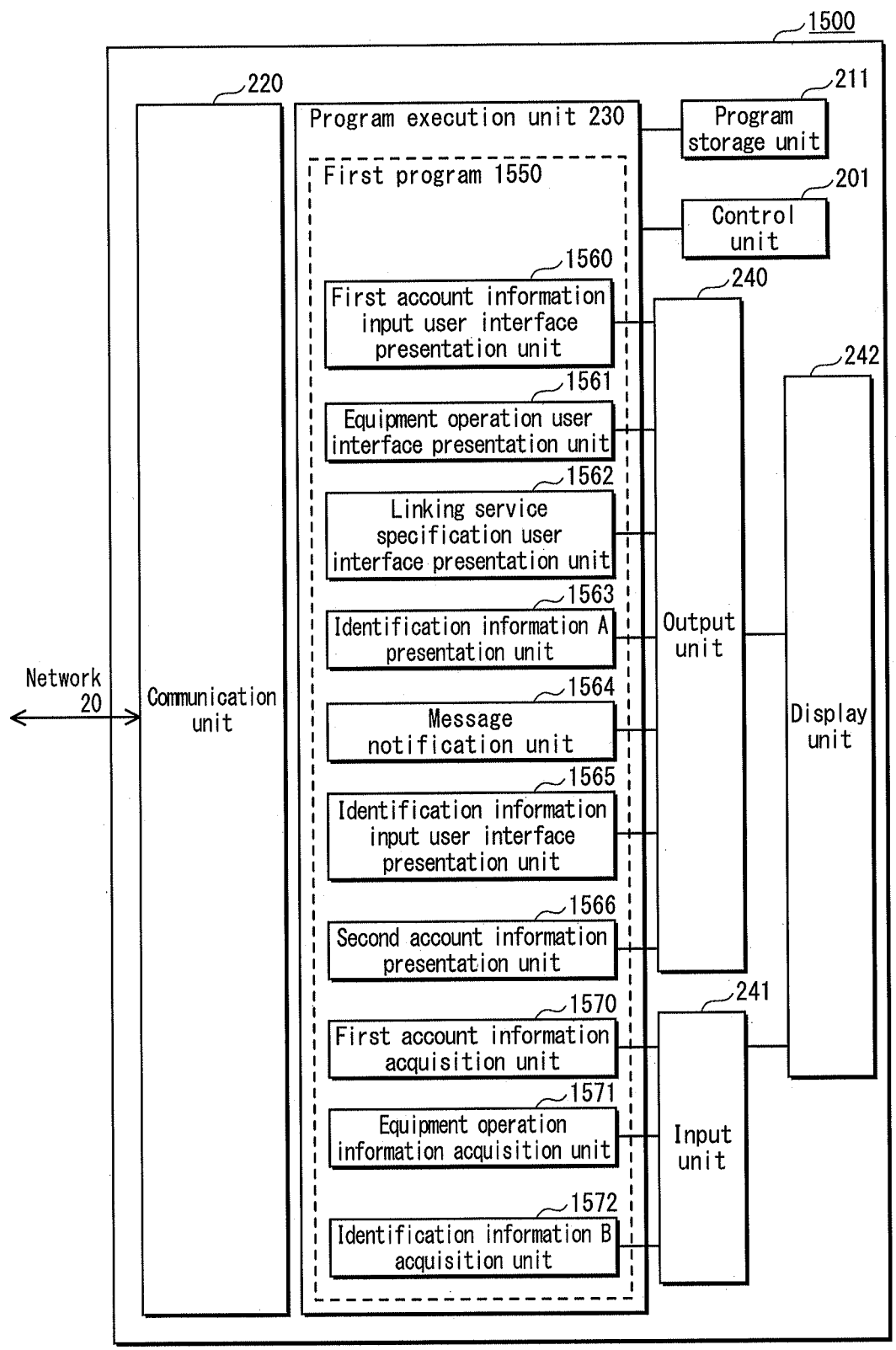
FIG. 30 is a functional configuration diagram of a first program 1550 as operated by the first program execution device 1500.

FIG. 30 is a functional configuration diagram of the first program 1500 as operated by the first program execution device 1550.

The first program 1550 includes a first account information input user interface presentation unit 1560, an equipment operation user interface presentation unit 1561, a linking service specification user interface presentation unit 1562, an identification information A presentation unit 1563, a message notification unit 1564, an identification information input user interface presentation unit 1565, a second account information presentation unit 1566, a first account information acquisition unit 1570, an equipment operation information acquisition unit 1571, and an identification information B acquisition unit 1572.

The first account information input user interface presentation unit 1560, the equipment operation user interface presentation unit 1561, and the linking service specification user interface presentation unit 1562 are identical in function to the first account information input user interface presentation unit 560, the equipment operation user interface presentation unit 561, and the linking service specification user interface presentation unit 562 of FIG. 10, respectively. Also, the first account information acquisition unit 1570 and the equipment operation information acquisition unit 1571 are identical in function to the first account information acquisition unit 570 and the equipment operation information acquisition unit 571 of Embodiment 1, respectively.

(Identification Information A Presentation Unit 1563, Message Notification Unit 1564, Identification Information Input User Interface Presentation Unit 1565)

The identification information A presentation unit 1563 controls the output unit 240 and presents the identification information A input by the user of the second program execution device 1800 on the display unit 242 when associating the first service user account with the second service user account.

The message notification unit 1564 controls the output unit 240 to cause the display unit 242 to display information required for the processing of associating the user accounts of the first service and the second service.

The identification information input user interface presentation unit 1565 controls the output unit 240 cause the display unit to display a user interface enabling the user to enter identification information B presented to the second program execution device 1800.

Figure 31:
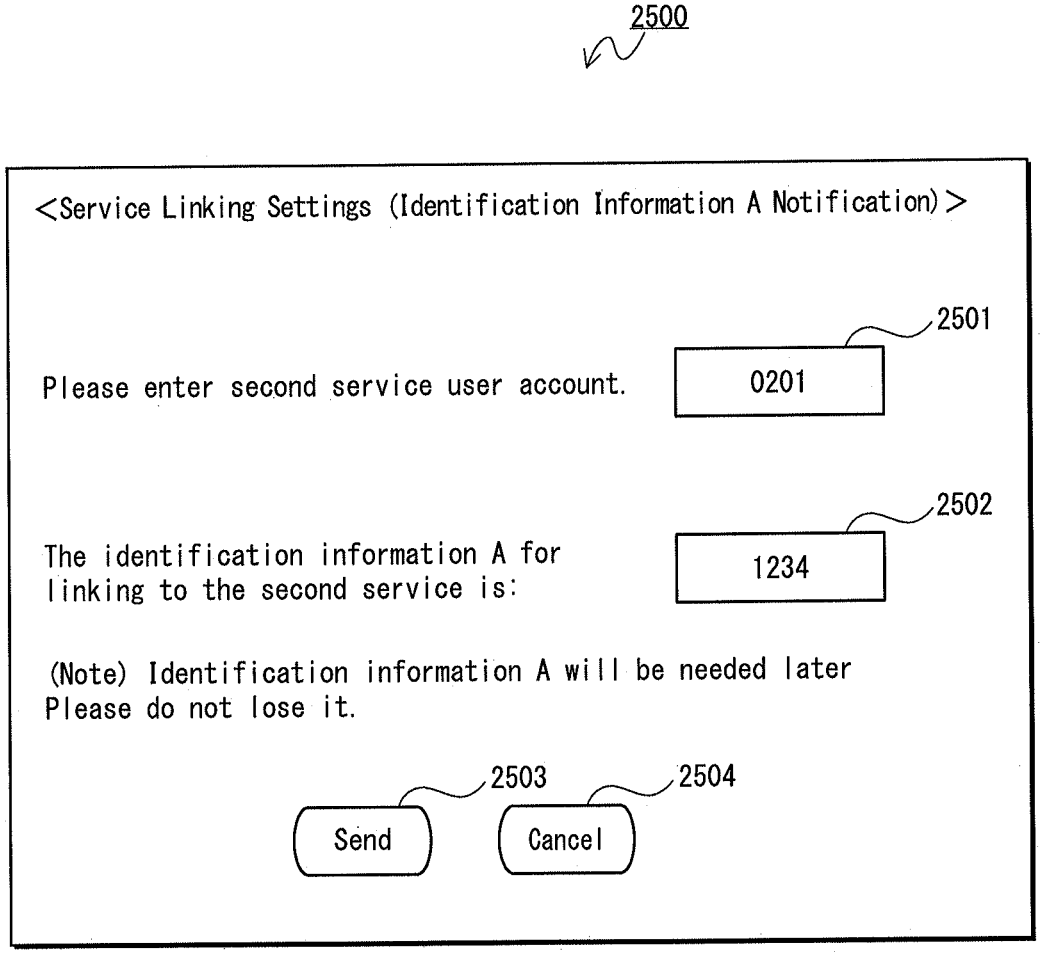
FIG. 31 illustrates an example of a notification user interface 2500 for identification information A, used for service linking settings in Embodiment 2.

An example of a user interface, displayed by the identification information A presentation unit 1563 on the display unit 242, is described with reference to FIG. 31.

As shown, user interface 2500 includes input field 2501, where the user enters the second service user account for linking, a presentation field 2502 presenting identification information A entered by the user of the second program execution device 1800 executing the second program, a transmit button 2503 for performing an instruction to transmit the entered information, and a cancel button 2504 for cancelling further registration processing.

During the later-described processing of the second program execution device 1800 executing the second program, the user enters identification information A presented in the presentation field 2502 to make a notification that the permission request is legitimate.

Figure 32:
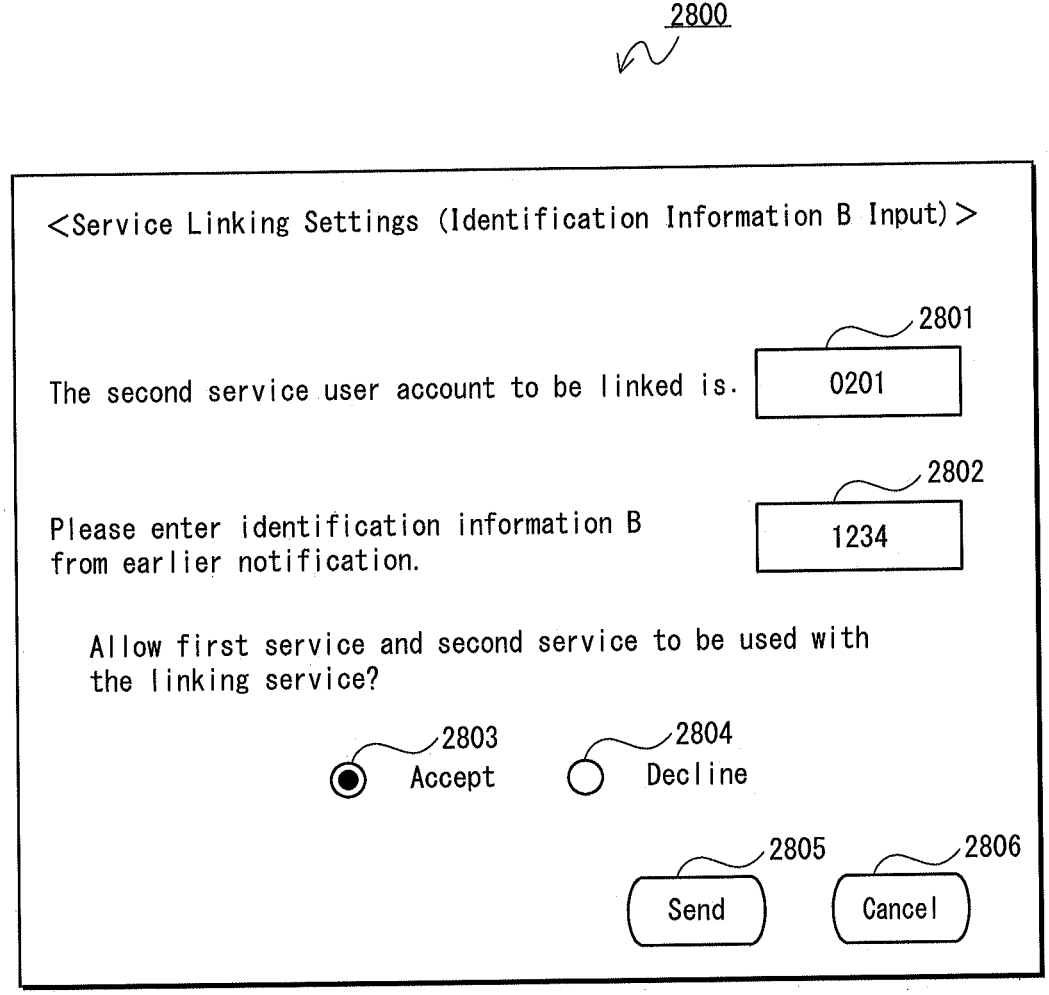
FIG. 32 illustrates an example of an input user interface 2800 for identification information B, used for service linking settings in Embodiment 2.

Next, an example of a user interface, displayed by the identification information input user interface presentation unit 1565 on the display unit 242, is described with reference to FIG. 32.

As shown, user interface 2800 has a presentation field 2801 for presenting the second service user account entered by the user for linking with the first service user account, an input field 2802 for entering identification information B presented to the user by the second program being executed by the program execution unit 230 of the second program execution device 1800, radio buttons 2803 and 2804, a transmit button 2805, and a cancel button 2806.

The radio buttons 2803 and 2804 are provided for the user to check whether or not to permit linking of the first service and the second service by selecting one of the buttons. In FIG. 32, radio button 2803 is selected to indicate granting permission.

Transmission button 2805 enables a transmission instruction for transmitting the information input in input field 2802 and the radio button selection to the intermediation device 100.

Once the user enters the above-described input and touches transmit button 2805, the input information and selection are transmitted to the intermediation device 100.

Also, cancel button 2806 is provided to cancel input. Once the user touches cancel button 2806, the first program execution device 1500 ends the execution of the first program 1550 without the first program 1550 performing any further processing.

(Second Account Information Presentation Unit 1566)

The second account information presentation unit 1566 controls the output unit 240 to cause the display unit 242 to present information pertaining to the second service user account for linking to the first service user account.

(Identification Information B Acquisition Unit 1572)

The identification information B acquisition unit 1572 acquires identification information B, entered by the user in accordance with the user interface presented by the identification information input user interface presentation unit 1565, via the input unit 241. Furthermore, the acquired identification information B is transmitted to the intermediation device 2100 via the communication unit 220.

(Second Program Execution Device 1800)

The basic configuration of the second program execution device 1800 is identical to that of the first program execution device 1800 shown in FIG. 30.

The only point of difference is that the program execution unit 230 executes the second program 1850.

Figure 33:
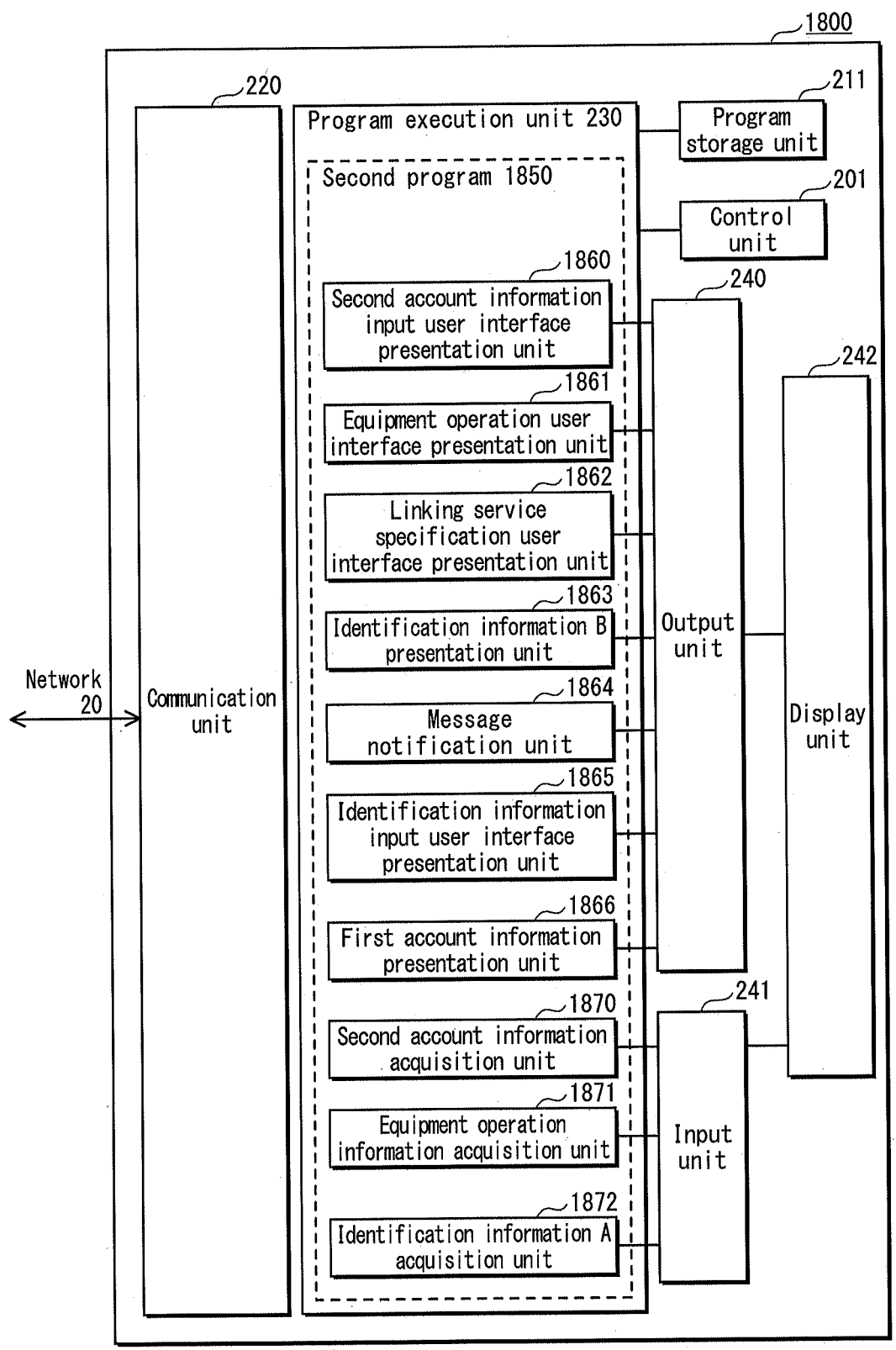
FIG. 33 is a functional configuration diagram of a first program 1850 as operated by the second program execution device 1800.

FIG. 33 is a functional configuration diagram of the second program 1850 as operated by the second program execution device 1800.

As shown, the second program 1850 includes a second account information input user interface presentation unit 1860, a equipment operation user interface presentation unit 1861, a linking service specification user interface presentation unit 1862, an identification information B presentation unit 1863, a message notification unit 1864, an identification information input user interface presentation unit 1865, a first account information presentation unit 1866, a second account information acquisition unit 1870, a equipment operation information acquisition unit 1871, and an identification information A acquisition unit 1872.

The second program 1850 executes processing identical to the processing by the first program 1550 with the only difference being that the term "first" is replaced with the term "second" and that identification information A is replaced with identification information B.

Figure 34:
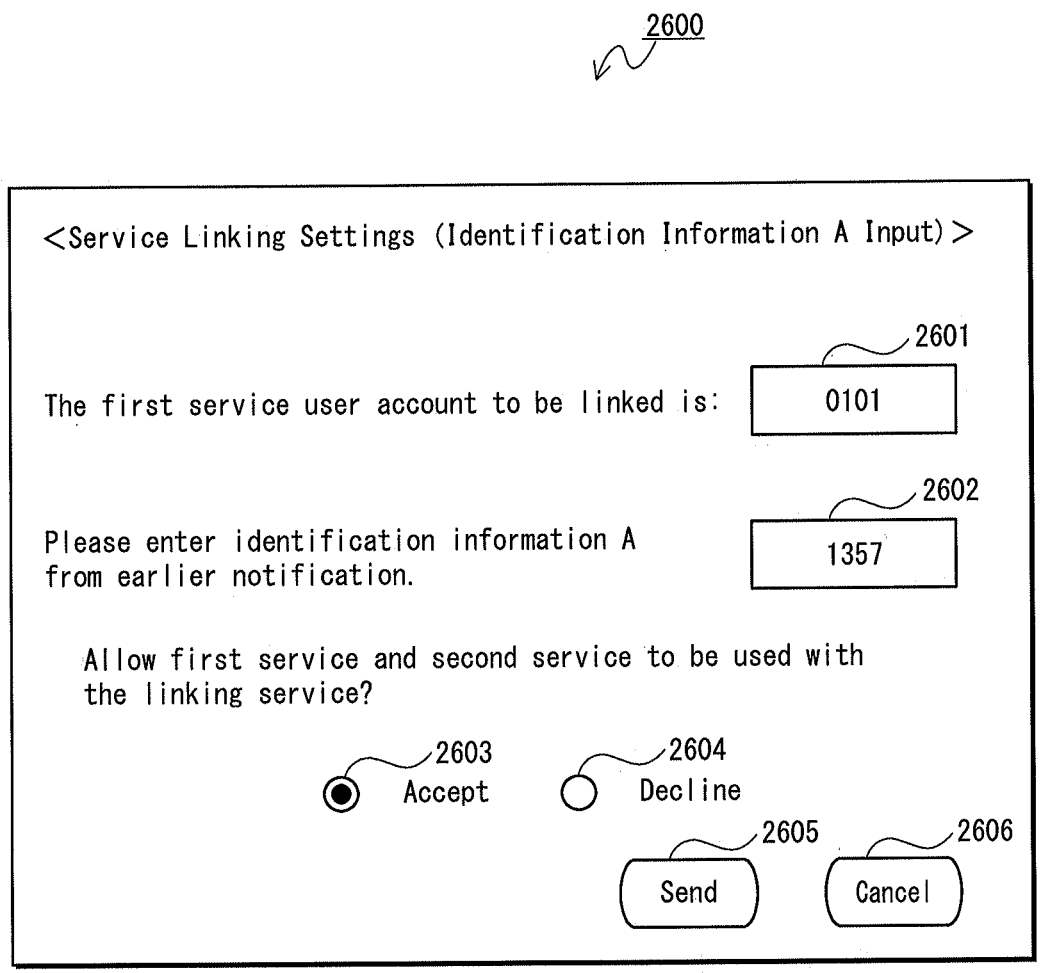
FIG. 34 illustrates an example of an input user interface 2600 for identification information A, used for service linking settings in Embodiment 2.

Next, an example of a user interface, displayed by the identification information input user interface presentation unit 1865 on the display unit 242, is described with reference to FIG. 34.

As shown, user interface 2600 has a presentation field 2601 for presenting the first service user account for which permission is requested from the user to link with the second service user account, an input field 2602 for entering identification information A presented to the user by the first program being executed by the program execution unit 230 of the first program execution device 1500, radio buttons 2603 and 2604, a transmit button 2605, and a cancel button 2606.

The radio buttons 2603 and 2604 are provided for the user to check whether or not to permit linking of the first service and the second service by selecting one of the buttons. In FIG. 34, radio button 2603 is selected to indicate granting permission.

Transmission button 2605 enables a transmission instruction for transmitting the information input in input field 2602 and the radio button selection to the intermediation device 100.

Once the user enters the above-described input and touches transmit button 2605, the input information and selection are transmitted to the intermediation device 100.

Also, cancel button 2606 is provided to cancel input. Once the user touches cancel button 2606, the second program execution device 1800 ends the execution of the second program 1850 without the second program 1850 performing any further processing.

Figure 35:
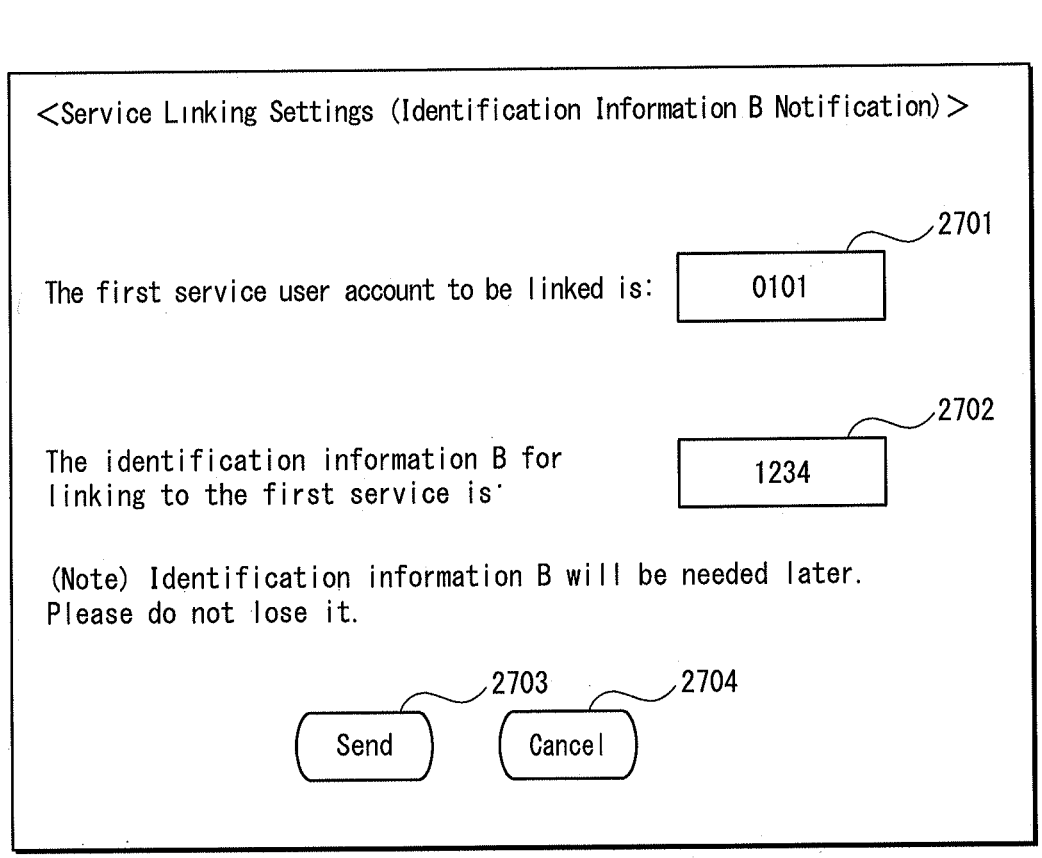
FIG. 35 illustrates an example of a notification user interface 2700 for identification information B, used for service linking settings in Embodiment 2.

Next, an example of a user interface, displayed by the identification information B presentation unit 1863 on the display unit 242, is described with reference to FIG. 35.

As shown, user interface 2700 includes presentation field 2701, presenting the linked first service user account to the user, a presentation field 2702 presenting identification information B entered by the user of the first program execution device 1500 executing the first program, a transmit button 2703 for performing an instruction to transmit the entered information, and a cancel button 2704 for cancelling further registration processing.

During processing of the first program being executed by the first program execution device 1500, the user is able to make a notification such that the permission request is valid by entering identification information B, presented in presentation field 2703, into input field 2802 of user interface 2800 displayed on the display unit 242.

2.3 Operations

Figure 36:
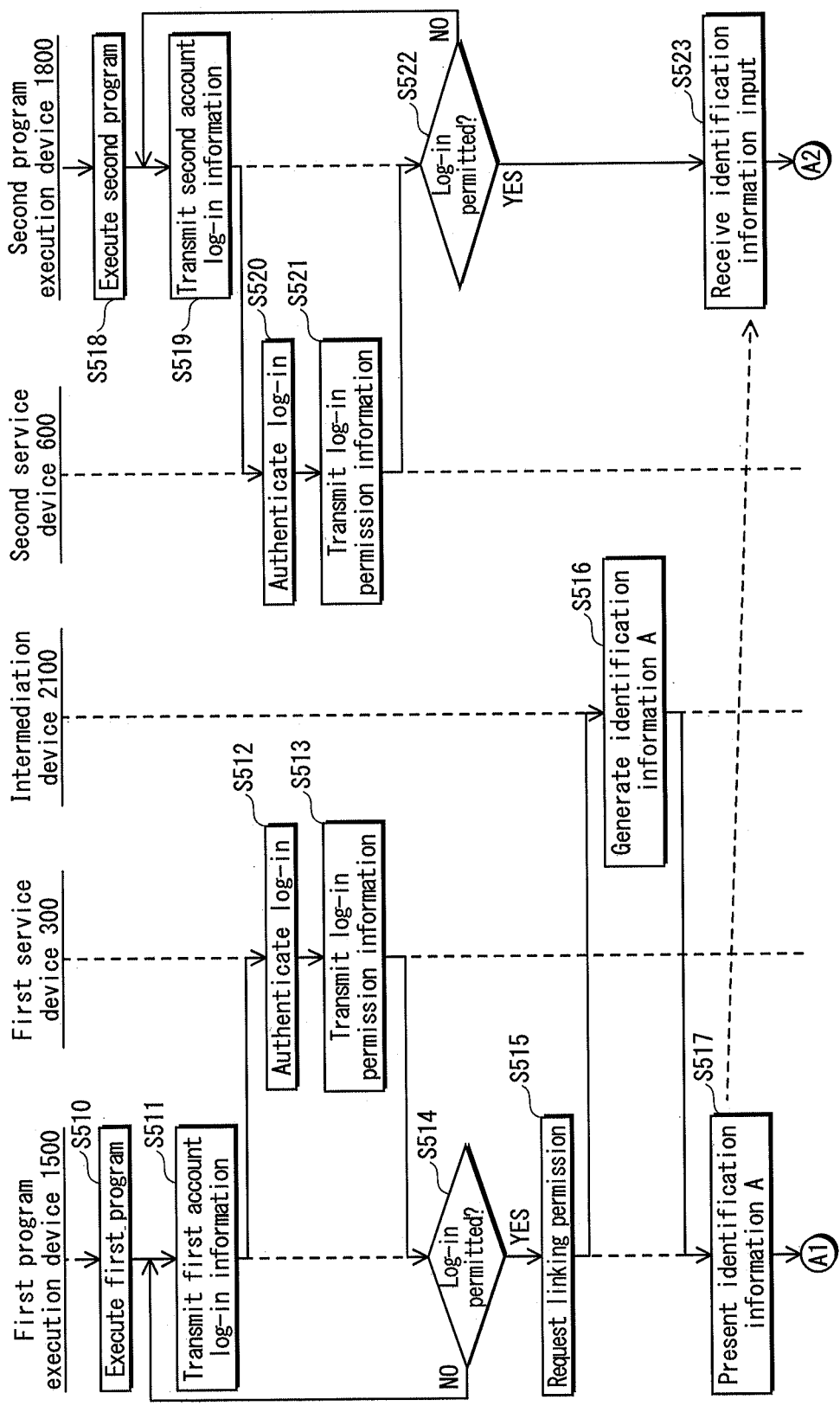
FIG. 36 is part one of a sequence diagram indicating processing performed by the intermediation system 2 for linking permission information registration, and continues in FIG. 37.
Figure 37:
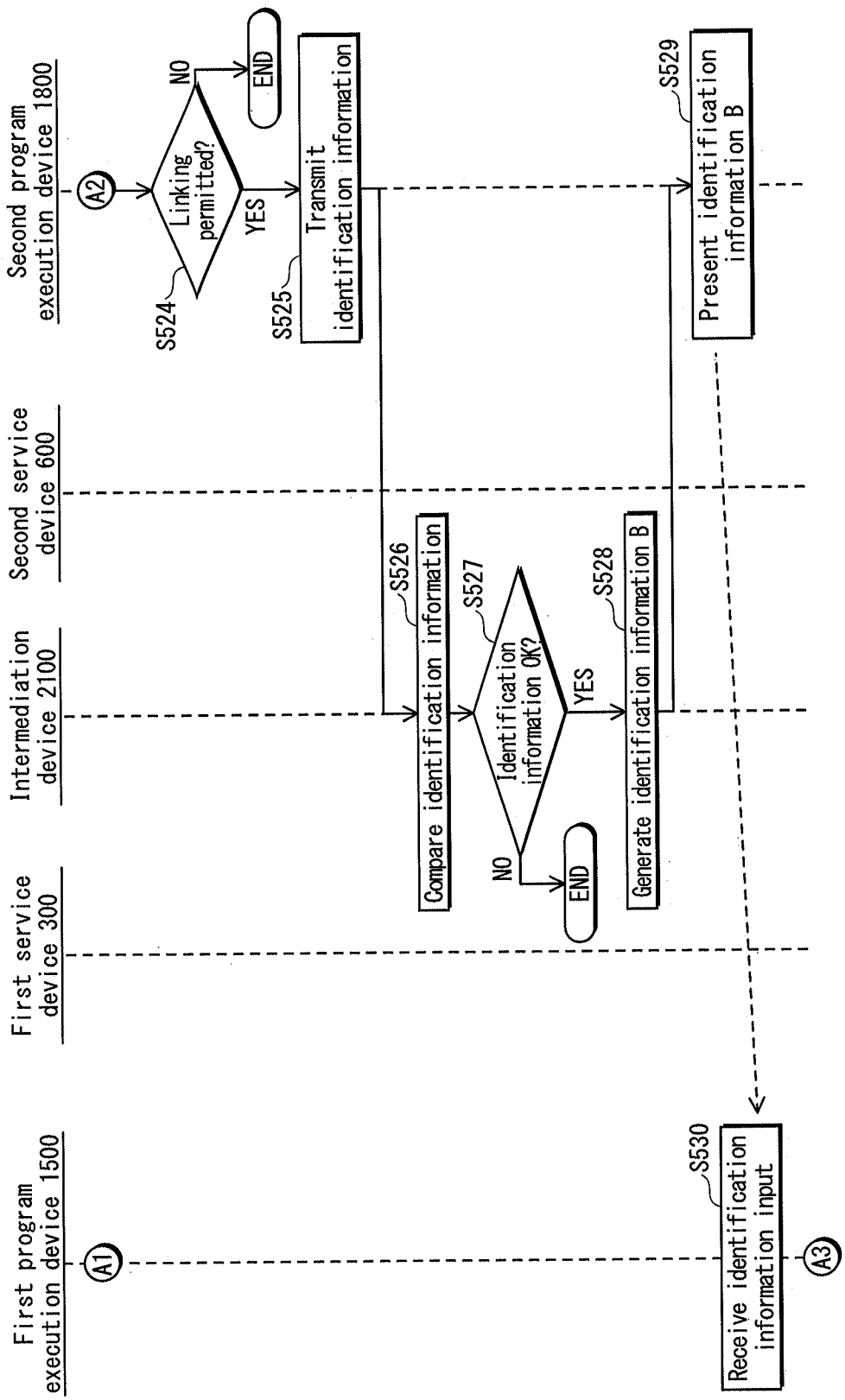
FIG. 37 is part two of a sequence diagram indicating processing performed by the intermediation system 2 for linking permission information registration, and continues in FIG. 38.
Figure 38:
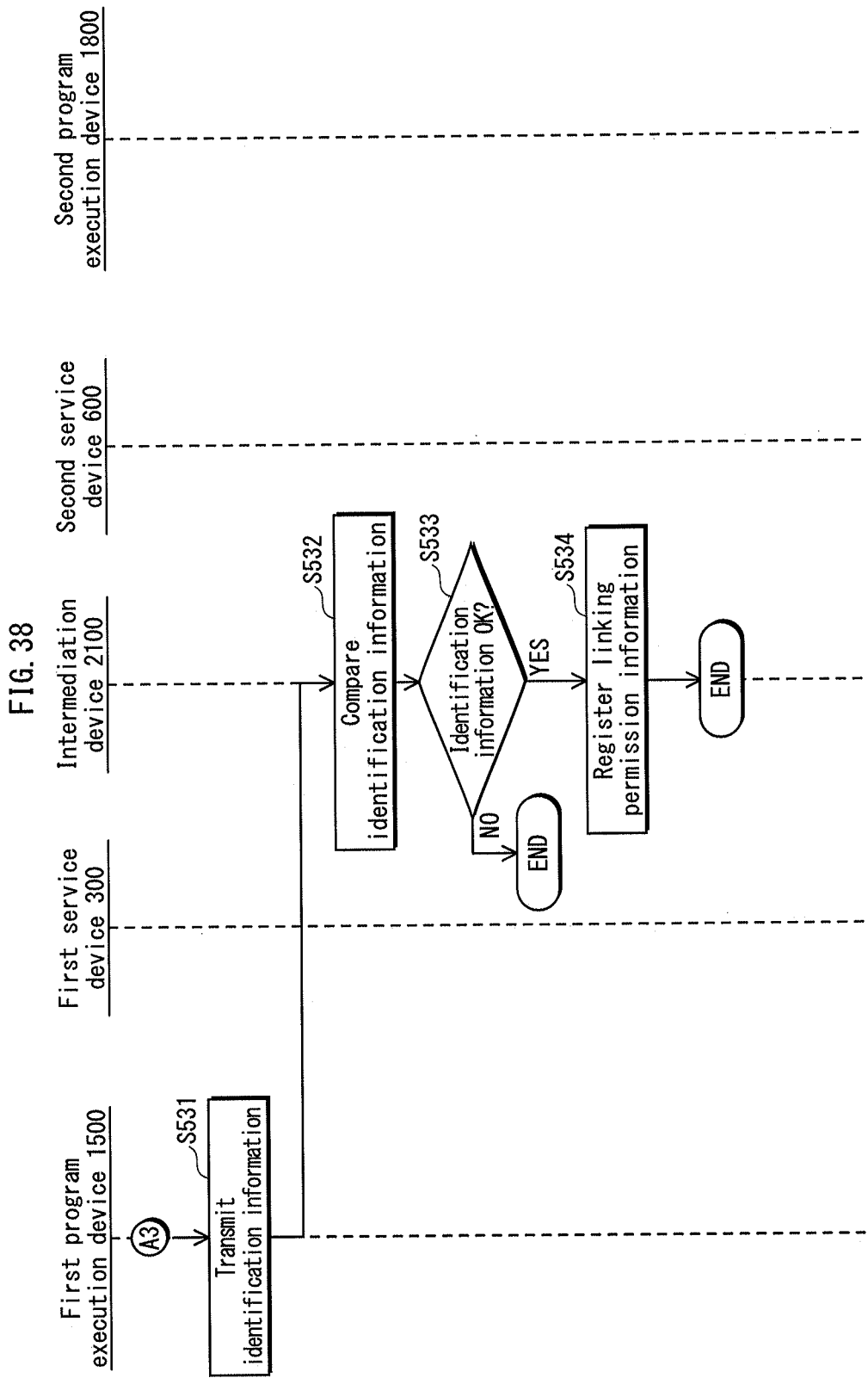
FIG. 38 is part three of a sequence diagram indicating processing performed by the intermediation system 2 for linking permission information registration.

The processing operations performed in the registration mode of intermediation system 2 are described with reference to the sequence diagrams of FIGS. 36 through 38.

First, the program execution unit 230 of the first program execution device 1500 reads and executes the first program from the program storage unit 211, in accordance with user instructions (step S510).

Next, the processing pertaining to log-in authentication for the first service is performed in steps S511 through S514. This processing is identical to the processing of steps S130 through S134 of FIG. 22.

The linking permission request processing (step S515) is also identical to the linking permission request (step S135) of FIG. 22.

The control unit 2101 of the intermediation device 2100 receives the linking permission request from the first program execution device 1500, then controls the identification information generation unit 2124 to generate identification information A. Specifically, the identification information generation unit 2124 generates a random number for the first service user account, such that the identification information A has a different value for each instance of identification information stored in the identification information memory unit 2125. The control unit 2101 performs control to store the generated identification information A in the identification information memory unit 2125. The control unit 2101 also stores the identification information A in association with the first service account in account data 1010 of the account management unit 2120.

The control unit 2101 transmits the generated identification information A to the first program execution device 1500 via the communication unit 2113 using a secure method.

Upon receiving the identification information A from the intermediation device 2100, the program execution unit 230 of the first program execution device 1500 controls the output unit 240 to display identification information A in presentation field 2502 of user interface 2500 (step S517).

Next, the program execution unit 230 of the second program execution device 1800 reads and executes the second program from the program storage unit 211, in accordance with user instructions (step S518).

In the present Embodiment, the first program execution device 1500 and the second program execution device 1800 are realised as a single device. Specifically, the program execution unit 230 multi-tasks to execute the first program and the second program.

Next, the processing pertaining to log-in authentication for the second service is performed in steps S519 through S522. This processing is identical to the processing of steps S511 through S514 of FIG. 36, with the only difference being that the term "first" is replaced by the term "second".

When log-in is permitted (YES in step S522), the identification information input user interface presentation unit 1865 of the second program 1850 being executed by the program execution unit 230 controls the output unit 240 to display user interface 2600 on the display unit 242, and waits for the user to enter identification information A.

The input unit 241 receives the linking permission information and identification information from the user (step S523). The identification information A acquisition unit 1872 then determines whether or not the linking permission information permits linking (step S524).

When the linking permission information shows that linking is not permitted (NO in step S524), the identification information A acquisition unit 1872 performs no further processing.

Conversely, when the linking permission information shows that linking is permitted (YES in step S524), the identification information A acquisition unit 1872 transmits the identification information entered by the user in input field 2602 to the intermediation device 2100 via the communication unit 220, using a secure method.

The identification information verification unit 2123 of the intermediation device 2100 receives the identification information from the second program execution device 1800 and checks whether or not the received identification information matches identification information A transmitted to the first program execution device 1500 (step S526).

When the received identification information does not match identification information A (NO in step S527), the identification information verification unit 2123 ends the processing.

Conversely, when the identification information verification unit 2123 finds that the received identification information matches identification information A (YES in step S527), the identification information generation unit 2124 generates identification information B (step S528). Specifically, the identification information generation unit 2124 generates identification information B using the method described in step S516. The control unit 2101 then performs control to store the generated identification information B in the identification information memory unit 2125. The control unit 2101 also stores the identification information B in association with the second service account in account data 1010 of the account management unit 2120.

Here, identification information B is transmitted to the second program execution device 1800, and the second program execution device 1800 receives it as part of the second program processing.

The control unit 2101 transmits the generated identification information B to the second program execution device 1800 via the communication unit 2113 using a secure method.

Upon receiving the identification information B from the intermediation device 2100, the program execution unit 230 of the second program execution device 1800 controls the output unit 240 to display identification information B in presentation field 2702 of user interface 2700 (step S529).

The program execution unit 230 of the first program execution device 1500 displays user interface 2800 on the display unit 242 in accordance with the first program 1550 and waits for user input of the identification information.

Once the input unit 241 receives the user input (step S530), the identification information B acquisition unit 1572 acquires the identification information entered in input field 2802, and controls the communication unit 220 to transmit the acquired identification information to the intermediation device 2100 using the secure method (step S531).

The identification information verification unit 2123 of the intermediation device 2100 receives the identification information from the first program execution device 1500 and checks whether or not the received identification information matches identification information B transmitted to the second program execution device 1800 (step S532).

When the received identification information does not match identification information B (NO in step S533), the identification information verification unit 2123 ends the processing.

However, when the identification information verification unit 2123 finds that the received identification information matches identification information B (YES in step S533), the control unit 2101 stores the first service user account and the second service user account in association in account data 1010 of the account management unit 2120 (step S534).

According to the above-described operations, the intermediation system 2 of the present Embodiment uses a secure method to register the first service user account and the second service user account in association for using the linking service, without executing the intermediation program.

3. Variation

The remote control operating system discussed above has been described in terms of the Embodiments. However, no limitation to the above-described Embodiments is intended. The following variations may also be applied.

(1) In Embodiment 1, the processing of the linking service execution mode is described as transmitting information obtained in an operation of the first service to the second service for presenting the information to the user. However, the linking service execution mode is not limited to processing of information presentation.

The second service equipment may also be controlled according to the information obtained by the first service, such as follows.

An example of operations for controlling the second service equipment using the information obtained from the first service is described with reference to the sequence diagram of FIGS. 39 and 40.

In this variation, the first equipment 400 is an automotive navigation device and the second equipment 700 is an in-home air conditioner.

The user then makes an instruction such that power of supply of the air conditioner acting as the second equipment 700 is switched ON when the automobile reaches a distance of 500 m from the home.

Figure 39:
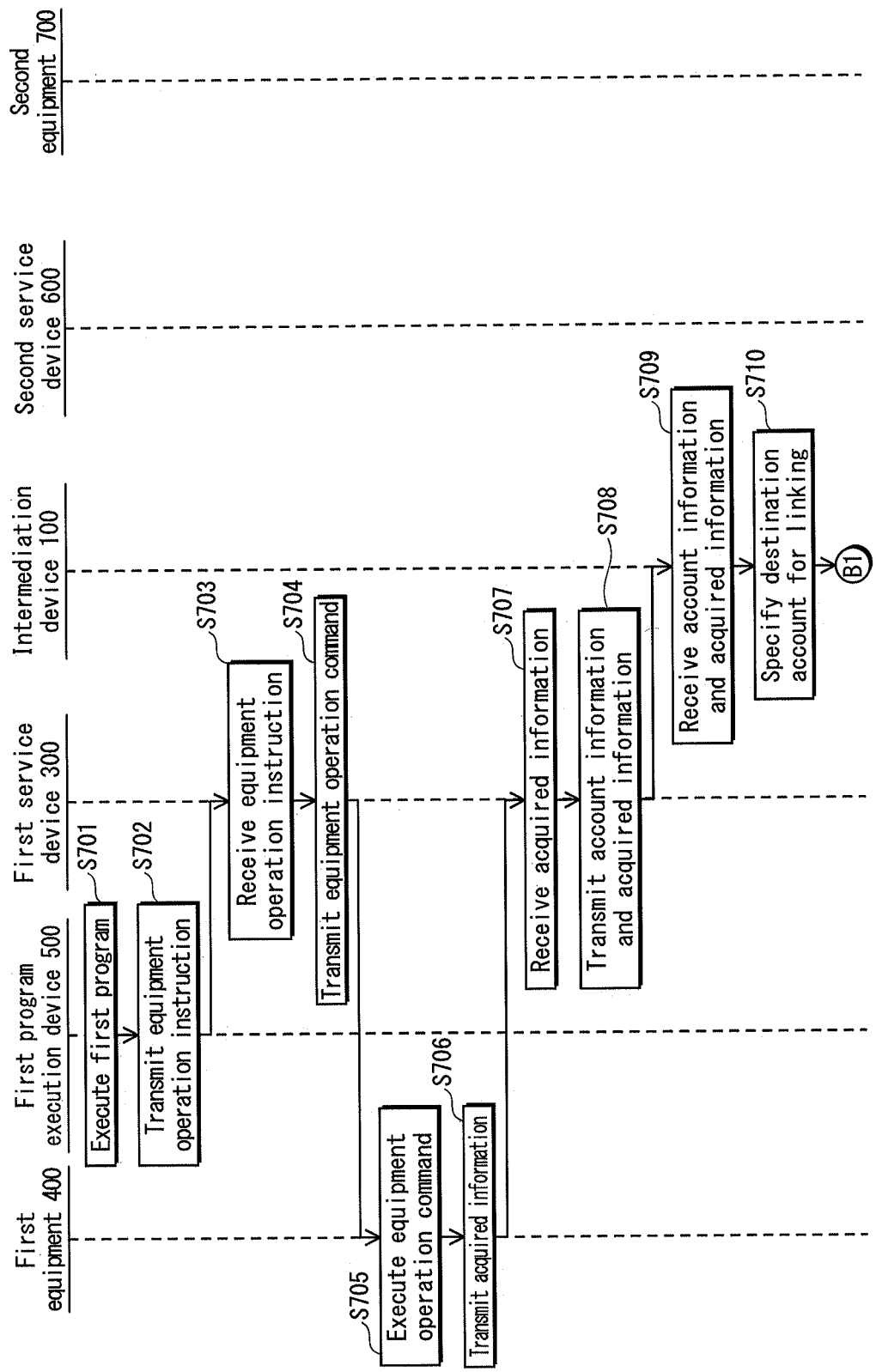
FIG. 39 is part one of a sequence diagram indicating another example of processing performed by the linking service with the first service and the second service while in an execution mode, and continues in FIG. 40.
Figure 40:
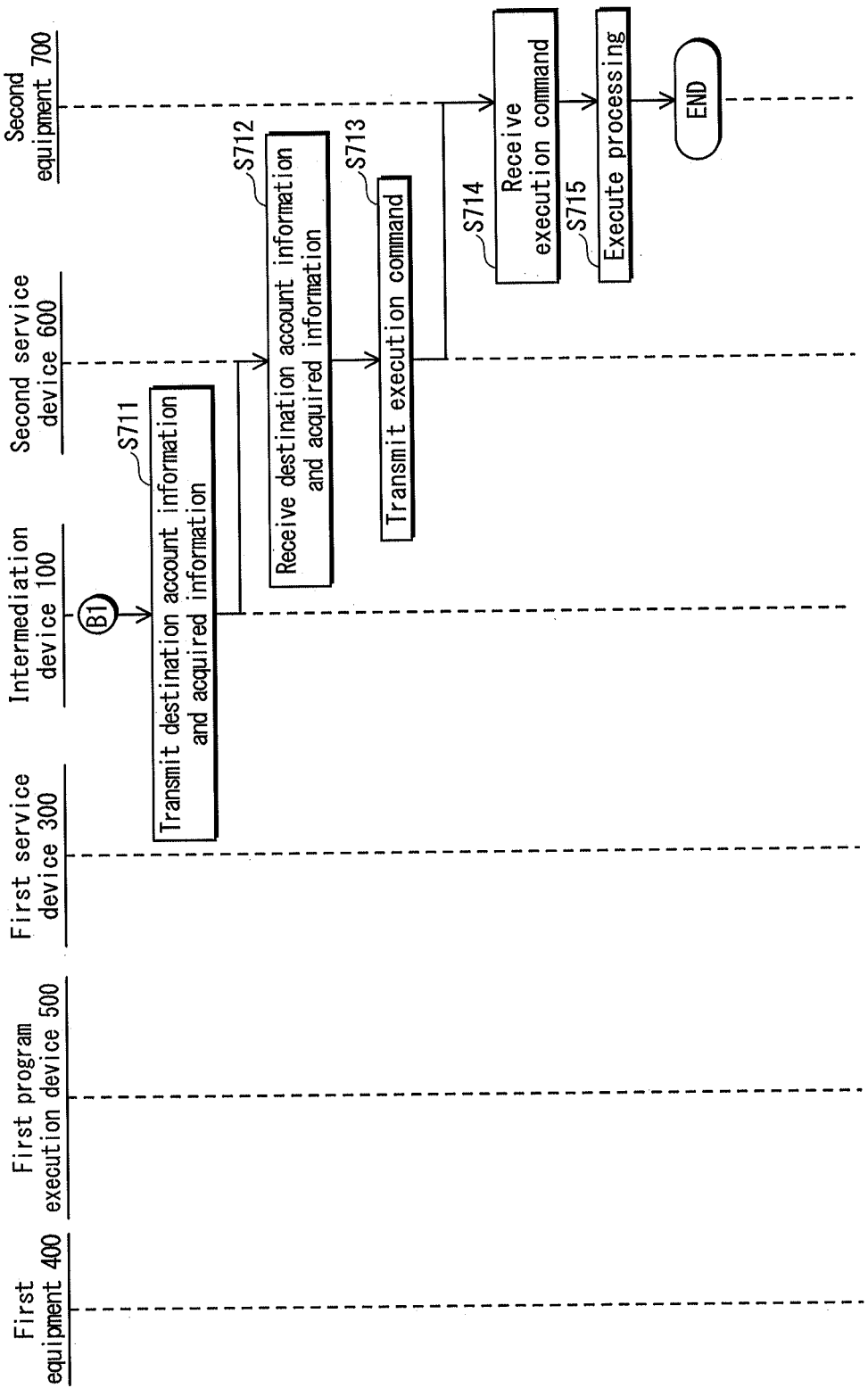
FIG. 40 is part two of a sequence diagram indicating another example of processing performed by the linking service with the first service and the second service while in an execution mode.

In the sequence diagram of FIGS. 39 and 40, the processing of steps S701 through S712 is basically identical to steps S601 through S611 of FIGS. 25 and 26.

When the user returns home from an outing in the automobile, information is acquired by the first equipment 400, such as positional information indicating the current position of the automobile and the longitude and latitude of the home.

The information is transmitted to the second service device 600 via the first equipment 400, the first service device 300, and the intermediation device 100, by performing the processing of steps S705 through S712 (steps S706 through S712).

The second service device 600 uses the latitude and longitude in the positional information obtained from the intermediation device 100 to determine whether or not the automobile is within 500 m of the home. When the automobile arrives within 500 m of the home, the second service device 600 transmits an execution command instructing the second equipment 700 to turn the power of the air conditioner ON (step S713).

The air conditioner acting as the second equipment 700 receives the execution command from the second service device 600 for turning the power ON, and performs processing to turn the power of the air conditioner ON (step S715).

In this variation, the second service device 600 determines whether or not a user-set condition is satisfied, specifically checking whether or not the automobile is within 500 m of the home. However, positional information obtained by the first equipment 400 may be periodically transmitted to the second equipment 700 and the second equipment 700 may check whether or not a condition for executing a user operation instruction is satisfied. Also, the first equipment 400, the first service device 300, and the intermediation device 100 may check whether or not the user condition is satisfied and transmit information indicating that the condition is satisfied whenever appropriate.

4. Other Variations (1) In Embodiment 1, an example is described in which the user accounts of the first service and the second service are associated. However, the number of associated accounts is not limited to two. User accounts of three or more services may also be associated.

(Variation 1)

Figure 41:
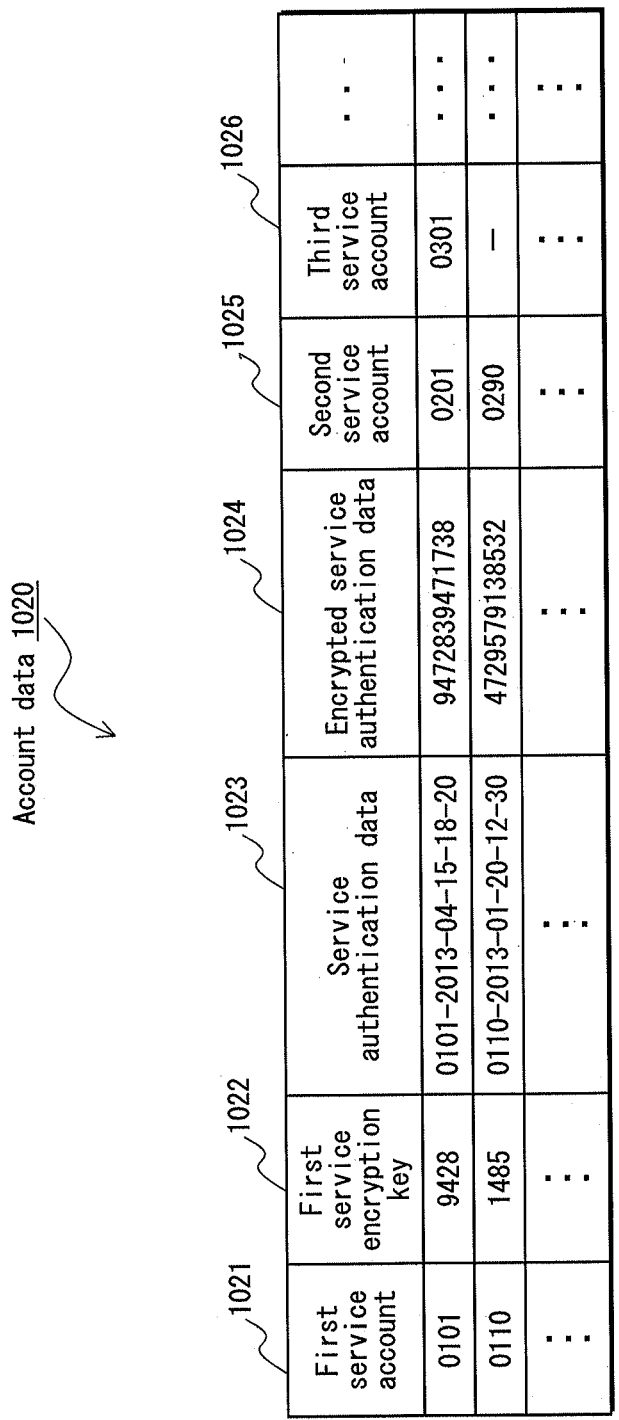
FIG. 41 illustrates an example of account data 1020 configuration and content pertaining to Variation 1.

For example, as shown in FIG. 41, account data 1020 may be used to store user accounts of three different services in association.

Here, account data 1020 is configured similarly to account data 1000 of FIG. 3, with the addition of a third service account column 1026 and so on for associating further accounts.

The first service account column 1021, the first service encryption key column 1022, the service authentication data column 1023, the encrypted service authentication data column 1024, and the second service account column 1025 are respectively identical to the first service account column 1001, the first service encryption key column 1002, the service authentication data column 1003, the encrypted service authentication data column 1004, and the second service account column 1005 of account data 1000 shown in FIG. 3.

In the example of FIG. 41, account 0101 listed in the first service account column 1021 is associated with 0201 in the second service account column and with 0301 in the third service account column.

Here, linking occurs not only between the first service and the second service, and between the first service and the third service, but also occurs between the second service and the third service, as well as globally between the first service, the second service, and the third service.

Furthermore if a fourth service is also linked, then a fourth service user account column may be added after the third service user account column.

That is, using account data 1020 enables first through Nth (where N is an integer greater than or equal to two) services to all be linked to each other for using the linking service.
(Variation 2)

Alternatively, account data 1030 shown in FIG. 42 may be used.

Here, account data 1030 has a similar data configuration to account data 1000, with the addition of a service ID column 1036.

The first service account column 1031, the first service encryption key column 1032, the service authentication data column 1033, the encrypted service authentication data column 1034, and the second service account column 1035 are respectively identical to the first service account column 1001, the first service encryption key column 1002, the service authentication data column 1003, the encrypted service authentication data column 1004, and the second service account column 1005 of account data 1000 shown in FIG. 3.

The service ID column 1036 indicates a service ID for identifying the user account indicated by the second service account associated with the first service account when a plurality of services are used. For instance, an ID of 002 listed in the service ID column 1036 indicates that the user account associated therewith in the second service account column 1035 is an account for using the second service. Also, an ID of 003 listed in the service ID column 1036 indicates that the user account associated therewith in the second service account column 1035 is an account for using the third service.

The data configuration shown in the example of FIG. 42 enables an association such that a first service account 0101 is associated with user account 0201 for using the second service and with user account 0301 for using the third service.

Thus, although user account 0202 for using the second service and user account 0301 for using the third service are not directly associated, referencing account data 1030 while in the linking service execution mode enables reaching the user accounts associated with different services, such that the second service and the third service can be used with the linking service.

(2) In Embodiment 2, an example is described in which the user accounts of the first service and the second service are associated. However, the number of associated accounts is not limited to two. User accounts of three or more services may also be associated.
(Variation 3)

For example, as shown in FIG. 43, account data 1040 may be used to store user accounts of three or more different services in association.

As shown, account data 1040 includes a first service account column 1041, a first service encryption key column 1042, a first service identification information A column 1043, a second service account column 1044, a second service identification information B column 1045, and a second identification information checking flag column 1046, which are identical to the first service account column 1011, the first service encryption key column 1012, the first service identification information A column 1013, the second service account column 1014, the second service identification information B column 1015, and the identification information checking flag column 1016 of account data 1010 shown in FIG. 29.

Also, account data 1040 includes a third service account column 1047, a third service identification information B column 1048, and a third identification information checking flag column 1049, in addition to the columns corresponding to account data 1010.

The third service account column 1047 indicates a user account for using the third service, associated with the first service for using the linking service.

The third service identification information B column 1048 indicates identification information B, which is transmitted to the second program execution device 1800 and presented to the user.

The third identification information checking flag column 1049 indicates a flag showing whether or not the user accounts are associated by the third service identification information B.

When fourth service is added, corresponding columns are also added, much like the third service account column 1047, the third service identification information column 1048, and the third identification information checking flag column 1049.

That is, using account data 1040 enables first through Nth (where N is an integer greater than or equal to two) services to all be linked to each other for using the linking service.
(Variation 4)

Alternatively, account data 1050 shown in FIG. 44 may be used.

As shown, account data 1050 includes a first service account column 1051, a first service encryption key column 1052, a first service identification information A column 1053, a second service account column 1054, a second service identification information B column 1055, and a second identification information checking flag column 1056, which are identical to the first service account column 1011, the first service encryption key column 1012, the first service identification information A column 1013, the second service account column 1014, the second service identification information B column 1015, and the identification information checking flag column 1016 of account data 1010 shown in FIG. 29.

Here, account data 1050 has a similar data configuration to account data 1010, with the addition of a service ID column 1057.

The service ID column 1057 indicates a service ID for identifying the user account indicated by the second service account associated with the first service account when a plurality of services are used. For instance, an ID of 002 listed in the service ID column 1057 indicates that the user account associated therewith in the second service account column 1054 is an account for using the second service. Also, an ID of 003 listed in the service ID column 1057 indicates that the user account associated therewith in the second service account column 1054 is an account for using the third service.

The data configuration shown in the example of FIG. 44 enables an association such that a first service account 0101 is associated with user account 0201 for using the second service and with user account 0301 for using the third service.

Thus, although user account 0202 for using the second service and user account 0301 for using the third service are not directly associated, referencing account data 1050 while in the linking service execution mode enables reaching the user accounts associated with different services, such that the second service and the third service can be used with the linking service.

(3) In the Embodiments, the linking service execution mode is described in an example where two services, namely the first service and the second service, are linked. However, the number of linked services is not limited in this manner. Three or more services may also be linked.

For example, when a plurality of services are made usable, information obtained by the first service may be transmitted to the second service and to the third service, presented on the terminals for the second service and the third service, and used to control the respective equipment. Also, information obtained using the first service and the second service may be transmitted to the third service, information based on both sources may be presented to the terminal for the third device, and used to control the third device.

(4) In the Embodiments, data transmission and reception among devices is performed securely. For this purpose, all data transmitted and received may be encrypted.

This encryption may be performed using a private key encryption system or a public key encryption system. For example, Advanced Encryption Standard or Pretty Good Privacy may be used. Of course, any encryption may be applied that prevents a third party from illicitly obtaining or tampering with data. Any encryption technology enabling encryption and decryption of the data may be used.

(5) As described above, the devices are specifically computer systems made up of a microprocessor, ROM, RAM, a hard disk drive, and so on. In each device, the RAM and the hard disk drive store computer programs executed by the microprocessor to execute the processes given in FIGS. 20 through 26 and 36 through 40. The microprocessor realises the functions of the device by operating in accordance with the computer program. Each of the computer programs is made up of a plurality of instruction codes making commands to the computer in order to realise predetermined functions.

(6) The above-described components of the devices may be realised individually or as a group as a system Large Scale Integration (hereinafter, LSI). The system LSI is a super-multifunctional LSI in which a plurality of components are integrated as a single chip. Specifically, the system LSI is a computer system made up of a microprocessor, ROM, RAM, a hard disk drive, and so on. The RAM stores a computer program. The microprocessor realises the functions of the system LSI by operating in accordance with the computer program.

The components of the above-described devices may be realised as individual chips, or a subset of or the entirety of the components may be combined into a single chip.

Also, all or a subset of the components of the above-described devices may be realised not only as a system LSI but instead as an IC, LSI, super LSI, ultra LSI, and so on, named according to the degree of integration.

Also, the integrated circuit method is not limited to LSI. A dedicated circuit or general-purpose processor may also be used. After LSI manufacture, a Field Programmable Gate Array or a reconfigurable processor may be used.

Further still, advances and discoveries in semiconductor technology may lead to a new technology replacing LSI. Functional blocks may, of course, be integrated using such future technology.

(7) A subset or the entirety of the components of the above-described devices may be realised as a removable IC card or as a standalone module. The IC card or the module is a computer system including a microprocessor, ROM, RAM, and so on. The IC card or the module may also include the aforementioned super-multifunctional LSI. The microprocessor operates in accordance with the computer program, such that the IC card or module realises the functions. The IC card or module is beneficially resistant to tampering.

(8) The above-described computer system may be recorded on a computer-readable recording medium, such as a floppy disc, a hard disk, a CD-ROM, an MO, a DVD, a DVD-ROM, DVD-RAM, a Blu-Ray™ Disc, a semiconductor memory, and so on.

Also, the computer program may be distributed over electrical communication lines, wireless or wired communication lines, a network such as the Internet, a data broadcast, and so on.

Also, the computer program may be executed by a stand-alone computer system, through transfer of the aforementioned recording medium or through transmission of the computer program over the network.

(9) The above-described Embodiments and variations may be freely combined.

5. Supplement

Aspects of the configuration of the intermediation method, and variations thereon, are presented below along with their respective effects.

(1) In one aspect, an intermediation method is used in a system that includes an intermediation device and determines, when a linking service is used, a permission for a plurality of application services requiring user authentication on a network, the intermediation method including: a registration mode of registering linking permission information; and a linked service execution mode of executing the linking service, wherein the registration mode involves: receiving a first account used for a first application service, a second account used for a second application service, and a registration request for using the linking service linking the first application service and the second application service; performing a first authentication of authenticating the first account as valid; performing a second authentication of authenticating the second account as valid; and storing, when the first authentication and the second authentication are both affirmative, the linking permission information associating the first account and the second account with each other in the intermediation device, and the linked service execution mode involves: receiving a usage request from one of the first application service and the second application service, for using another one of the first application service and the second application service; determining whether or not the first application service and the second application service are associated with each other by referencing the linking permission information; and permitting the one of the first application service and the second application service to use the other one of the first application service and the second application service upon determining affirmatively.

According to this configuration, the intermediation device stores information associating user accounts for each of a plurality of application services in order to perform linking.

Thus, linking the user accounts is enabled by accessing the intermediation device only. Also, when the linking service is executed, confirmation is enabled through the intermediation device without requiring a confirmation of linking service usage permission to be provided to each of the application services. That is, the linking service is made more easily usable.

(2) In another aspect, when the first account and the second account are associated with each other, the registration mode further involves: receiving a registration request for using the linking service linking the first application service and a third application service; and performing a third authentication of authenticating a third account, for using the third application service, as valid, and when the third authentication is affirmative, the linking permission information associates the first account and the third account with each other, associates the second account and the third account with each other, and is stored in the intermediation device.

According to this configuration, when user accounts for using the linking service area already associated with each other, and a new user account is associated therewith for using a different service, then the user account for the new service need only be associated with one user account for one service among the already-associated services, in order to be associated with the user accounts associated with that one user account, without requiring that association be performed with all services.

Thus, the linking service is usable directly among services that have not been associated.

(3) In a further aspect, the registration mode further involves: generating authentication data for each user, the authentication data being used for an authentication judgment of whether or not the first application service and the second application service are permitted to be linked; storing the authentication data; and transmitting encrypted authentication data to a server provided by the second application service, the encrypted authentication data having been obtained by encrypting the authentication data using an encryption key for each user, the server transmits the encrypted authentication data to the intermediation device when the second authentication is affirmative, and the linking permission information associates the first account and the second account with each other and is stored when the encrypted authentication data received from the server is found, upon decryption using the encryption key of a user corresponding to the first account, to match stored authentication data stored while in the registration mode.

According to this configuration, the process of associating user accounts from different services is enabled through transmission and reception of authentication data for determining whether or not an association request is valid.

Accordingly, prevention is provided against a request to use the linking service from an illicit user account.

(4) In an additional aspect, the registration mode further involves: generating first identification information and second identification information used to determine whether or not the first account and the second account are associated with each other; presenting the first identification information to a first account user; presenting the second identification information to a second account user; receiving identification information input from the first account user; receiving the identification information input from the second account user; and receiving permission information indicating whether or not the second account user permits the first account and the second account to be associated with each other, after the presentation of the first identification information, and the linking permission information associates the first account and the second account with each other, and is stored in the intermediation device when the identification information input from the second account user matches the first identification information and the identification information input from the first account user matches the second identification information.

According to this configuration, when user accounts for different services are associated with each other, the two user accounts for using the respective services are able to transmit and receive identification information for determining whether or not the association request is legitimate.

Accordingly, prevention is provided against a request to use the linking service from an illicit user account.

(5) In still another aspect, when in the linked service execution mode, when the first account is not directly associated with a third account for using a third application service, the first application service and the third application service are permitted to be linked when, upon referencing the linking permission information, a given account associated with the first account is found to be associated with the third account as a result of sequentially following associations of the given account.

According to this configuration, when a linked service is used, information for a user account that has already been associated with linking is followed to determine whether or not the linking service can be used, even when no direct association is established between the user accounts pertaining to the services.

(6) In yet a further aspect, the linked service execution mode further involves: receiving collected information from a given application service executed with a given account, and transmitting the collected information to another application service, usable with another account, when the other account is found, upon referencing the linking permission information, to be associated with the given account, and the collected information is presented to a user of the other application service, by the other application service.

According to this configuration, the linking service is executed by transmitting information obtained by one service to another service, and presenting that information to the user of the other service.

(7) In yet a further aspect, the linked service execution mode further involves: receiving collected information from a given application service executed with a given account, and transmitting the collected information to another application service, usable with another account, when the other account is found, upon referencing the linking permission information, to be associated with the given account, the other application service is a control service controlling a terminal owned by a user of the other account, and the other application service controls the terminal in accordance with the collected information received thereby.

According to this configuration, information obtained from one service is transmitted to another service, enabling control of equipment for the other service based on the obtained information.

(8) In an alternative aspect, when the other account is a plurality of other accounts, the collected information is transmitted for all of the other accounts to application services usable through each of the other accounts, and the other application service controls the terminal in accordance with the collected information received thereby.

According to this configuration, when a plurality of services use the linking service, information obtained from one of the services is transmitted to all services using the linking service and enables control of each respective service terminal.

INDUSTRIAL APPLICABILITY

The intermediation system of the present disclosure is applicable to technology of linking a plurality of network services.

REFERENCE SIGNS LIST 1, 2 Intermediation system
20 Network
100, 2100 Intermediation device
120, 2120 Account management unit
123 Authentication data verification unit
2123 Identification information verification unit
124 Authentication data generation unit
2124 Identification information generation unit
200 Intermediation program execution device
230 Program execution unit
250 Intermediation program
270 Authentication data acquisition unit
271 Second account information acquisition unit
272 Permission information acquisition unit
300, 1300 First service device
321 Account management unit
322 Account verification unit
400 First equipment
500, 1500 First program execution device
550, 1550 First program
600, 1600 Second service device
621 Account management unit
622 Account verification unit
700 Second equipment
800, 1800 Second program execution device
850, 1850 Second program

The invention claimed is:

1. An intermediation method used in a device determining, when a linking service is used, a permission for a plurality of application services requiring user authentication on a network, the intermediation method comprising:
 receiving a registration request for using the linking service linking a first application service and a second application service;
 determining a first user account is valid by (i) issuing a first authentication request using the first user account to the first application service and (ii) receiving a first affirmative authentication result from the first application service, the first user account being used for only the first application service;
 determining a second user account is valid by (i) issuing a second authentication request using the second user account to the second application service and (ii) receiving a second affirmative authentication result from the second application service, the first user account and the second user account being generated independently from each other, the second user account being used for only the second application service, the first application service being available only to the first user account, the first application service not being available to the second user account;
 generating first identification information for the first user account and second identification information for the second user account;
 after the first user account is determined to be valid, (i) presenting the first identification information to a first user having the first user account and (ii) receiving third identification information input from the first user having the first user account;
 after the second user account is determined to be valid, (i) presenting the second identification information to a second user having the second user account and (ii) receiving fourth identification information input from the second user having the second user account;
 determining whether (i) the fourth identification information input from the second user having the second user account matches (ii) the first identification information presented to the first user having the first user account;
 determining whether (i) the third identification information input from the first user having the first user account matches (ii) the second identification information presented to the second user having the second user account; and
 storing linking permission information associating the first user account and the second user account with each other in the device, when both
  (i) the fourth identification information input from the second user having the second user account matches (ii) the first identification information presented to the first user having the first user account, and
  (i) the third identification information input from the first user having the first user account matches (ii) the second identification information presented to the second user having the second user account.

2. The intermediation method of claim 1, further comprising:
 receiving a registration request for using the linking service linking the first application service and a third application service, the third application service being different from the second application service; and
 determining a third user account is valid using the third application service, the first user account, the second user account, and the third user account being generated independently from one another; and
 wherein when the third user account is determined as valid, (i) the linking permission information associates the first user account and the third user account with each other, and (ii) the linking permission information associates the second user account and the third user account with each other, and is stored in the device.

3. The intermediation method of claim 1, wherein
 the second authentication request issued to the second application service is transmitted together with first encrypted authentication data, the first encrypted authentication data being obtained by encrypting first authentication data generated for the first user account using an encryption key of the first user account,
 the second affirmative authentication result received from the second application service is received together with second encrypted authentication data, and
 the linking permission information associating the first user account and the second user account with each other is stored in the device when second authentication data matches the first authentication data, the second authentication data being obtained by decrypted the second encrypted authentication data using the encryption key.

4. The intermediation method of claim 1, further comprising:
 receiving an input of the first user account in the first application service, and receiving a usage request for using the linking service linking the first application service and the second application service;

identifying the second user account that is associated with the first user account, with reference to the linking permission information; and permitting usage of the second application service using the second user account.

5. The intermediation method of claim 4, wherein second linking permission information associates the second user account and a fourth user account, the second linking permission being stored in the device, the fourth user account being used for only a fourth application service, the second user account and the fourth user account being generated independently from each other, the intermediation method further comprises:

receiving, from the first application service, a usage request for using the linking service linking the first application service and the fourth application service; and identifying that the first user account is associated with the fourth user account based on the linking permission information and the second linking permission information.

6. The intermediation method of claim 4, further comprising:

receiving collected information from the first application service executed with the first user account; and transmitting the collected information to the second application service, usable with the second user account.

7. The intermediation method of claim 6, wherein the second application service is a control service controlling a terminal that is associated with the second user account, and the second application service controls the terminal in accordance with the collected information received thereby.

8. A system that includes a device determining, when a linking service is used, a permission for a plurality of application services requiring user authentication on a network, the device comprising:

circuitry that receives a registration request for using the linking service linking a first application service and a second application service, determines a first user account is valid by (i) issuing a first authentication request using the first user account to the first application service and (ii) receiving a first affirmative authentication result from the first application service, the first user account being used for only the first application service, determines a second user account is valid by (i) issuing a second authentication request using the second user account to the second application service and (ii) receiving a second affirmative authentication result from the second application service, the first user account and the second user account being generated independently from each other, the second user account being used for only the second application service, the first application service being available only to the first user account, the first application service not being available to the second user account, generates first identification information for the first user account and second identification information for the second user account, after the first user account is determined to be valid, (i) presents the first identification information to a first user having the first user account and (ii) receives third identification information input from the first user having the first user account, after the second user account is determined to be valid, (i) presents the second identification information to a second user having the second user account and (ii) receives fourth identification information input from the second user having the second user account, determines whether (i) the fourth identification information input from the second user having the second user account matches (ii) the first identification information presented to the first user having the first user account, determines whether (i) the third identification information input from the first user having the first user account matches (ii) the second identification information presented to the second user having the second user account, and stores linking permission information associating the first user account and the second user account with each other in the device, when both (i) the fourth identification information input from the second user having the second user account matches (ii) the first identification information presented to the first user having the first user account, and (i) the third identification information input from the first user having the first user account matches (ii) the second identification information presented to the second user having the second user account.

9. A device determining, when a linking service is used, a permission for a plurality of application services requiring user authentication on a network, the device comprising:

circuitry that receives a registration request for using the linking service linking a first application service and a second application service, determines a first user account is valid by (i) issuing a first authentication request using the first user account to the first application service and (ii) receiving a first affirmative authentication result from the first application service, the first user account being used for only the first application service, determines a second user account is valid by (i) issuing a second authentication request using the second user account to the second application service and (ii) receiving a second affirmative authentication result from the second application service, the first user account and the second user account being generated independently from each other, the second user account being used for only the second application service, the first application service being available only to the first user account, the first application service not being available to the second user account, generates first identification information for the first user account and second identification information for the second user account, after the first user account is determined to be valid, (i) presents the first identification information to a first user having the first user account and (ii) receives third identification information input from the first user having the first user account, after the second user account is determined to be valid, (i) presents the second identification information to a second user having the second user account and (ii) receives fourth identification information input from the second user having the second user account, determines whether (i) the fourth identification information input from the second user having the second user account matches (ii) the first identification information presented to the first user having the first user account, determines whether (i) the third identification information input from the first user having the first user account matches (ii) the second identification information presented to the second user having the second user account, and stores linking permission information associating the first user account and the second user account with each other in the device, when both
  (i) the fourth identification information input from the second user having the second user account matches (ii) the first identification information presented to the first user having the first user account, and
  (i) the third identification information input from the first user having the first user account matches (ii) the second identification information presented to the second user having the second user account.

10. A non-transitory recording medium on which is recorded a computer-readable program executed by a device determining, when a linking service is used, a permission for a plurality of application services requiring user authentication on a network, the computer program comprising:

receiving a registration request for using the linking service linking a first application service and a second application service;

determining a first user account is valid by (i) issuing a first authentication request using the first user account to the first application service and (ii) receiving a first affirmative authentication result from the first application service, the first user account being used for only the first application service;

determining a second user account is valid by (i) issuing a second authentication request using the second user account to the second application service and (ii) receiving a second affirmative authentication result from the second application service, the first user account and the second user account being generated independently from each other, the second user account being used for only the second application service, the first application service being available only to the first user account, the first application service not being available to the second user account;

generating first identification information for the first user account and second identification information for the second user account;

after the first user account is determined to be valid, (i) presenting the first identification information to a first user having the first user account and (ii) receiving third identification information input from the first user having the first user account;

after the second user account is determined to be valid, (i) presenting the second identification information to a second user having the second user account and (ii) receiving fourth identification information input from the second user having the second user account;

determining whether (i) the fourth identification information input from the second user having the second user account matches (ii) the first identification information presented to the first user having the first user account;

determining whether (i) the third identification information input from the first user having the first user account matches (ii) the second identification information presented to the second user having the second user account; and storing linking permission information associating the first user account and the second user account with each other in the device, when both
  (i) the fourth identification information input from the second user having the second user account matches (ii) the first identification information presented to the first user having the first user account, and
  (i) the third identification information input from the first user having the first user account matches (ii) the second identification information presented to the second user having the second user account.

11. An integrated circuit determining, when a linking service is used, a permission for a plurality of application services requiring user authentication on a network, the integrated circuit comprising:

circuitry that
  receives a registration request for using the linking service linking a first application service and a second application service,
  determines a first user account is valid by (i) issuing a first authentication request using the first user account to the first application service and (ii) receiving a first affirmative authentication result from the first application service, the first user account being used for only the first application service,
  determines a second user account is valid by (i) issuing a second authentication request using the second user account to the second application service and (ii) receiving a second affirmative authentication result from the second application service, the first user account and the second user account being generated independently from each other, the second user account being used for only the second application service, the first application service being available only to the first user account, the first application service not being available to the second user account,
  generates first identification information for the first user account and second identification information for the second user account,
  after the first user account is determined to be valid, (i) presents the first identification information to a first user having the first user account and (ii) receives third identification information input from the first user having the first user account,
  after the second user account is determined to be valid, (i) presents the second identification information to a second user having the second user account and (ii) receives fourth identification information input from the second user having the second user account,
  determines whether (i) the fourth identification information input from the second user having the second user account matches (ii) the first identification information presented to the first user having the first user account,
  determines whether (i) the third identification information input from the first user having the first user account matches (ii) the second identification information presented to the second user having the second user account, and stores linking permission information associating the first user account and the second user account with each other in the device, when both
(i) the fourth identification information input from the second user having the second user account matches (ii) the first identification information presented to the first user having the first user account, and
(i) the third identification information input from the first user having the first user account matches (ii) the second identification information presented to the second user having the second user account.

\* \* \* \* \*